(12) United States Patent
Suzuki

(10) Patent No.: US 11,811,338 B2
(45) Date of Patent: Nov. 7, 2023

(54) ROTATING MACHINE CONTROL DEVICE

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 13 days.

(21) Appl. No.: 17/660,912

(22) Filed: Apr. 27, 2022

(65) Prior Publication Data

US 2022/0255474 A1    Aug. 11, 2022

Related U.S. Application Data

(63) Continuation of application No. PCT/JP2020/039066, filed on Oct. 16, 2020.

(30) Foreign Application Priority Data

| Nov. 1, 2019 | (JP) | ................................ 2019-199907 |
| May 29, 2020 | (JP) | ................................ 2020-094449 |

(51) Int. Cl.
     *H02P 3/22*           (2006.01)
     *H02P 5/60*           (2006.01)
                 (Continued)

(52) U.S. Cl.
     CPC ................ *H02P 5/60* (2013.01); *B62D 1/187* (2013.01); *B62D 5/0463* (2013.01); *H02M 7/537* (2013.01); *H02P 27/06* (2013.01)

(58) Field of Classification Search
     CPC .. H02P 5/60; H02P 27/06; H02P 29/64; H02P 25/22; H02P 6/04; H02P 2006/045;
                 (Continued)

(56) References Cited

U.S. PATENT DOCUMENTS

| 6,577,086 B2 * | 6/2003 | Sebastian .................. H02P 6/34 |
| | | 318/434 |
| 6,959,969 B2 | 11/2005 | Simpson et al. |
| | | (Continued) |

FOREIGN PATENT DOCUMENTS

| EP | 3192709 A1 | 7/2017 |
| JP | 2003-333895 A | 11/2003 |
| | (Continued) | |

OTHER PUBLICATIONS

U.S. Appl. No. 17/660,914 and its entire file history, filed Apr. 27, 2022, Takashi Suzuki.

*Primary Examiner* — Muhammad S Islam
(74) *Attorney, Agent, or Firm* — MASCHOFF BRENNAN

(57) ABSTRACT

One or more multiphase power converters are connected to a positive electrode and a negative electrode of a power supply via a high potential line and a low potential line, respectively, convert DC power of the power supply into multiphase alternate current power by operations of a plurality of inverter switching elements, and apply a voltage to each of phase windings of a multiphase winding set. A DC rotating machine switch including switches on a high potential side and a low potential side connected in series via a DC motor terminal connected to a second terminal that is an end of the DC rotating machine on an opposite side to a first terminal. The DC rotating machine switch generates a voltage of the DC motor terminal variable by switching. A control unit controls operations of the inverter switching elements and the DC rotating machine switch.

24 Claims, 51 Drawing Sheets

(51) Int. Cl.
*B62D 1/187* (2006.01)
*B62D 5/04* (2006.01)
*H02M 7/537* (2006.01)
*H02P 27/06* (2006.01)

(58) Field of Classification Search
CPC .. H02M 7/537; H02M 3/1582; H02M 1/0095; H02M 1/009; H02M 7/53871; H02M 1/327
See application file for complete search history.

(56) References Cited

U.S. PATENT DOCUMENTS

| | | | |
|---|---|---|---|
| 9,917,543 B1 * | 3/2018 | Sarlioglu | ............... H02P 25/22 |
| 2003/0155875 A1 | 8/2003 | Weinmann | |
| 2004/0012350 A1 | 1/2004 | Weinmann | |
| 2016/0023677 A1 | 1/2016 | Sakurai et al. | |
| 2018/0254734 A1 | 9/2018 | Kano et al. | |
| 2020/0244206 A1 * | 7/2020 | Ohashi | ................... B62D 6/00 |
| 2020/0321893 A1 * | 10/2020 | Hossain | ................... H02P 3/22 |
| 2020/0377152 A1 | 12/2020 | Taniguchi | |
| 2021/0362771 A1 | 11/2021 | Ichikawa et al. | |

FOREIGN PATENT DOCUMENTS

| | | | |
|---|---|---|---|
| JP | 5125055 B2 | 1/2013 |
| JP | 5614576 B2 | 10/2014 |
| JP | 5614588 B2 | 10/2014 |
| JP | 2014-218129 A | 11/2014 |
| JP | 5768998 B2 | 8/2015 |
| JP | 5768999 B2 | 8/2015 |
| JP | 2019-110720 A | 7/2019 |

\* cited by examiner

TILT ACTUATOR

TELESCOPIC ACTUATOR

CURRENT FLOWING THROUGH INVERTER

PHASE CURRENTS APPLIED TO THREE-PHASE WINDING SET

VOLTAGE COMMAND

CONTROLLED VOLTAGE COMMAND CENTERED AROUND VM (6 [V])

FIG. 48   FIFTEENTH EMBODIMENT

ROTATING MACHINE CONTROL DEVICE

CROSS REFERENCE TO RELATED APPLICATION

The present application is a continuation application of International Patent Application No. PCT/JP2020/039066 filed on Oct. 16, 2020, which designated the U.S. and claims the benefit of priority from Japanese Patent Applications No. 2019-199907 filed on Nov. 1, 2019 and No. 2020-094449 filed on May 29, 2020. The entire disclosures of all of the above applications are incorporated herein by reference.

TECHNICAL FIELD

The present disclosure relates to a rotating machine control device.

BACKGROUND

Conventionally, a rotating machine control device that drives a multiphase rotating machine and a direct current (DC) rotating machine by one drive circuit is known.

SUMMARY

According to an aspect of the present disclosure, a rotating machine control device is configured to drive one or more multiphase rotating machines including one or more multiphase winding sets and one or more direct current rotating machines in which a first terminal that is one end is connected to a phase current path of one or more phases of at least one of the multiphase winding sets. The device comprises one or more multiphase power converters, a DC rotating machine switch, and a control unit.

BRIEF DESCRIPTION OF THE DRAWINGS

The above and other objects, features and advantages of the present disclosure will become more apparent from the following detailed description made with reference to the accompanying drawings. In the drawings:

FIG. 48 is a circuit configuration diagram according to a fifteenth embodiment (two-system, individual power supplies)

DETAILED DESCRIPTION

Figure 1:
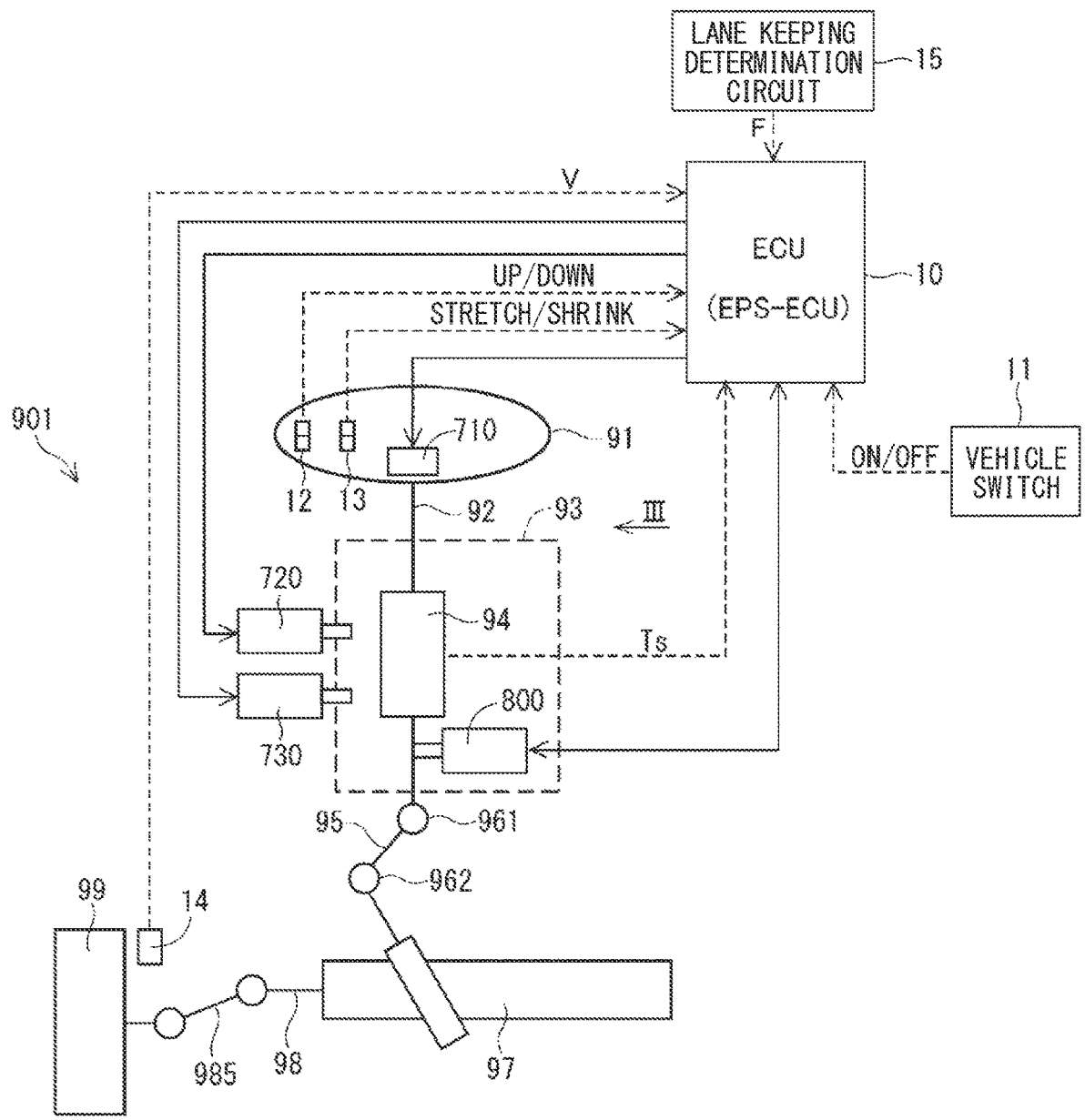
FIG. 1 is a diagram of an electric power steering (EPS) system to which an electric control unit (ECU) (rotating machine control device) of each embodiment is applied.

Hereinafter, examples of the present disclosure will be described.

According to an example of the present disclosure, a rotating machine control device drives a multiphase rotating machine and a DC rotating machine with one drive circuit. For example, the motor control device drives a three-phase alternate current (AC) motor and two DC motors with one three-phase inverter drive circuit. Specifically, this motor control device is used as a vehicle steering device and drives an electric power steering (EPS) three-phase motor, a tilt DC motor, and a telescopic DC motor.

In the example of the present disclosure, after an ignition key is turned on, the tilt motor and the telescopic motor are operated in parallel to perform a position adjustment operation. When it is determined that the position adjustment operation has not been performed, the EPS three-phase motor is driven. That is, one of the DC motor and the three-phase motor is driven, and the DC motor and the three-phase motor are not assumed to be driven simultaneously. In addition, the energization of the DC motor and the three-phase motor cannot be simultaneously controlled, either, in view of the circuit configuration.

Further, there are required a switch for interrupting energization of a phase to which the DC motor is connected among phases of the three-phase motor at the time of driving the DC motor and a switch for interrupting the energization of the DC motor at the time of driving the three-phase motor. For example, in a configuration where one DC motor is connected between two phases of the three-phase motor, at least three switches are required.

A rotating machine control device according to an example of the present disclosure is configured to drive one or more multiphase rotating machines including one or more multiphase winding sets and one or more direct current rotating machines in which a first terminal that is one end is connected to a phase current path of one or more phases of at least one of the multiphase winding sets. The device comprises one or more multiphase power converters, a DC rotating machine switch, and a control unit.

The multiphase power converter is connected to a positive electrode and a negative electrode of a power supply via a high potential line and a low potential line, respectively. The multiphase power converter converts DC power of the power supply into multiphase AC power by operations of a plurality of inverter switching elements connected in a bridge configuration and applies a voltage to each phase winding of the multiphase winding set.

The DC rotating machine switch is made up of switches on a high potential side and a low potential side connected in series via a DC motor terminal. The DC motor terminal is connected to a second terminal that is an end of the DC rotating machine on the opposite side to the first terminal. The DC rotating machine switch makes the voltage of the DC motor terminal variable by switching. The control unit controls operations of the inverter switching elements and the DC rotating machine switch.

Concerning the reference characters of the inverter switching element and the DC rotating machine switch, for example, "MU1H" and "MU1L" are collectively referred to as "MU1H/L".

The control unit of the present disclosure can simultaneously drive the DC rotating machine by controlling the operation of the DC rotating machine switch while controlling the operation of the inverter switching elements to drive the multiphase rotating machine. For example, in a configuration where one DC rotating machine is connected to a phase current path of one phase of one three-phase winding set, it is sufficient that there be at least two DC rotating machine switches. Hence the number of switches can be reduced.

Adding a supplementary description of the circuit configuration of the present disclosure, in the configuration including the plurality of multiphase power converters and the plurality of multiphase winding sets, the second terminal of the DC rotating machine is connected only to the DC rotating machine switch and is not directly connected to a multiphase winding set different from the multiphase winding set to which the first terminal is connected. That is, an inverter switching element of a multiphase power converter different from the multiphase power converter to which the DC rotating machine is connected does not also serve as a DC rotating machine switch for the DC rotating machine. In short, the DC rotating machine switch is provided independently of the inverter switching element. With such a configuration, even when the inverter switching element is on, only the energization of the DC rotating machine can be stopped by turning off the DC rotating machine switch.

The multiphase rotating machine is, for example, a rotating machine for steering assist torque output of an electric power steering system or for reaction torque output of a steer-by-wire system.

The DC rotating machine includes a steering-position actuator that makes a steering position variable, specifically, a tilt actuator or a telescopic actuator of a steering column.

Hereinafter, a plurality of embodiments of the rotating machine control device will be described with reference to the drawings. The rotating machine control device of each embodiment is applied to an electric power steering system (hereinafter, "EPS system") or a steer-by-wire system (hereinafter, "SBW system") of a vehicle and functions as an EPS-ECU or an SBW-ECU. In the following embodiments, the EPS-ECU or the SBW-ECU is collectively referred to as an "ECU". Further, in principle, first to fifteenth embodiments are collectively referred to as "the present embodiment". However, concerning the number of DC motors to be driven, an embodiment in which three DC motors are mainly driven will be described as "the present embodiment" except for the first embodiment. In each of the plurality of embodiments, substantially the same constituent elements are denoted by the same reference characters/numerals, and the description thereof is omitted.

[System Configuration]

Figure 2:
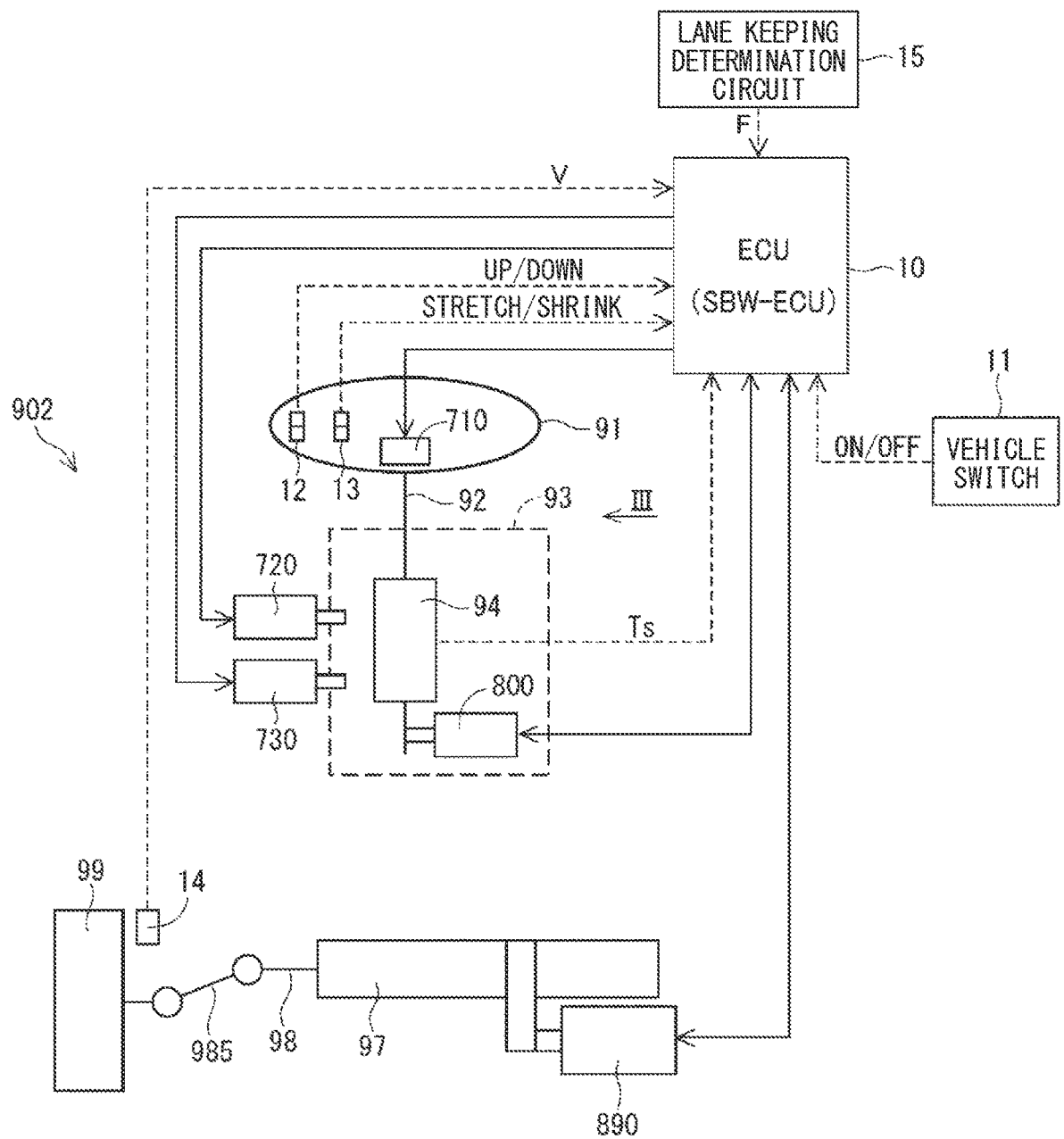
FIG. 2 is a diagram of a steer-by-wire (SBW) system to which the ECU (rotating machine control device) of each embodiment is applied.

First, a system configuration to which an ECU as a "rotating machine control device" is applied in the present embodiment will be described with reference to FIGS. 1 to 3B. FIG. 1 illustrates an EPS system 901 in which a steering mechanism and a turning mechanism are connected mechanically. FIG. 2 illustrates an SBW system 902 in which the steering mechanism and the turning mechanism are separated mechanically. In FIGS. 1 and 2, only one side of a tire 99 is illustrated, and the illustration of the tire on the opposite side is omitted.

As illustrated in FIG. 1, the EPS system 901 includes a steering wheel 91, a steering shaft 92, an intermediate shaft 95, a rack 97, and the like. The steering shaft 92 is included in a steering column 93 and has one end connected to the steering wheel 91 and the other end connected to the intermediate shaft 95.

The rack 97, which converts rotation into reciprocating motion with a rack and pinion mechanism and transmits the reciprocating motion, is provided at the end of the intermediate shaft 95 on the side opposite to the steering wheel 91. When the rack 97 reciprocates, the tire 99 is turned via a tie rod 98 and the knuckle arm 985. Universal joints 961, 962 are provided in the middle of the intermediate shaft 95. Thereby, a displacement due to the tilt operation or the telescopic operation of the steering column 93 is absorbed.

A torque sensor 94 is provided in the middle of the steering shaft 92 and detects a steering torque Ts of a driver on the basis of the torsional displacement of a torsion bar. In the EPS system, an ECU 10 controls the drive of a three-phase motor 800 on the basis of the steering torque Ts detected by the torque sensor 94 and a vehicle speed V detected by a vehicle speed sensor 14, and outputs a desired steering assist torque. As thus described, in the EPS system 901, the rotating machine for steering assist torque output is used as a "multiphase rotating machine". Each signal to the ECU 10 is communicated using Controller Area Network (CAN), serial communication, or the like, or transmitted as an analog voltage signal.

In the present embodiment, three DC motors 710, 720, 730 as "DC rotating machines" are provided. A steering lock actuator 710 is provided in the vicinity of the steering wheel 91 and locks the steering wheel 91 so as not to rotate during parking or the like. The ECU 10 instructs the steering lock actuator 710 to release or re-lock a steering lock on the basis of an ON/OFF signal of a vehicle switch 11 on the basis of the ECU 10. The vehicle switch 11 corresponds to an ignition switch or a push switch of an engine vehicle, a hybrid vehicle, or an electric vehicle.

In the present embodiment, a lane keeping flag F from a lane keeping determination circuit 15 is input to the ECU 10. When the lane keeping determination circuit 15 determines that the vehicle has deviated from the lane or is likely to deviate from the lane, the lane keeping flag F is generated. When the lane keeping flag F is input, the ECU 10 vibrates the steering wheel 91 to call the driver's attention.

In the present embodiment, for the sake of convenience, the steering lock actuator 710 also have a function of a steering vibration actuator that vibrates the steering wheel 91 to call the driver's attention. The steering lock actuator is described in, for example, JP2017-124794A and the steering vibration actuator is described in, for example, JP2016-30471A.

Figure 3A:
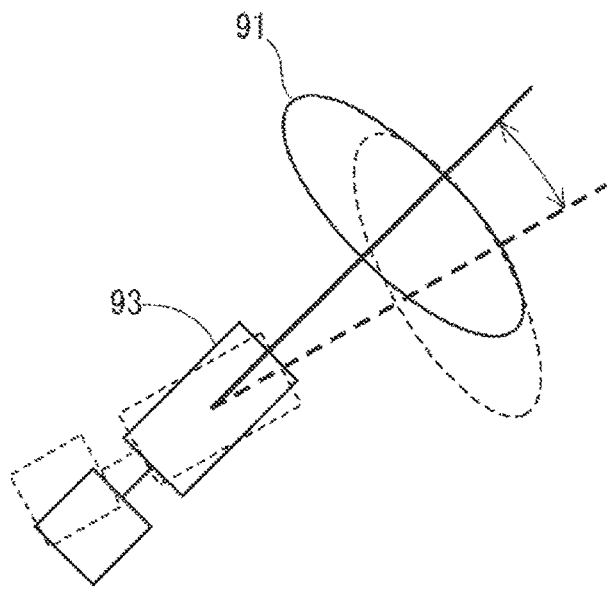
FIG. 3A is a schematic view for explaining a tilt operation.

A tilt actuator 720 and a telescopic actuator 730 are included in a "steering-position actuator" for changing a steering position and are provided in the steering column 93. When the driver operates a tilt switch 12 to input an instruction of "up/down" to the ECU 10, the ECU 10 instructs the tilt actuator 720 to perform a tilt operation. Then, as illustrated in FIG. 3A, the tilt actuator 720 adjusts a tilt angle to move the steering wheel 91 up and down. When the vehicle switch 11 is turned on to activate the vehicle, the vehicle moves to a driving position stored in advance, and when the vehicle switch 11 is turned off to stop the vehicle, the vehicle moves to a side where the space for the driver becomes larger.

Figure 3B:
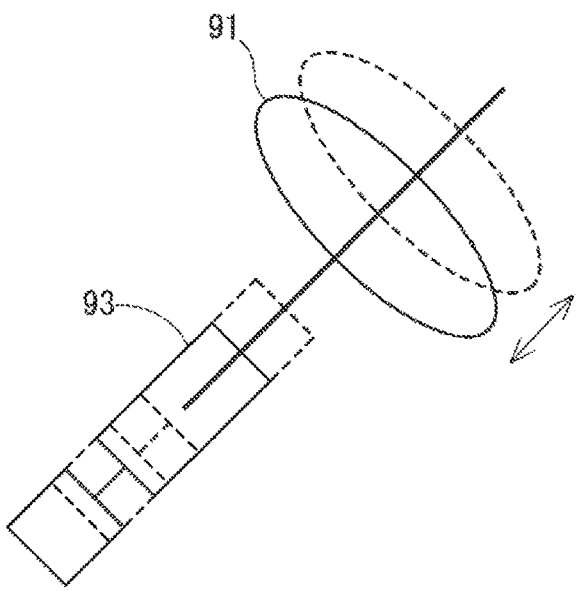
FIG. 3B is a schematic view for explaining a telescopic operation.

When the driver operates a telescopic switch 13 to input an instruction of "stretch/shrink" to the ECU 10, the ECU 10 instructs the telescopic actuator 730 to perform a telescopic operation. Then, as illustrated in FIG. 3B, the telescopic actuator 730 adjusts a telescopic length and moves the steering wheel 91 back and forth. When the vehicle switch 11 is turned on to activate the vehicle, the vehicle moves to a driving position stored in advance, and when the vehicle switch 11 is turned off to stop the vehicle, the vehicle moves to a side where the space for the driver becomes larger.

Subsequently, as illustrated in FIG. 2, in the SBW system 902 in which the steering mechanism and the turning mechanism are mechanically separated, the intermediate shaft 95 does not exist as compared to the EPS system 901. The steering torque Ts of the driver is electrically transmitted to a steering motor 890 via the ECU 10. The rotation of the steering motor 890 is converted into the reciprocating motion of the rack 97, and the tire 99 is turned via the tie rod 98 and the knuckle arm 985. Although not illustrated in FIG. 2, there is a turning motor ECU that drives the steering motor 890 in response to the steering wheel input of the driver.

In the SBW system 902, the driver cannot directly sense the reaction force to the steering. Therefore, the ECU 10 controls the drive of the three-phase motor 800, rotates the steering wheel 91 so as to apply a reaction force to steering, and gives the driver an appropriate steering feeling. As thus described, in the SBW system 902, the rotating machine for reaction torque output is used as a "multiphase rotating machine".

In the SBW system 902 of FIG. 2, the three DC motors as the "DC rotating machines", that is, the steering lock actuator 710, the tilt actuator 720, and the telescopic actuator 730, are used similarly to the EPS system 901 of FIG. 1. Hereinafter, there is no difference between the EPS system 901 and the SBW system 902 in the description of the control of the three-phase motor 800 and the DC motors 710, 720, 730 by the ECU 10.

The DC motor type actuator used in the present embodiment may be a seat actuator and a steering wheel retraction actuator in addition to the steering actuators such as the steering lock, tilt, and telescopic actuators. The seat actuator includes an actuator that slides a seat in the front-rear direction or the height direction or reclines a backrest.

Concerning the configuration of the three-phase motor 800, a unit including each of three-phase winding sets 801, 802 and constituent elements such as an inverter corresponding to the winding set is referred to as a "system". Each of the first to tenth embodiments has a one-system configuration, and each of the eleventh to fifteenth embodiments has a two-system configuration where each constituent element is redundantly provided. Since the one-system motor structure is a general well-known technique, the description thereof is omitted, and the two-system motor structure will be described later. At the end of each of the reference characters and symbols of the two-system configuration, "1" is added for a configuration of a first system, and "2" is added for a configuration of a second system. In the one-system configuration, the reference characters and symbols of the first system in the two-system configuration are used.

Next, a connection configuration of devices will be described with reference to FIG. 4. The three-phase motor 800 of the present embodiment is configured as an "electromechanical integrated motor" in which the ECU 10 is integrally configured on one side in the axial direction. On the other hand, each of the three DC motors 710, 720, 730 is connected to the ECU 10 via a connector. That is, while the connection between the three-phase motor 800 and the ECU 10 is assumed to be fixed, each of the DC motors 710, 720, 730 and the ECU 10 may be configured to be connectable as an option corresponding to the needs, a connector on the ECU 10 side need not be mounted in accordance with the option, and a circuit board may be common.

Figure 4:
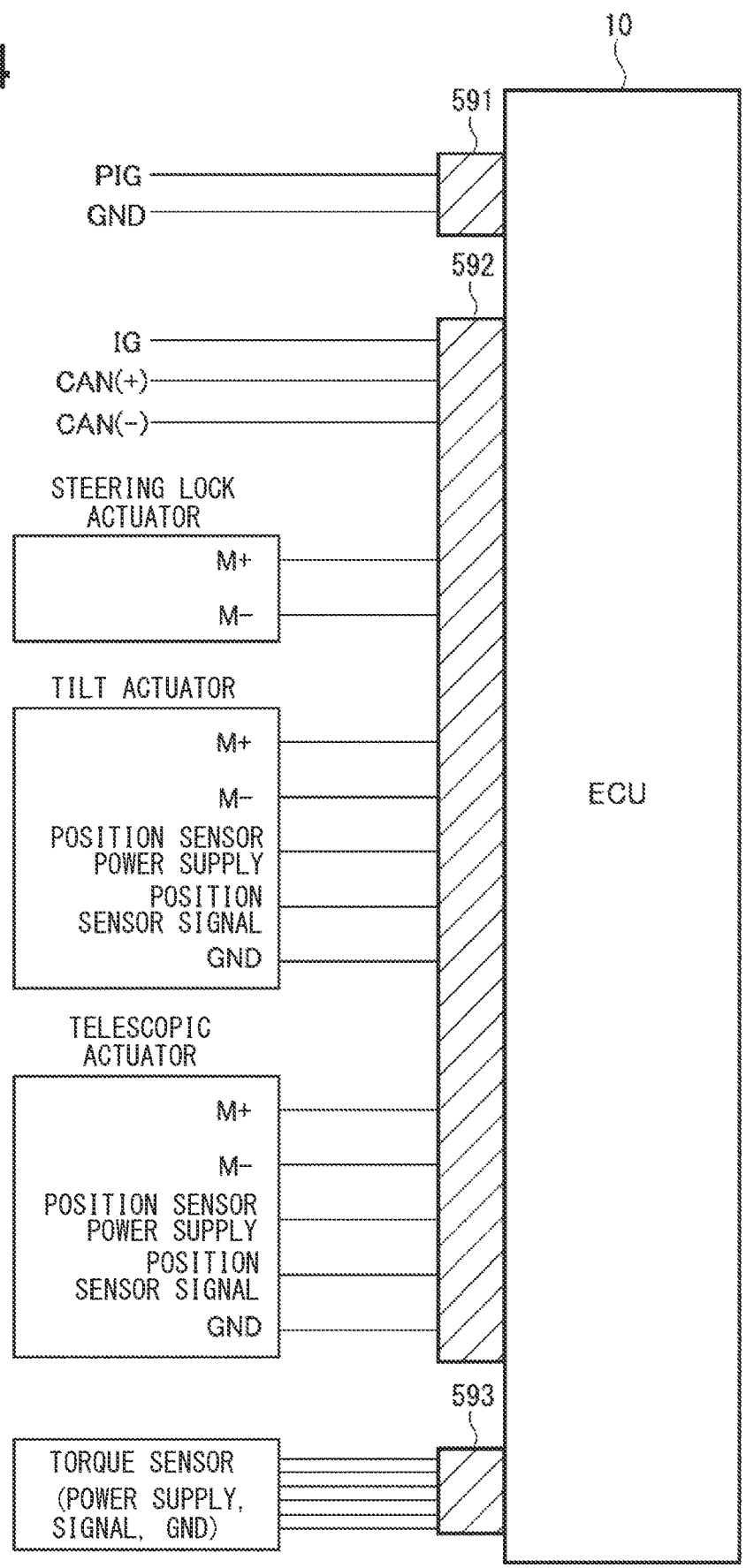
FIG. 4 is a diagram illustrating a connection configuration example of a connector.

FIG. 4 illustrates an example of a connector connection configuration. In this configuration example, a power system connector 591, a signal system connector 592, and a torque sensor connector 593 are provided separately. To the power system connector 591, a power supply line (PIG) from a DC power supply and a ground line are connected. To the signal system connector 592, the wiring of each of the DC motors 710, 720, 730 is connected in addition to a control power supply line (IG) and a CAN communication line.

Although motor lines (M+, M−) of each of the DC motors 710, 720, 730 are power systems, the motor lines can be included in the signal system connector 592 and connected because of having a motor current smaller than that of the three-phase motor 800. When the current of each of the DC motors 710, 720, 730 is large, another connector may be used, or a connector common to the power system connector 591 of the power supply line (PIG) from the DC power supply and the ground line may be used.

Two motor lines (M+, M−) are connected to the steering lock actuator 710. Five lines, which are motor lines (M+, M−), a position sensor power supply line, a position sensor signal line, and a ground line, are connected to each of the tilt actuator 720 and the telescopic actuator 730. It is also possible to make a configuration in which the position sensor is not used by determining that a predetermined position is reached based on torque or current and time, or applying a constant current or voltage in accordance with ON/OFF of the tilt switch 12 and the telescopic switch 13. FIG. 4 illustrates an example in which a signal is received from each of the tilt switch 12 and the telescopic switch 13 by CAN communication, but in a case where an analog voltage signal is received, the lines can be included in the signal system connector 592 and connected. The connector may be divided for each of the DC motors 710, 720, 730. A power supply line, a signal line, and a ground line of the torque sensor 94 are collectively connected to the torque sensor connector 593.

[Circuit Configuration in which One-System Three-Phase Motor is Driven]

Next, with reference to circuit configuration diagrams of FIGS. 5 to 14, a configuration example of the ECU 10 to drive the one-system three-phase motor 800 will be described as first to tenth embodiments. For the reference character of the ECU, "10" is used in all the embodiments regardless of the difference in configuration. Among the elements illustrated in each drawing, a portion except for the three-phase winding set 801 of the three-phase motor 800 and the DC motors 710, 720, 730 is the ECU 10.

First and second embodiments are basic configurations of the present disclosure. In particular, the first embodiment aims to disclose a minimum configuration in which only one three-phase motor 800 and one DC motor 710 are to be driven, and does not directly correspond to the system configuration in FIGS. 1 to 3B. The second embodiment in which one three-phase motor 800 and three DC motors 710, 720, 730 are to be driven directly corresponds to the system configuration in FIGS. 1 to 3B. In the third and subsequent embodiments, an applied configuration is added based on the configuration of the second embodiment.

First Embodiment

Figure 5:
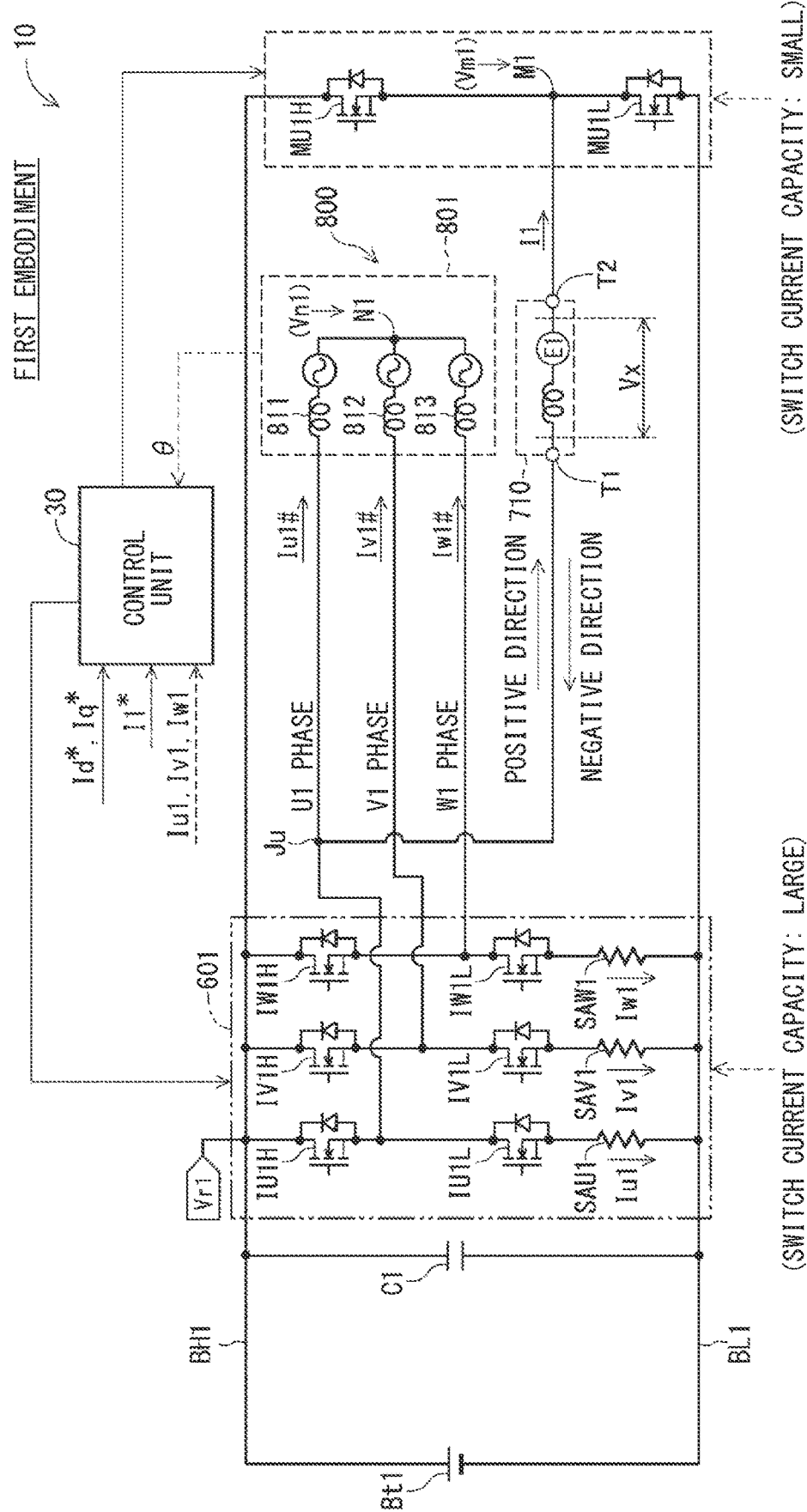
FIG. 5 is a circuit configuration diagram of a first embodiment (three-phase motor×1, DC motor×1)
Figure 43:
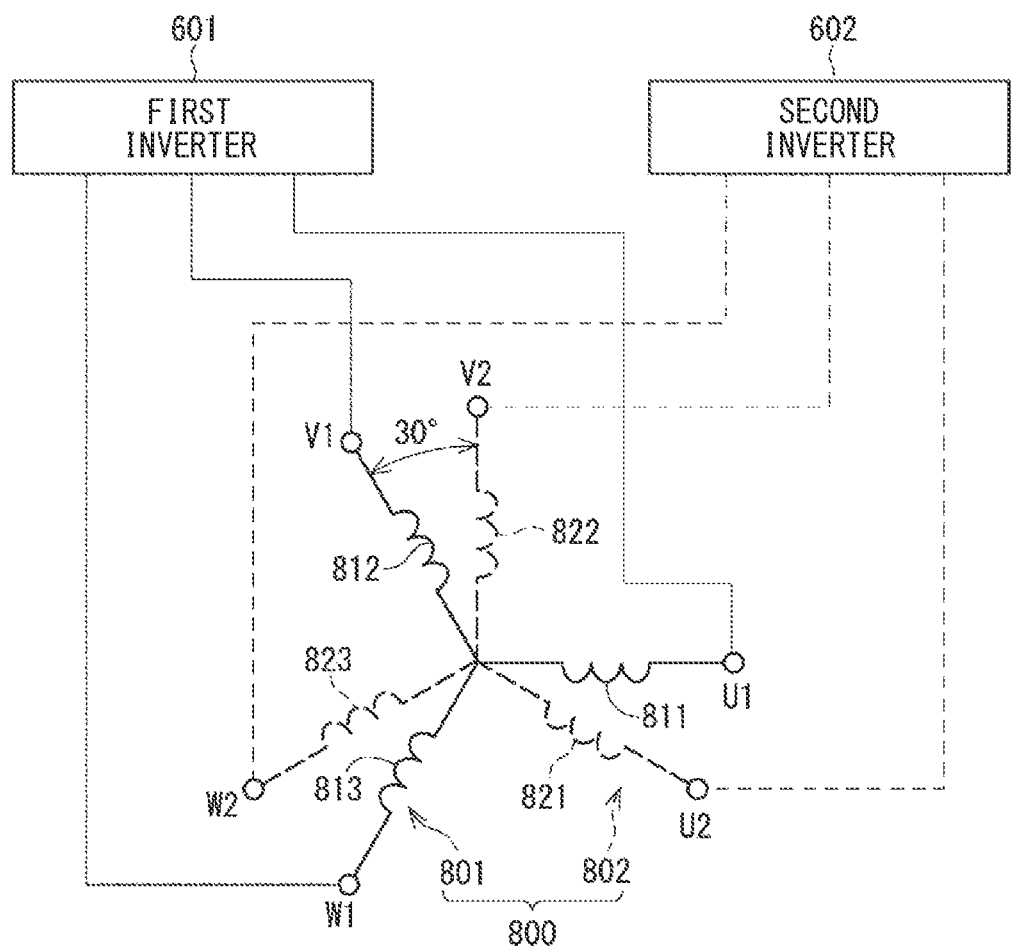
FIG. 43 is a schematic diagram illustrating a configuration of a three-phase double winding rotating machine.

FIG. 5 illustrates an overall configuration of the ECU 10 according to the first embodiment. The three-phase winding set 801 of the three-phase motor 800 is configured by connecting U1-phase, V1-phase, and W1-phase windings 811, 812, 813 at a neutral point N1. The voltage at the neutral point N1 is defined as a neutral point voltage Vn1. The reference character "800" of the three-phase motor and the reference characters "811, 812, 813" of the three-phase windings are illustrated only in FIG. 5 and are not illustrated in FIGS. 6 to 14. As illustrated in FIG. 43 related to the description of the two-system configuration to be described later, a counter-electromotive voltage proportional to the product of a rotational speed and a sin value of a phase is generated in each phase of the three-phase motor 800. An electrical angle θ of the three-phase motor 800 is detected by a rotational angle sensor.

The ECU 10 includes one inverter 601 as a "multiphase power converter", two DC motor switches MU1H, MU1L as "DC rotating machine switches", and a control unit 30. The inverter 601 is connected to a positive electrode of a power supply Bt1 via a high potential line BH1 and is connected to a negative electrode of the power supply Bt1 via a low potential line BL1. The power supply Bt1 is, for example, a battery having a reference voltage of 12 [V]. A DC voltage input from the power supply Bt1 to the inverter 601 is referred to as an "input voltage Vr1". On the power supply Bt1 side of the inverter 601, a capacitor C1 is provided between the high potential line BH1 and the low potential line BL1.

The inverter 601 converts DC power of the power supply Bt1 into three-phase AC power by operations of a plurality of inverter switching elements IU1H, IU1L, IV1H, IV1L, IW1H, IW1L on the high potential side and the low potential side, which are connected in a bridge configuration. The inverter 601 then applies a voltage to each of the phase windings 811, 812, 813 of the three-phase winding set 801.

Specifically, the inverter switching elements IU1H, IV1H, IW1H are upper arm elements provided on the high potential sides of the U1 phase, the V1 phase, and the W1 phase, respectively, and the inverter switching elements IU1L, IV1L, IW1L are lower arm elements provided on the low potential sides of the U1 phase, the V1 phase, and the W1 phase, respectively. Hereinafter, the reference characters of the upper arm elements and the lower arm elements of the same phases are collectively referred to as "IU1H/L, IV1H/L, IW1H/L". Each of switches used in the present embodiment, including the inverter switching elements IU1H/L, IV1H/L, IW1H/L, is a MOSFET, for example. Each of the switches may be a field-effect transistor in addition to the MOSFET, an insulated-gate bipolar transistor (IGBT), and the like.

Current sensors SAU1, SAV1, SAW1 that detect phase currents Iu1, Iv1, Iw1 flowing through the respective phases of the inverter 601 are installed between the lower arm elements IU1L, IV1L, IW1L of the respective phases and the low potential line BL1. The current sensors SAU1, SAV1, SAW1 are formed of, for example, shunt resistors. With respect to the phase currents Iu1, Iv1, Iw1 flowing through the inverter 601, phase currents that are applied through the three-phase winding set 801 are referred to as Iu1#, Iv1#, and Iw1#. The relationship between both phase currents will be described later.

A DC motor switch as a "DC rotating machine switch" is made up of a switch MU1H on a high potential side and a switch MU1L on a low potential side, which are connected in series via a DC motor terminal M1. Similarly to the inverter switching elements, the reference characters of the DC motor switches on the high potential side and the low potential side are collectively referred to as "MU1H/L". The DC motor switch MU1H/L except for that of the fifth embodiment is provided between the high potential line BH1 and the low potential line BL1 in parallel with the inverter 601 with respect to the power supply Bt1 common to the inverter 601.

A first terminal T1, which is one end of the DC motor 710, is connected to a branch point Ju of the U1-phase current path of the three-phase winding set 801. A second terminal T2, which is an end of the DC motor 710 on the opposite side to the first terminal T1, is connected to the DC motor terminal M1 of the DC motor switch MU1H/L. Therefore, the DC motor switch MU1H/L is connected to the U1 phase of the three-phase winding set 801 via the DC motor 710. "U" in the reference character "MU1H/L" of the DC motor switch means the U1 phase, and "1" means the first DC motor 710.

In the DC motor 710, the direction of the current flowing from the first terminal T1 to the second terminal T2 is defined as a positive direction, and the direction of the current flowing from the second terminal T2 to the first terminal T1 is defined as a negative direction. A voltage Vx is applied between the first terminal T1 and the second terminal T2. The DC motor 710 rotates forward when energized in the positive direction, and rotates backward when energized in the negative direction. At the time of energization of the DC motor 710, a counter-electromotive voltage E1 proportional to a rotational speed ω1 is generated. That is, when a proportionality constant is E, the counter-electromotive voltage E1 is expressed by a formula "$E1=-E\omega 1$". The reference characters "T1, T2" of the first terminal and the second terminal are illustrated only in FIG. 5 and are not illustrated in FIG. 6 and subsequent drawings.

The DC motor switch MU1H/L performs switching by duty control or the like to make a voltage Vm1 of the DC motor terminal M1 variable. Here, since the current that is applied to the DC motor 710 is smaller than the phase current flowing through the three-phase motor 800, a switch having a smaller current capacity than the inverter switching elements IU1H/L, IV1H/L, IW1H/L is used as the DC motor switch MU1H/L.

Adding a supplementary description of the circuit configuration of the present embodiment, in the configuration including the plurality of inverters and the plurality of three-phase winding sets, the second terminal of the DC motor is connected only to the DC motor switch and is not directly connected to a three-phase winding set different from the three-phase winding set to which the first terminal is connected. That is, an inverter switching element of an inverter different from the inverter to which the DC motor is connected does not also serve as a DC motor switch for the DC motor. In short, the DC motor switch is provided independently of the inverter switching element. With such a configuration, even when the inverter switching element is on, only the energization of the DC motor can be stopped by turning off the DC motor switch.

The control unit 30 acquires the electrical angle θ of the three-phase motor 800 and the three-phase currents Iu1, Iv1, Iw1. The control unit 30 controls the operations of the inverter switching elements IU1H/L, IV1H/L, IW1H/L and the DC motor switch MU1H/L on the basis of dq-axis current command values Id*, Iq* for the three-phase motor 800 and a DC current command value I1* for the DC motor 710. Details of the control configuration of the control unit 30 will be described later with reference to FIGS. 15 to 16B. In circuit configuration diagrams of FIG. 6 and subsequent drawings, illustration of the control unit 30 and input signals is omitted.

Second Embodiment

Figure 6:
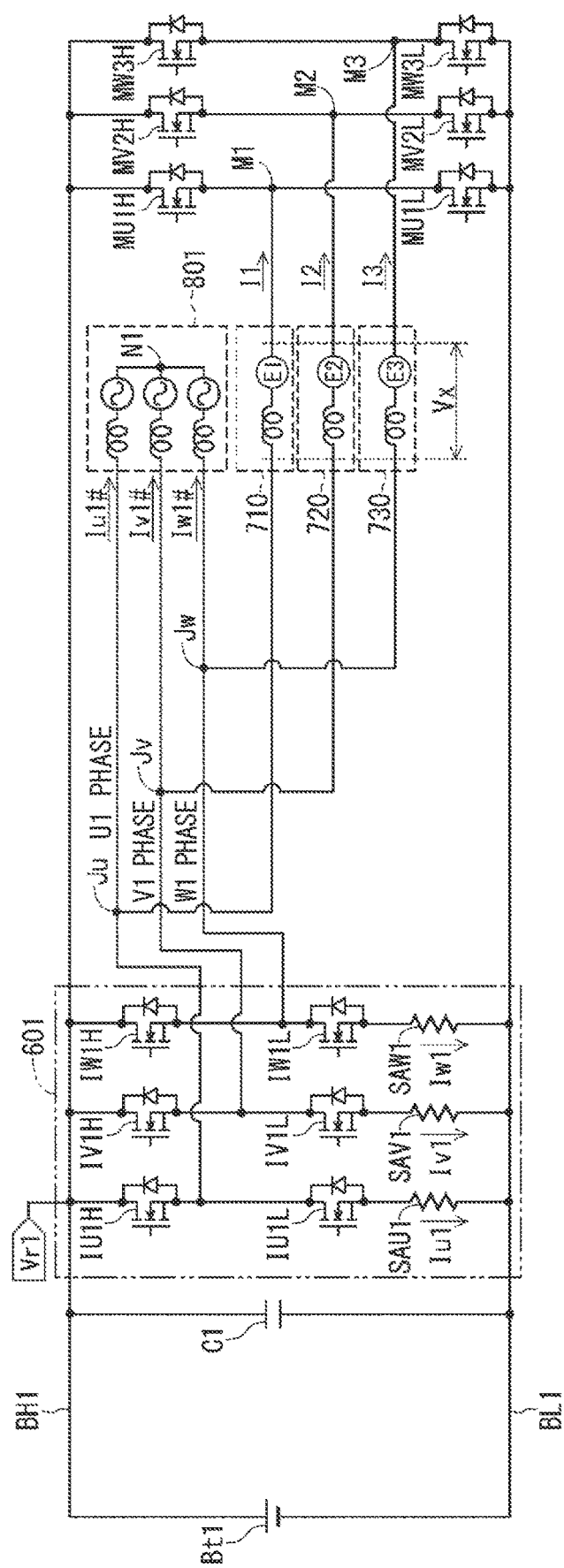
FIG. 6 is a circuit configuration diagram of a second embodiment (three-phase motor×1, DC motor×3)

In the second embodiment illustrated in FIG. 6, the three DC motors 710, 720, 730 are connected to the U1 phase, the V1 phase, and the W1 phase of the three-phase winding set 801. Here, the names of the DC motors will be described in accordance with the system configurations of FIGS. 1 to 3B. The first terminal of the steering lock actuator 710 is connected to the branch point Ju of the U1-phase current path of the three-phase winding set 801. The first terminal of the tilt actuator 720 is connected to a branch point Jv of the V1 phase current path of the three-phase winding set 801. The first terminal of the telescopic actuator 730 is connected to a branch point Jw of the W1-phase current path of the three-phase winding set 801.

In the second embodiment, three sets of DC motor switches MU1H/L, MV2H/L, MW3H/L are provided in accordance with the three DC motors 710, 720, 730. The second terminal of the steering lock actuator 710 is connected to the DC motor terminal M1 of the DC motor switch MU1H/L. The second terminal of the tilt actuator 720 is connected to a DC motor terminal M2 of the DC motor switch MV2H/L. The second terminal of the telescopic actuator 730 is connected to a DC motor terminal M3 of the DC motor switch MW3H/L.

"V" in the reference character "MV2H/L" of the DC motor switch means the V1 phase, and "2" means the second DC motor 720. "W" in the reference character "MW3H/L" means the W1 phase, and "3" means the third DC motor 730. The DC motor switches MU1H/L, MV2H/L, MW3H/L perform switching by duty control or the like to make voltages Vm1, Vm2, Vm3 of the DC motor terminals M1, M2, M3 variable.

Hereinafter, one DC motor selected as an energization target among one or more DC motors is referred to as a "specific DC motor". The ECU 10 can energize the "specific DC motor" simultaneously with energizing the three-phase motor 800. The DC current that is applied to the DC motor 710, 720, or 730 selected as the specific DC motor is referred to as I1, I2, or I3. The DC motors 710, 720, 730 rotate forward or backward in accordance with the positive or negative of the DC currents I1, I2, I3. At the time of energization of the specific DC motor, a counter-electromotive voltage proportional to the rotational speed is generated. The counter-electromotive voltages generated in the DC motors 710, 720, 730 are referred to as E1, E2, and E3, respectively.

Hereinafter, in the second to fifteenth embodiments, a plurality of, two to six, DC motors are connected to the three-phase winding sets 801, 802. In the present embodiment, the number of DC motors connected to one phase of each of the three-phase winding sets 801, 802 is one or less. That is, three or less DC motors can be connected to the three-phase winding set, and N or less DC motors can be connected to the N-phase winding set. In a configuration where a plurality of DC motors are connected, (A) a plurality of DC motors are connected to a plurality of phases of one three-phase winding set 801, or (B) a plurality of DC motors in total are connected to one or more phases of each of the plurality of three-phase winding sets 801, 802. Among the second to fifteenth embodiments, embodiments except for the twelfth embodiment correspond to the example of (A), and the twelfth to fifteenth embodiments correspond to the example of (B).

Third Embodiment

Figure 7:
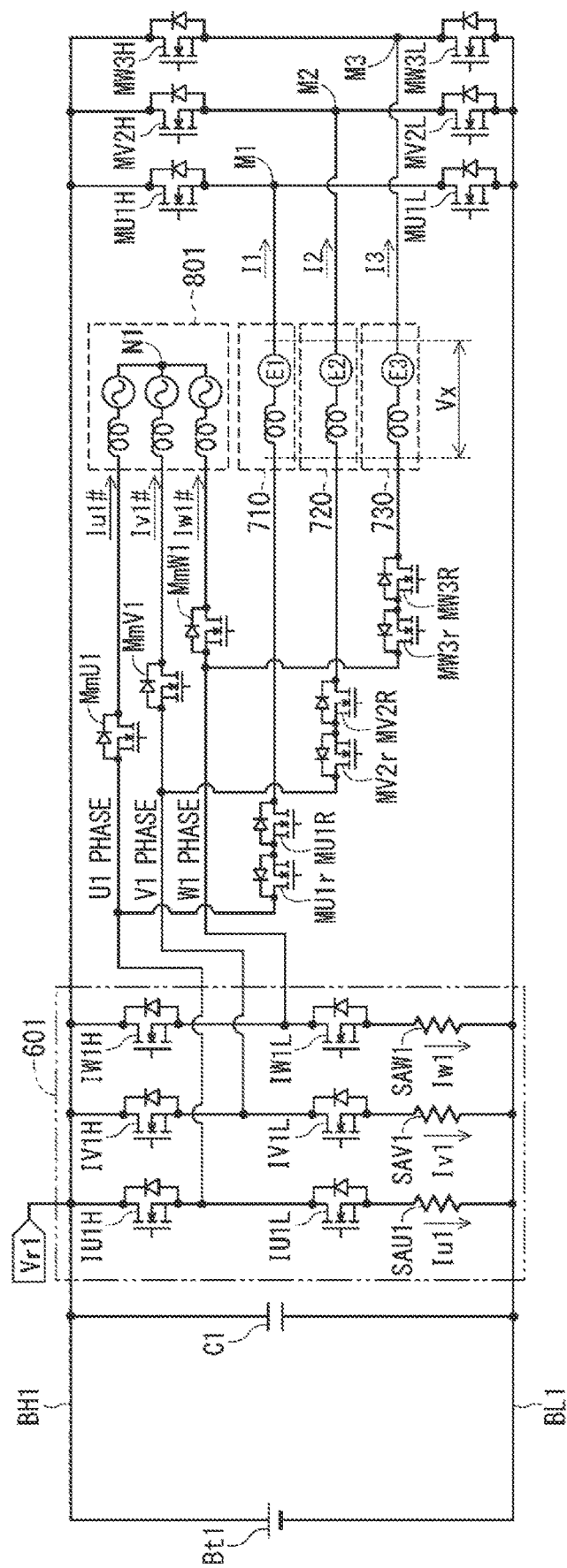
FIG. 7 is a circuit configuration diagram of a third embodiment (three-phase motor relay and DC motor relay being present)

In the third embodiment illustrated in FIG. 7, as compared to the second embodiment, three-phase motor relays MmU1, MmV1, MmW1 and DC motor relays MU1r, MU1R, MV2r, MV2R, MW3r, MW3R are further included. Each motor relay is formed of a semiconductor switching element, a mechanical relay, or the like. In each of the embodiments illustrated in FIG. 7 and subsequent drawings, each motor relay is formed of a metal-oxide-semiconductor field-effect transistor (MOSFET) having a parasitic diode.

The three-phase motor relays MmU1, MmV1, MmW1 are provided in the respective phase current paths between the inverter 601 and the three-phase winding set 801. Specifically, in the U1, V1, and W1 phases to which the DC motors 710, 720, 730 are connected, the three-phase motor relays MmU1, MmV1, MmW1 are provided closer to the three-phase motor 800 than the branch points Ju, Jv, Jw to the DC motors 710, 720, 730 in the respective phase current paths.

For example, when energizing the three-phase motor 800, the control unit 30 turns on the three-phase motor relays MmU1, MmV1, MmW1. On the other hand, when not energizing the three-phase motor 800, the control unit 30 turns off the three-phase motor relays MmU1, MmV1, MmW1. When being off, the three-phase motor relays MmU1, MmV1, MmW1 can interrupt a current from the three-phase motor 800 to the inverter 601, that is, a current caused by the counter-electromotive force. In addition, for example, even when the inverter switching element IU1H has a short-circuit failure, the current flowing from the three-phase motor 800 to the inverter 601 can be interrupted by the counter-electromotive voltage.

The DC motor relays MU1r, MU1R, MV2r, MV2R, MW3r, MW3R are provided closer to the DC motors 710, 720, 730 than the branch points Ju, Jv, Jw of the respective phase current paths. Here, the DC motor relays MU1r, MV2r, MW3r that interrupt the current in the positive direction when turned off are referred to as "positive-direction DC motor relays", and the DC motor relays MU1R, MV2R, MW3R that interrupt the current in the negative direction when turned off are referred to as "negative-direction DC motor relays".

In the example of FIG. 7, the positive-direction DC motor relays MU1r, MV2r, MW3r are connected in series on the sides of the branch points Ju, Jv, Jw, and the negative-direction DC motor relays MU1R, MV2R, MW3R are connected in series on the sides of the DC motors 710, 720, 730 such that the source terminals of the MOSFETs are adjacent to each other. The reference characters of the positive-direction motor relay MU1r and the negative-direction motor relay MU1R connected in series to the DC motor 710 are collectively referred to as "MU1r/R". Similarly, the reference characters of the motor relays in both the positive and negative directions connected in series to the DC motors 720, 730 are referred to as "MV2r/R" and "MW3r/R", respectively.

In the third embodiment, it is possible to switch between energization and interruption of the DC motors 710, 720, 730 by using the DC motor relays MU1r/R, MV2r/R, MW3r/R in addition to the DC motor switches MU1H/L, MV2H/L, MW3H/L. For example, even when the DC motor switch MU1H on the high potential side of the DC motor 710 has a short-circuit failure, the DC motor relay MU1r/R can be turned off to safely stop the DC motor 710.

(Power Supply Relay and Noise Prevention Element)

The ECU 10 according to each of the following fourth to tenth embodiments further includes a power supply relay and a noise prevention element. The power supply relay is formed of a semiconductor switching element, a mechanical relay, or the like, and can interrupt energization from the power supply Bt1 to a load when the power supply relay is turned off. For example, in a case where the power supply relay is formed of a MOSFET, a current flows in one direction even when the power supply relay is off in accordance with the direction of the parasitic diode, and hence it is necessary to distinguish in which direction the current can be interrupted.

In the present specification, a direction in which a current flows when the electrode of the power supply Bt1 is connected in a normal direction is referred to as a positive direction, and a power supply relay that interrupts a current in the positive direction when turned off is referred to as a "power supply relay in the positive direction". A direction in which a current flows when the electrode of the power supply Bt1 is connected in a direction opposite to the normal direction is referred to as a negative direction, and a power supply relay that interrupts a current in the negative direction when turned off is referred to as a "negative-direction power supply relay". The power supply relay in the negative direction is generally referred to as a "reverse connection prevention relay" or a "reverse connection protection relay", but in the present specification, the power supply relay is referred to as a "negative-direction power supply relay" in order to unify terms with the DC motor relay in the positive and negative directions.

The reference character of the positive-direction power supply relay provided in the current path from the power supply Bt1 to the inverter 601 is referred to as "P1r", and the reference character of the negative-direction power supply relay is referred to as "P1R". In general, the positive-direction power supply relay P1r is connected in series on the power supply Bt1 side, and the negative-direction power supply relay P1R is connected in series on the inverter 601 side. The reference characters of the positive-direction power supply relay P1r and the negative-direction power supply relay P1R connected in series are collectively referred to as "P1r/R". In the configuration where the other power supply relays are provided in the current paths from the power supply Bt1 to the DC motor switches MU1H/L, MV2H/L, MW3H/L, the reference characters of the other positive-direction power supply relay and the other negative-direction power supply relay are referred to as "Pdr", "PdR", respectively, and are collectively referred to as "Pdr/R".

The noise prevention element is a coil and a capacitor that function as a noise filter. The reference characters of the noise prevention elements provided in the input units of the inverter 601 are referred to as "L1" and "C1". In a configuration where the input units of the DC motor switches MU1H/L, MV2H/L, MW3H/L are provided with other noise prevention elements, the reference characters of the other noise prevention elements are referred to as "Ld" and "Cd".

Fourth Embodiment

Figure 8:
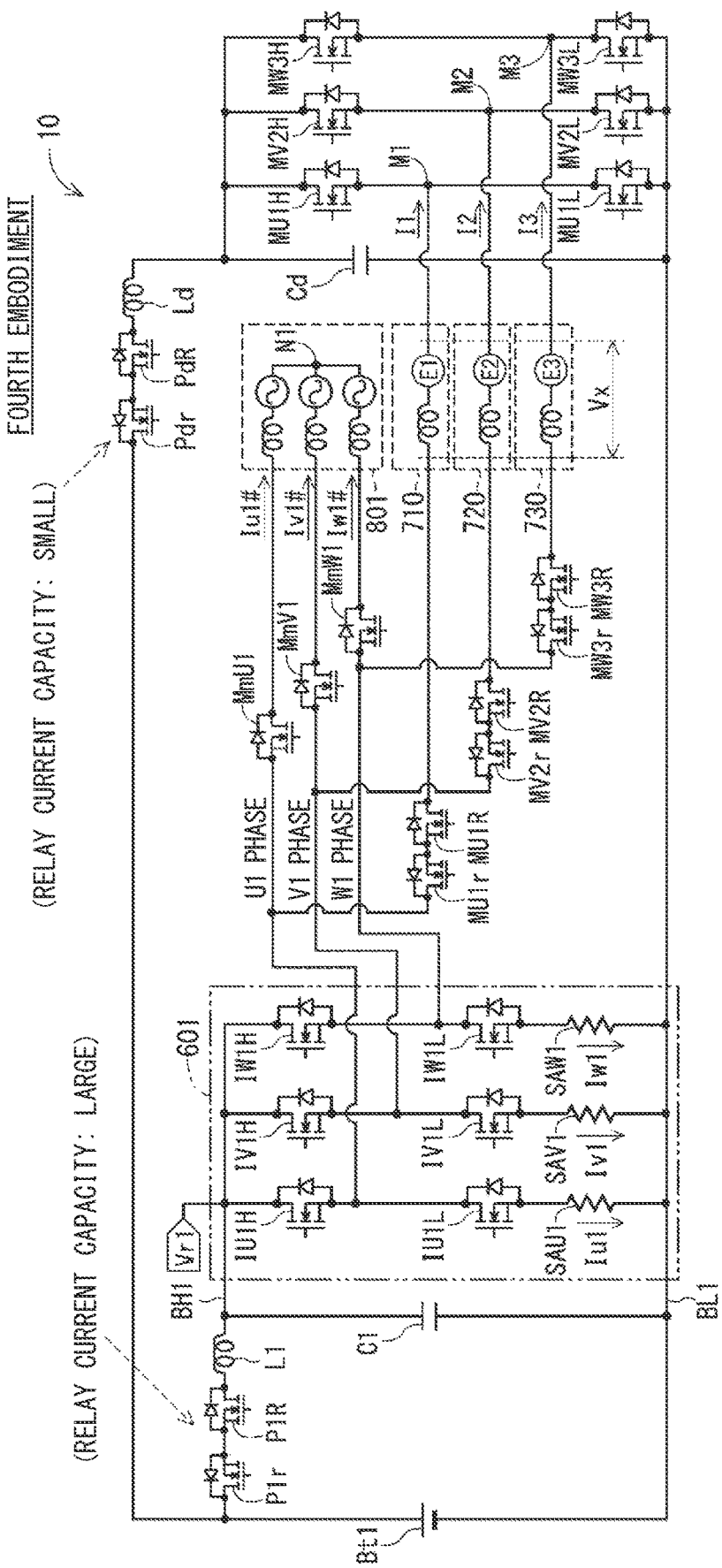
FIG. 8 is a circuit configuration diagram of a fourth embodiment (individual power supply relays and individual noise prevention elements)

In the fourth embodiment illustrated in FIG. 8, a power supply relay in both positive and negative directions, and a coil and a capacitor as a noise prevention element are individually provided for the inverter 601 and the DC motor switches MU1H/L, MV2H/L, MW3H/L. That is, the power supply relay P1r/R, the coil L1, and the capacitor C1 are provided between the power supply Bt1 and the inverter 601. The power supply relay Pdr/R, the coil Ld, and the capacitor Cd are provided between the power supply Bt1 and the DC motor switches MU1H/L, MV2H/L, MW3H/L.

The power supply relay Pdr/R on the DC motor switch side interrupts energization from the power supply Bt1 to the DC motors 710, 720, 730, and the power supply relay P1r/R on the inverter side interrupts energization from the power supply Bt1 to the three-phase motor 800. Here, since the current that is applied to each of the DC motors 710, 720, 730 is smaller than the phase current flowing through the three-phase motor 800, a switch having a current capacity smaller than that of the power supply relay P1r/R on the inverter side is used as the power supply relay Pdr/R on the DC motor switch side.

Fifth Embodiment

Figure 9:
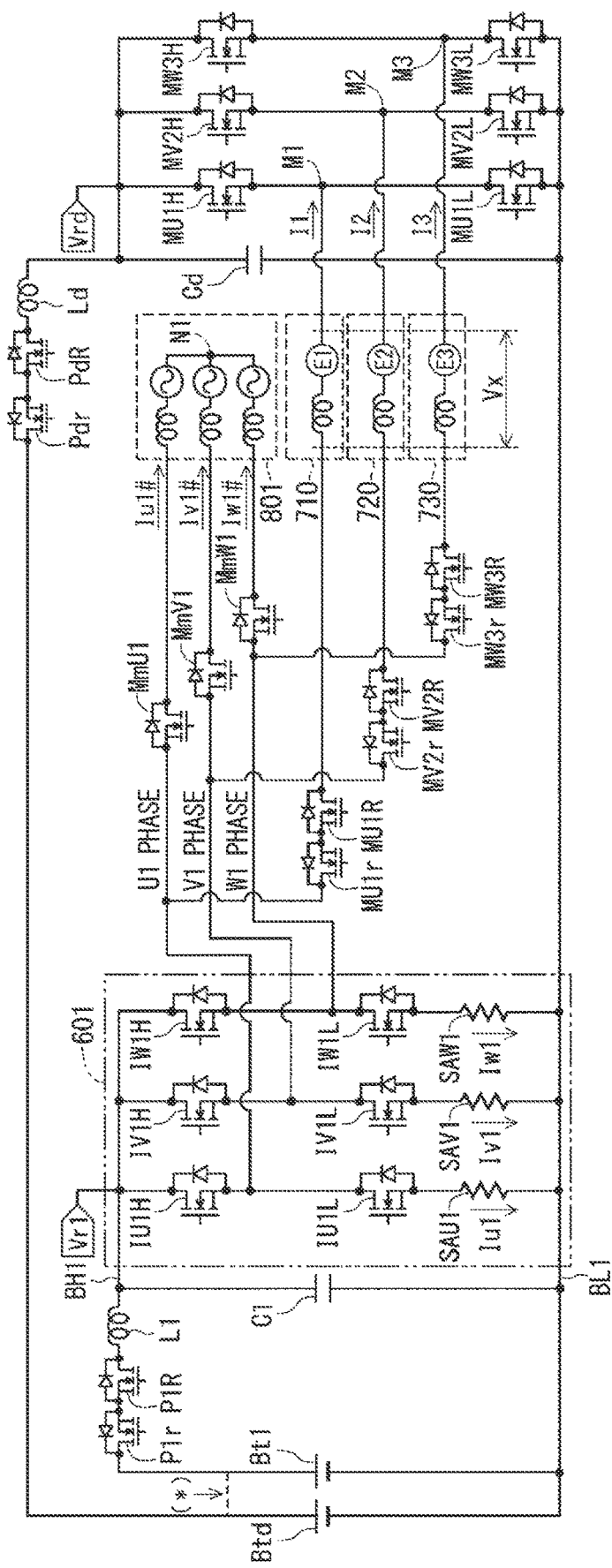
FIG. 9 is a circuit configuration diagram of a fifth embodiment (individual power supplies)

The fifth embodiment illustrated in FIG. 9 is different from the fourth embodiment in the connection configuration of the power supply. In the fifth embodiment, the inverter 601 and the DC motor switches MU1H/L, MV2H/L, MW3H/L are connected to the individual power supplies Bt1, Btd. The DC voltage input from the power supply Btd to each of the DC motor switches MU1H/L, MV2H/L, MW3H/L is referred to as an "input voltage Vrd". The individual power supplies Bt1, Btd may be branched from an original common power supply via another wiring or fuse.

A broken line between the positive electrode of the power supply Bt1 and the positive electrode of the power supply Btd indicated by a mark (*) in FIG. 9 indicates that the two power supplies Bt1, Btd are connected to the original common power supply. With this configuration, the influence of power supply noise, power supply voltage fluctuation, and the like can be prevented or isolated between the power supplies.

Sixth and Seventh Embodiments

Figure 10:
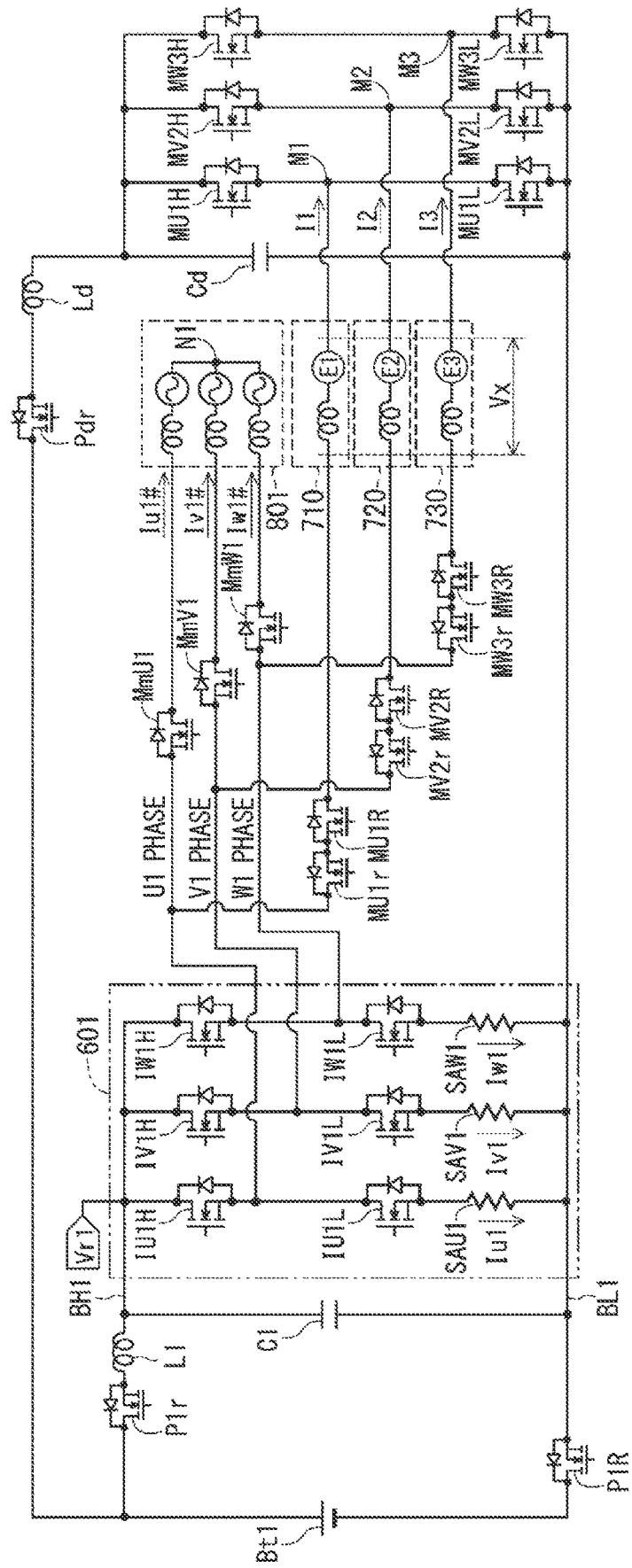
FIG. 10 is a circuit configuration diagram of a sixth embodiment (individual power supply relays and common negative-direction power supply relay)
Figure 11:
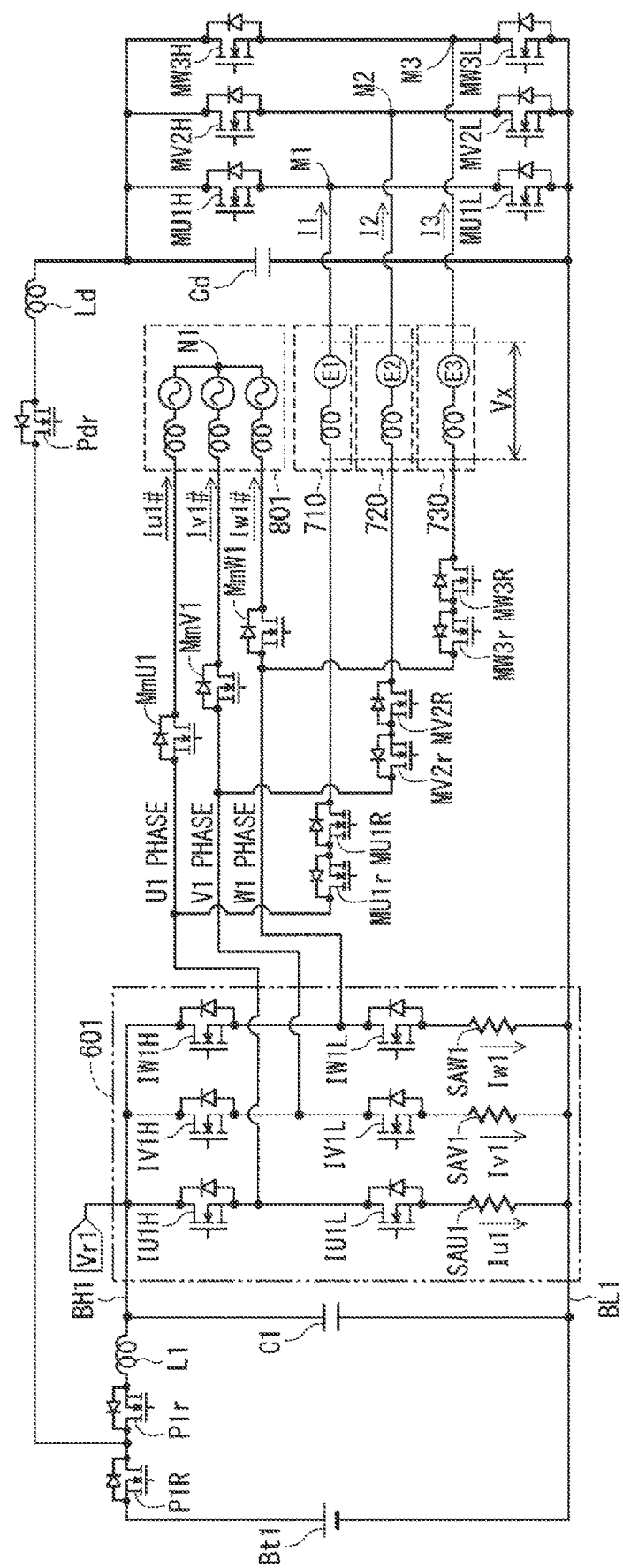
FIG. 11 is a circuit configuration diagram of a seventh embodiment (individual power supply relays and common negative-direction power supply relay)

In the sixth and seventh embodiments illustrated in FIGS. 10 and 11, similarly to the fourth embodiment, the positive-direction power supply relay and the noise prevention element are individually provided for the inverter 601 and the DC motor switches MU1H/L, MV2H/L, MW3H/L. However, a negative-direction power supply relay PR1 is provided in common with the inverter 601 and the DC motor switches MU1H/L, MV2H/L, MW3H/L. The common negative-direction power supply relay P1R is provided on the negative electrode side of the power supply Bt1 in the sixth embodiment and is provided on the positive electrode side of the power supply Bt1 in the seventh embodiment. As thus described, the positive-direction power supply relays P1r, Pdr and the negative-direction power supply relay P1R may have different arrangement configurations.

Eighth Embodiment

Figure 12:
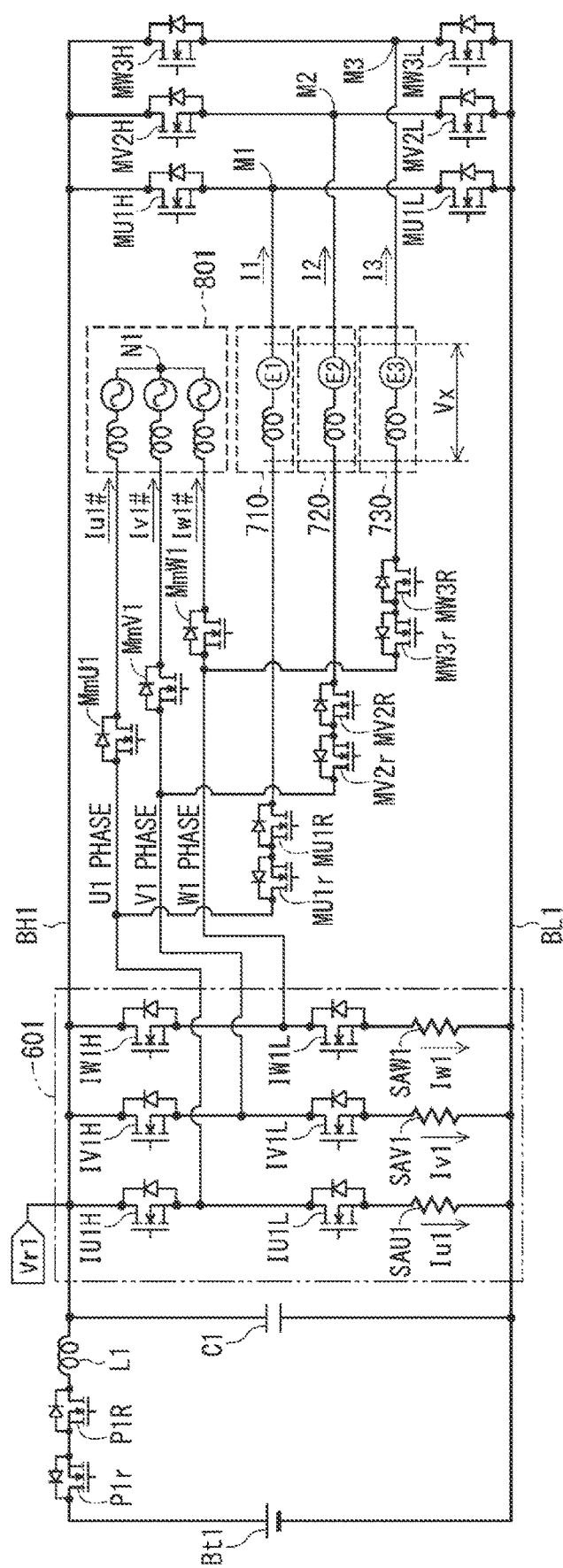
FIG. 12 is a circuit configuration diagram of an eighth embodiment (common power supply relays and common noise prevention element)

In an eighth embodiment illustrated in FIG. 12, as compared to the fourth embodiment, the power supply relay P1r/R in both positive and negative directions, and the coil L1 and the capacitor C1 as the noise prevention elements are provided in common for the inverter 601 and the DC motor switches MU1H/L, MV2H/L, MW3H/L. With this configuration, the number of elements can be reduced.

Ninth Embodiment

Figure 13:
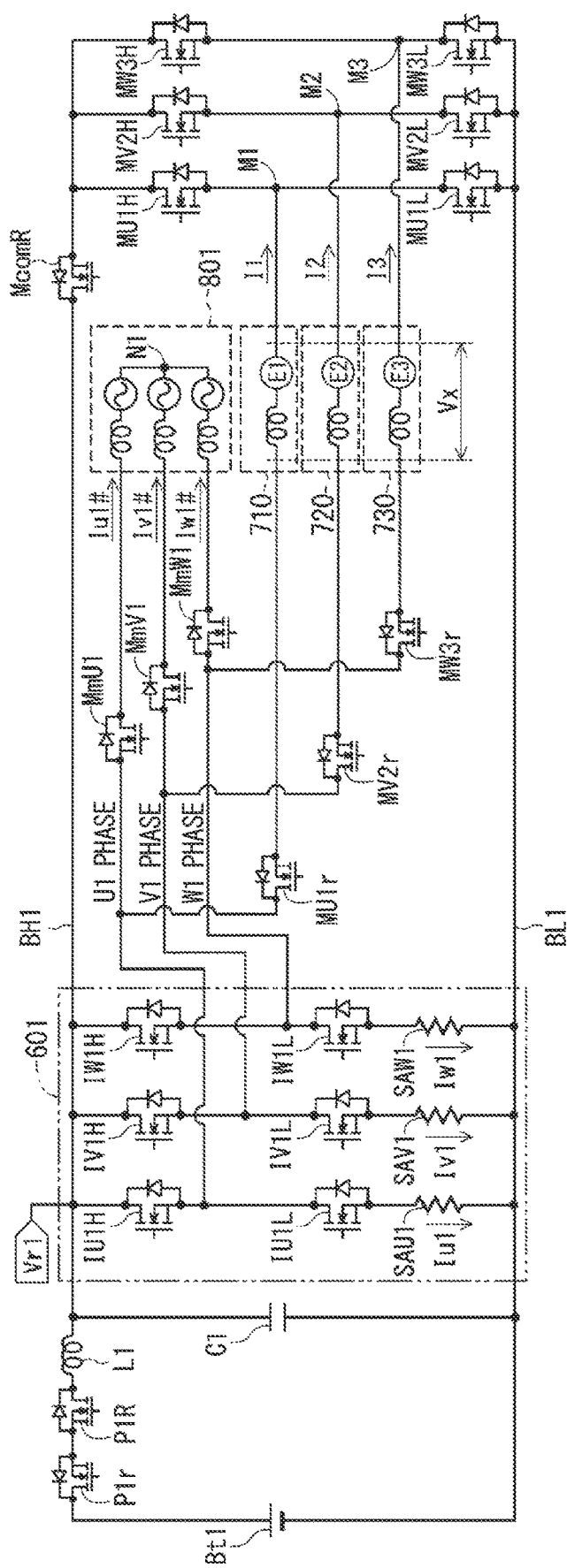
FIG. 13 is a circuit configuration diagram of a ninth embodiment (common DC motor relay at the time of energization in a negative direction)

In the ninth embodiment illustrated in FIG. 13, as compared to the eighth embodiment, a common negative-direction relay McomR is provided on the high potential line BH1 instead of eliminating the negative-direction DC motor relays MU1R, MV2R, MW3R. The common negative-direction relay McomR can interrupt the current flowing in the negative direction of the DC motors 710, 720, 730 at the time of turning-off. With this configuration, the number of negative-direction relays can be reduced.

Tenth Embodiment

Figure 14:
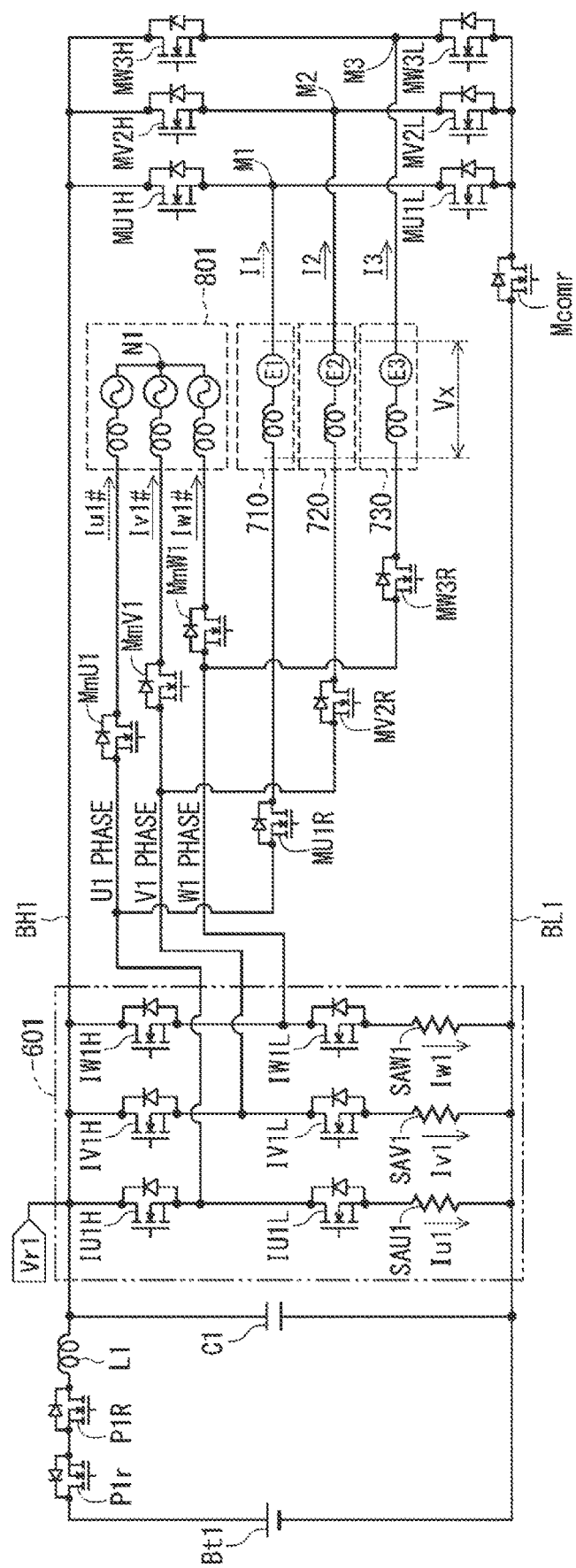
FIG. 14 is a circuit configuration diagram of a tenth embodiment (common DC motor relay at the time of energization in a positive direction)

In the tenth embodiment illustrated in FIG. 14, as compared to the eighth embodiment, a common positive-direction relay Mcomr is provided on the low potential line BL1 instead of the positive-direction DC motor relays MU1r, MV2r, MW3r. The common positive-direction relay Mcomr can interrupt the current flowing in the positive direction of each of the DC motors 710, 720, 730 at the time of turning-off. With this configuration, the number of positive-direction relays can be reduced.

[Control Configuration of ECU]

Next, the control configuration of the ECU 10 will be described. In the description of this portion, the third to eighth embodiments of the above embodiments are mainly assumed in which the three DC motors 710, 720, 730 are driven, and the three-phase motor relays MmU1, MmV1, MmW1 and the DC motor relays MU1r/R, MV2r/R, MW3r/R are provided.

Figure 15:
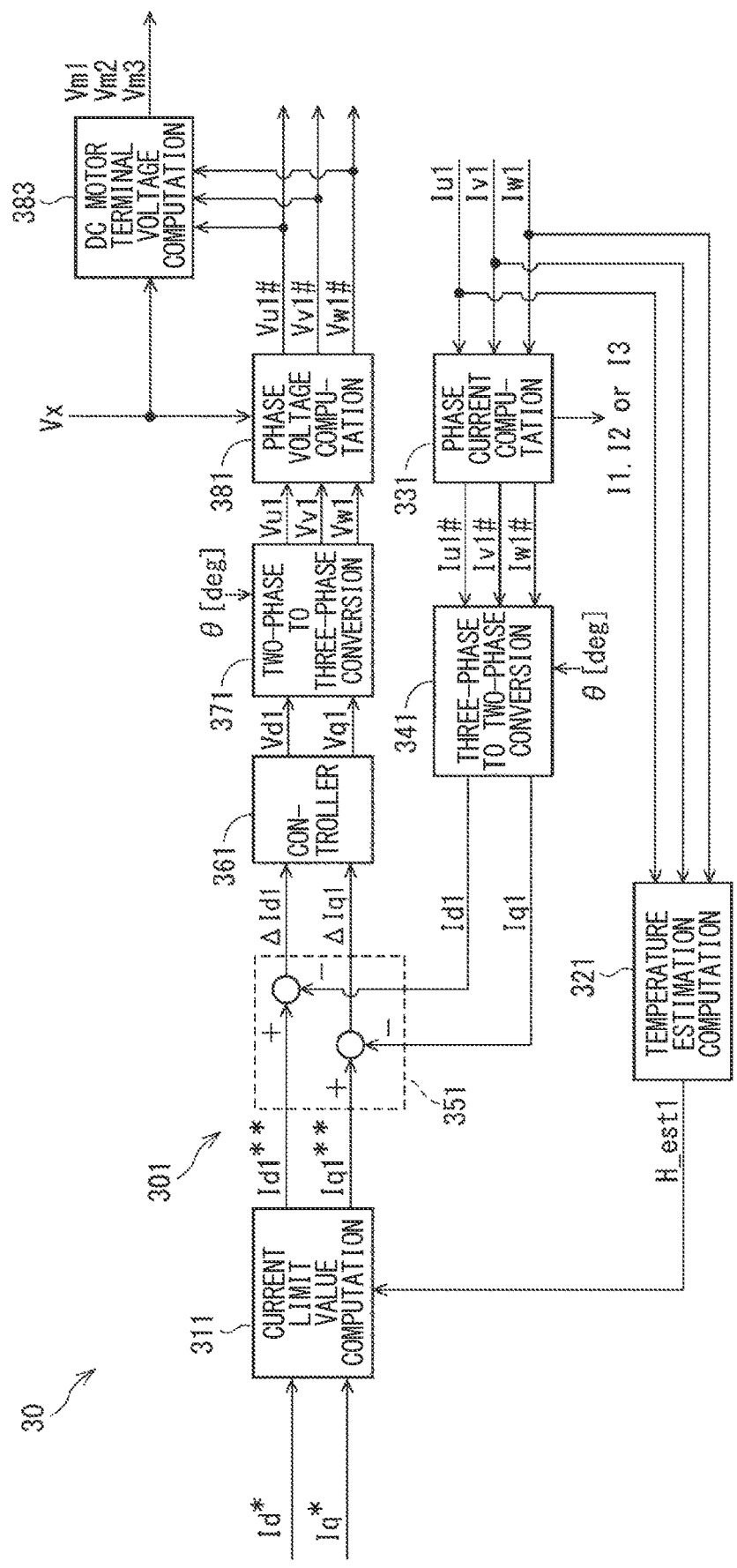
FIG. 15 is a control block diagram of a three-phase control unit.

A detailed configuration of the control unit 30 will be described with reference to FIGS. 15 to 16B. The control unit 30 is made up of a microcomputer, a drive circuit, and the like and includes a central processing unit (CPU), a read-only memory (ROM), a random-access memory (RAM), an input/output (I/O) (not illustrated), and a bus line connecting these constituent elements, and the like. The control unit 30 executes control by software processing performed by the CPU executing a program stored in advance in a tangible memory device (i.e., a readable non-transitory tangible recording medium) such as a ROM or hardware processing performed by a dedicated electronic circuit.

The control unit 30 controls the operations of the inverter switching elements IU1H/L, IV1H/L, IW1H/L and the DC motor switches MU1H/L, MV2H/L, MW3H/L and the opening and closing of the DC motor relays MU1r/R, MV2r/R, MW3r/R and the three-phase motor relays MmU1, MmV1, MmW1.

The control unit 30 includes a three-phase control unit 301 and a DC control unit 40. As illustrated in FIG. 15, the three-phase control unit 301 includes a current limit value computation unit 311, a temperature estimation computation unit 321, a phase current computation unit 331, a three-phase to two-phase conversion unit 341, a current deviation computing device 351, a controller 361, a two-phase to three-phase conversion unit 371, a phase voltage computation unit 381, and a DC motor terminal voltage computation unit 383.

The three-phase control unit 301 receives the dq-axis current command values Id*, Iq* computed on the basis of the steering torque Ts detected by the torque sensor 94. The current limit value computation unit 311 computes dq-axis current command values Id1, Iq1 after current limitation on the basis of dq-axis current command values Id*, Iq* and an estimated temperature H_est1. In order to prevent the temperatures of the inverter switching elements IU1H/L, IV1H/L, IW1H/L and the like from exceeding a heat-resistant temperature due to a temperature rise, a current limit value is set lower as the estimated temperature H_est1 is higher.

On the basis of the phase currents Iu1, Iv1, Iw1, the temperature estimation computation unit 321 computes a rising temperature caused by energization from the product ($I^2R$) of a current square value and resistance and estimates the substrate temperature of the inverter 601. Generally, in the three-phase motor control, the rising temperature is computed on the basis of a dq-axis current after coordinate conversion. However, in the present embodiment, with the specific DC motor being also energized, the rising temperature is computed on the basis of a current corresponding to a portion where the temperature is estimated. For example, the electric circuit performs estimation based on the phase currents Iu1, Iv1, Iw1, and the coil performs estimation based on the power supply current computed on the basis of the phase currents Iu1, Iv1, Iw1. A phase current before the current to be applied is subtracted needs to be used as the temperature of the motor, and hence a configuration different from general three-phase motor control is adopted.

On the basis of the phase currents Iu1, Iv1, Iw1 flowing through the inverter 601, the phase current computation unit 331 computes the motor phase currents Iu1#, Iv1#, Iw1# that are applied to the three-phase winding set 801 and the DC currents I1, I2, or I3 that is applied to the specific DC motor.

The motor phase currents Iu1#, Iv1#, Iw1# are output to the three-phase to two-phase conversion unit 341. The DC current I1, I2, or I3 computed by the phase current computation unit 331 is output to the DC control unit 40. Details of the phase current computation will be described later with reference to FIG. 18 and the like.

The three-phase to two-phase conversion unit 341 performs coordinate conversion on the motor phase currents Iu1#, Iv1#, Iw1# by using the electrical angle θ and feeds back dq-axis currents Id1, Iq1 to the current deviation computing device 351. The current deviation computing device 351 subtracts the dq-axis currents Id1, Iq1 from the dq-axis current command values Id1, Iq1 to compute current deviations ΔId1, ΔIq1. The controller 361 computes dq-axis voltage commands Vd1, Vq1 by proportional-integral (PI) control or the like so as to bring the current deviations ΔId1, ΔIq1 close to 0. The two-phase to three-phase conversion unit 371 performs coordinate conversion on dq-axis voltage commands Vd1, Vq1 by using the electrical angle θ to compute three-phase voltage commands Vu1, Vv1, Vw1.

The phase voltage computation unit 381 computes controlled phase voltages Vu1#, Vv1#, Vw1# on the basis of the three-phase voltage commands Vu1, Vv1, Vw1 and a DC motor applied voltage Vx input from the DC control unit 40. The DC motor terminal voltage computation unit 383 computes the DC motor terminal voltages Vm1, Vm2, Vm3 on the basis of the controlled phase voltages Vu1#, Vv1#, Vw1# and the DC motor applied voltage Vx. Details of the phase voltage computation and the DC motor terminal voltage computation will be described later with reference to FIGS. 19 to 24 and the like.

Figure 16A:
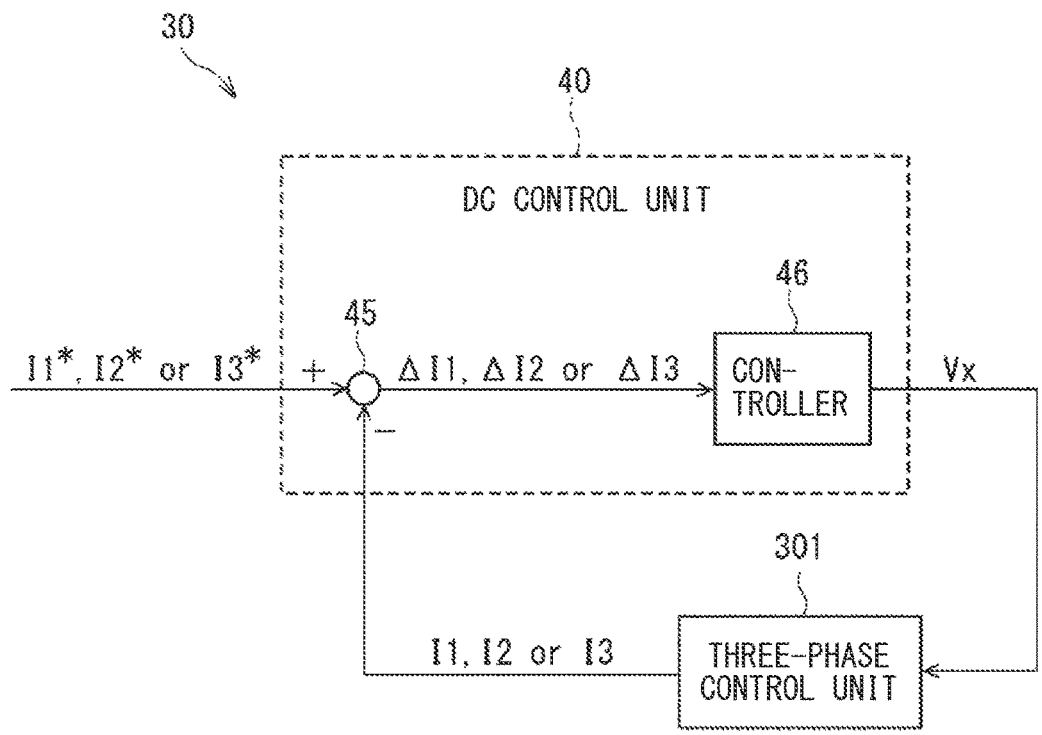
FIG. 16A is a control block diagram of an example of a DC control unit.
Figure 16B:
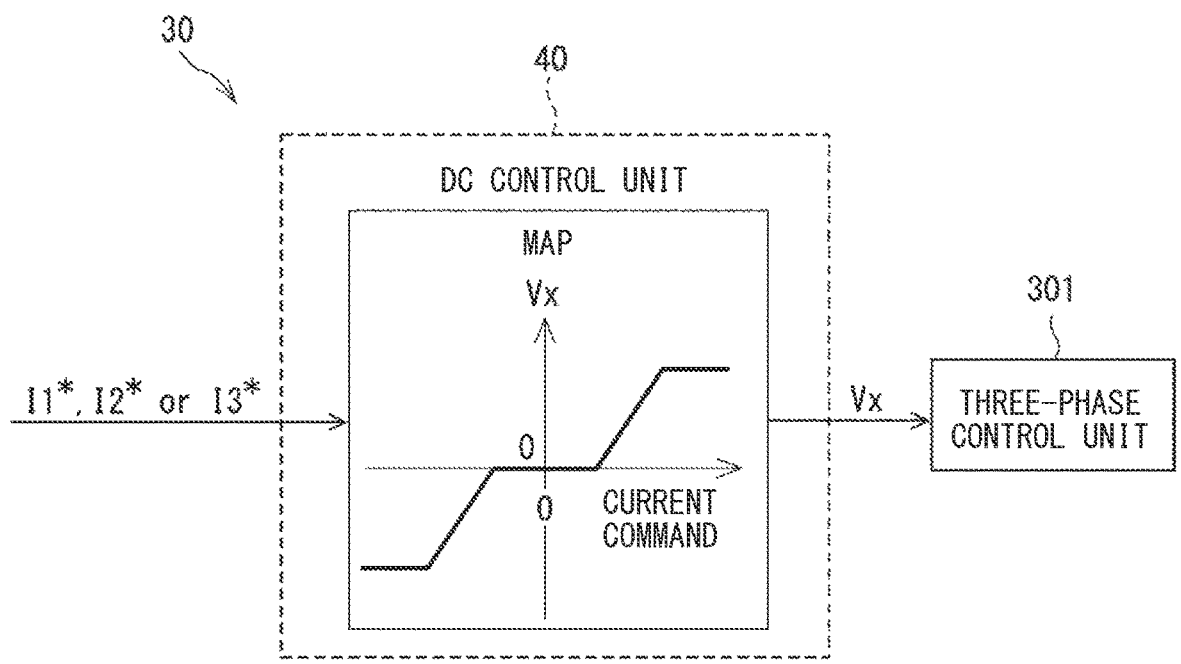
FIG. 16B is a control block diagram of another example of the DC control unit.

As illustrated in FIG. 16A, the DC control unit 40 includes a current deviation computing device 45 and a controller 46. The current deviation computing device 45 subtracts the DC current I1, I2, or I3 computed by the phase current computation unit 331 from the DC current command value I1*, I2*, or I3* for the specific DC motor to compute a current deviation ΔI1, ΔI2, or ΔI3. The controller 46 computes the voltage Vx applied to the DC motor by PI control or the like such that the current deviation ΔI1, ΔI2, or ΔI3 approaches 0, and outputs the voltage Vx to the phase voltage computation unit 381 of the three-phase control unit 301. The applied voltage Vx may be set independently for each DC motor, but for convenience, the symbol "Vx" is used in common for all DC motors. As illustrated in FIG. 16B, the voltage Vx that is applied to the DC motor may be computed by map computation or the like from the DC current command value I1*, I2*, or I3* without computating a current deviation.

Next, the overall operation of the ECU 10 will be described with reference to a flowchart of FIG. 17. In the following description of the flowchart, the symbol "S" indicates a step. The substantially same step as that in the previous flowchart is denoted by the same step number, and the description thereof is omitted. The routine of FIG. 17 starts by turning on the vehicle switch 11. S01 will be described in second and subsequent rounds of the routine. In a first round after the start, that is, in a first routine, the determination is NO in S01, and the processing proceeds to S11.

In the first routine, the determination is YES in S11, and the processing proceeds to S12. In S12, the control unit 30 drives the tilt actuator 720 and the telescopic actuator 730 to move the tilt and the telescopic to stored positions. Further, the control unit 30 drives the steering lock actuator 710 in S13 to release the steering lock. In the second and subsequent rounds of the routine, the determination is NO in S11, and S12 and S13 are skipped.

In S14, the control unit 30 turns on the three-phase motor relays MmU1, MmV1, MmW1 and the DC motor relays MU1r/R, MV2r/R, MW3r/R to make the three-phase motor 800 or the DC motors 710, 720, 730 drivable in response to a torque request.

Steps S15 to S23 are steps of selecting one specific DC motor among the three DC motors 710, 720, 730. In S15, the control unit 30 determines whether an absolute value |Ts| of the steering torque is less than a torque threshold Ts_th (e.g., 5 [Nm]). Here, the steering torque Ts is defined, for example, such that the left rotation direction is positive and the right rotation direction is negative in accordance with the direction of the torque applied to the steering wheel 91. Since there is basically no difference in characteristics depending on the rotation direction, the absolute value |Ts| of the steering torque includes the steering torque Ts in each direction and is compared with the torque threshold Ts_th.

When the absolute value |Ts| of the steering torque is equal to or larger than the torque threshold Ts_th, that is, during steering by the driver, the determination is NO in S15. Since it is preferable not to move the tilt or the telescopic during steering, the DC motors 710, 720, 730 are not energized, and the processing returns to before 501. On the other hand, when the absolute value |Ts| of the steering torque is less than the torque threshold Ts_th, that is, when the driver is not substantially steering, the determination is YES in S15, and the processing proceeds to S16.

In S16, it is determined whether or not the lane keeping flag F has been input from the lane keeping determination circuit 15. When the determination is YES in S16, the control unit 30 drives the steering lock actuator 710 that also functions as the steering vibration actuator in S21. In this case, the steering lock actuator 710 vibrates the steering wheel 91 to call the driver's attention.

When the determination is NO in S16, it is determined in S17 whether the vehicle speed V is less than a vehicle speed threshold V_th (e.g., 30 [km/h]). During high-speed traveling in which the vehicle speed V is equal to or higher than the vehicle speed threshold V_th and the determination is NO in S17, it is preferable not to move the tilt or the telescopic. Thus, the tilt actuator 720 and the telescopic actuator 730 are not energized, and the processing returns to before S01. On the other hand, during low-speed traveling in which the vehicle speed V is less than the vehicle speed threshold V_th and the determination is YES in S17, the energization of the tilt actuator 720 and the telescopic actuator 730 is permitted.

When there is a tilt input from the tilt switch 12, the determination is YES in S18, and the control unit 30 drives the tilt actuator 720 in S22. When the determination is NO in S18 and there is a telescopic input from the telescopic switch 13, the determination is YES in S19, and the control unit 30 drives the telescopic actuator 730 in S23.

After the respective DC motors 710, 720, 730 are driven in S21, S22, and S23, or when the determination is NO in S15 or S17, the processing returns to before S01, and it is determined whether or not the vehicle switch 11 has been turned off. When the vehicle switch 11 remains on and the determination is NO in S01, the routine from S11 is repeated. When the vehicle switch 11 is turned off and the determination is YES in S01, the control unit 30 turns off the three-phase motor relays MmU1, MmV1, MmW1 and the DC motor relays MU1r/R, MV2r/R, MW3r/R in S02. Thereafter, in S03, the control unit 30 drives the steering lock actuator 710 to lock the steering and ends the processing.

Next, phase current computation processing by the phase current computation unit 331 will be described with reference to a flowchart of FIG. 18 and current waveform diagrams of FIGS. 25 and 26 The control unit 30 applies Kirchhoff's law to the current flowing from the inverter 601 into the three-phase winding set 801 and computes the motor phase currents Iu1#, Iv1#, Iw1# that are applied to the three-phase motor 800, and the currents I1, I2, I3 that are applied to the DC motors 710, 720, 730. Here, a phase to which the specific DC motor to be energized is connected is defined as a "specific phase", and a phase except for the specific phase is defined as a "non-specific phase".

When the steering lock actuator 710 is to be driven as the specific DC motor, the determination is YES in S32, and the processing proceeds to S35A. In S35A, the motor phase currents Iu1#, Iv1#, Iw1# that are applied to the three-phase winding set 801 and the current I1 that is applied to the steering lock actuator 710 are computed by Formulas (1.1a) to (1.4a). In this case, the U1 phase is a specific phase, and the V1 phase and the W1 phase are non-specific phases.

$$Iu1\# = -Iv1 - Iw1 \quad (1.1a)$$

$$Iv1\# = Iv1 \quad (1.2a)$$

$$Iw1\# = Iw1 \quad (1.3a)$$

$$I1 = Iu1 - Iu1\# \quad (1.4a)$$

In Formula (1.1a), the current value Iu1# of the current flowing through the U1 phase that is the specific phase is computed as an estimated current value by Kirchhoff's law from the current values Iv1, Iw1 detected by the current sensors SAV1, SAW1 of the V1 phase and the W1 phase that are the non-specific phases. In Formula (1.4a), the current I1 flowing through the specific DC motor 710 is computed from the estimated current value Iu1# and the current value Iu1 detected by the current sensor SAU of the U1 phase that is the specific phase.

Figure 25:
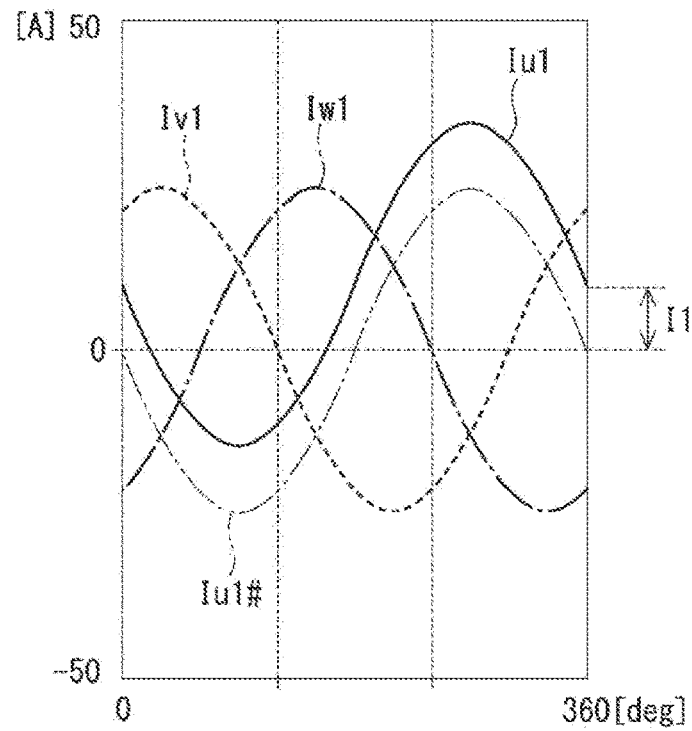
FIG. 25 is a waveform of a phase current flowing through an inverter.
Figure 26:
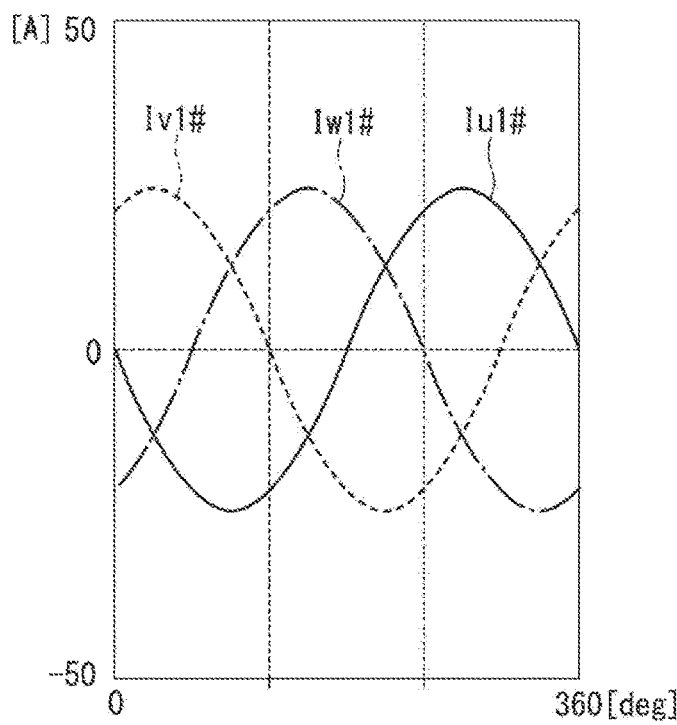
FIG. 26 is a waveform of a phase current that is applied to a three-phase winding set.

FIG. 25 illustrates the waveforms of the inverter phase currents Iu1, Iv1, Iw1 flowing through the inverter 601. FIG. 26 illustrates the waveforms of the motor phase currents Iu1#, Iv1#, Iw1# that are applied to the three-phase winding set 801 in S35A. The inverter phase current Iu1 is offset from the motor phase current Iu1# indicated by a two-dot chain line, and this offset corresponds to the DC current I1.

When the tilt actuator 720 is to be driven as the specific DC motor, the determination is NO in S32 and YES in S33, and the processing proceeds to S35B. In S35B, the motor phase currents Iu1#, Iv1#, Iw1# that are applied to the three-phase winding set 801 and the current I2 that is applied to the tilt actuator 720 are computed by Formulas (1.1b) to (1.4b). In this case, the V1 phase is the specific phase, and the U1 phase and the W1 phase are the non-specific phases. According to Kirchhoff's law, the estimated current value Iv1# of the specific phase is computed, and the current I2 flowing through the specific DC motor 720 is computed from the estimated current value Iv1# and the detected current value Iv1 of the specific phase.

$$Iu1\# = Iu1 \quad (1.1b)$$

$$Iv1\# = -Iu1 - Iw1 \quad (1.2b)$$

$$Iw1\# = Iw1 \quad (1.3b)$$

$$I2 = Iv1 - Iv1\# \quad (1.4b)$$

When the telescopic actuator 730 is to be driven as the specific DC motor, the determination is NO in S32, NO in S33, and YES in S34, and the processing proceeds to S35C. In S35C, the motor phase currents Iu1#, Iv1#, Iw1# that are applied to the three-phase winding set 801 and the current I3 that is applied to the telescopic actuator 730 are computed by Formulas (1.1c) to (1.4c). In this case, the W1 phase is the specific phase, and the U1 phase and the V1 phase are the non-specific phases. According to Kirchhoff's law, the estimated current value Iw1# of the specific phase is computed, and the current I3 flowing through the specific DC motor 730 is computed from the estimated current value Iw1# and the detected current value Iw1 of the specific phase.

$$Iu1\# = Iu1 \quad (1.1c)$$

$$Iv1\# = Iv1 \quad (1.2c)$$

$$Iw1\# = -Iu1 - Iv1 \quad (1.3c)$$

$$I3 = Iw1 - Iw1\# \quad (1.4c)$$

When the determination is NO in S34, none of the DC motors 710, 720, 730 is driven, and the processing proceeds to S35D. In S35D, the motor phase currents Iu1#, Iv1#, Iw1# that are applied to the three-phase winding set 801 are computed by Formulas (1.1d) to (1.3d).

$$Iu1\# = Iu1 \quad (1.1d)$$

$$Iv1\# = Iv1 \quad (1.2d)$$

$$Iw1\# = Iw1 \quad (1.3d)$$

Figure 19:
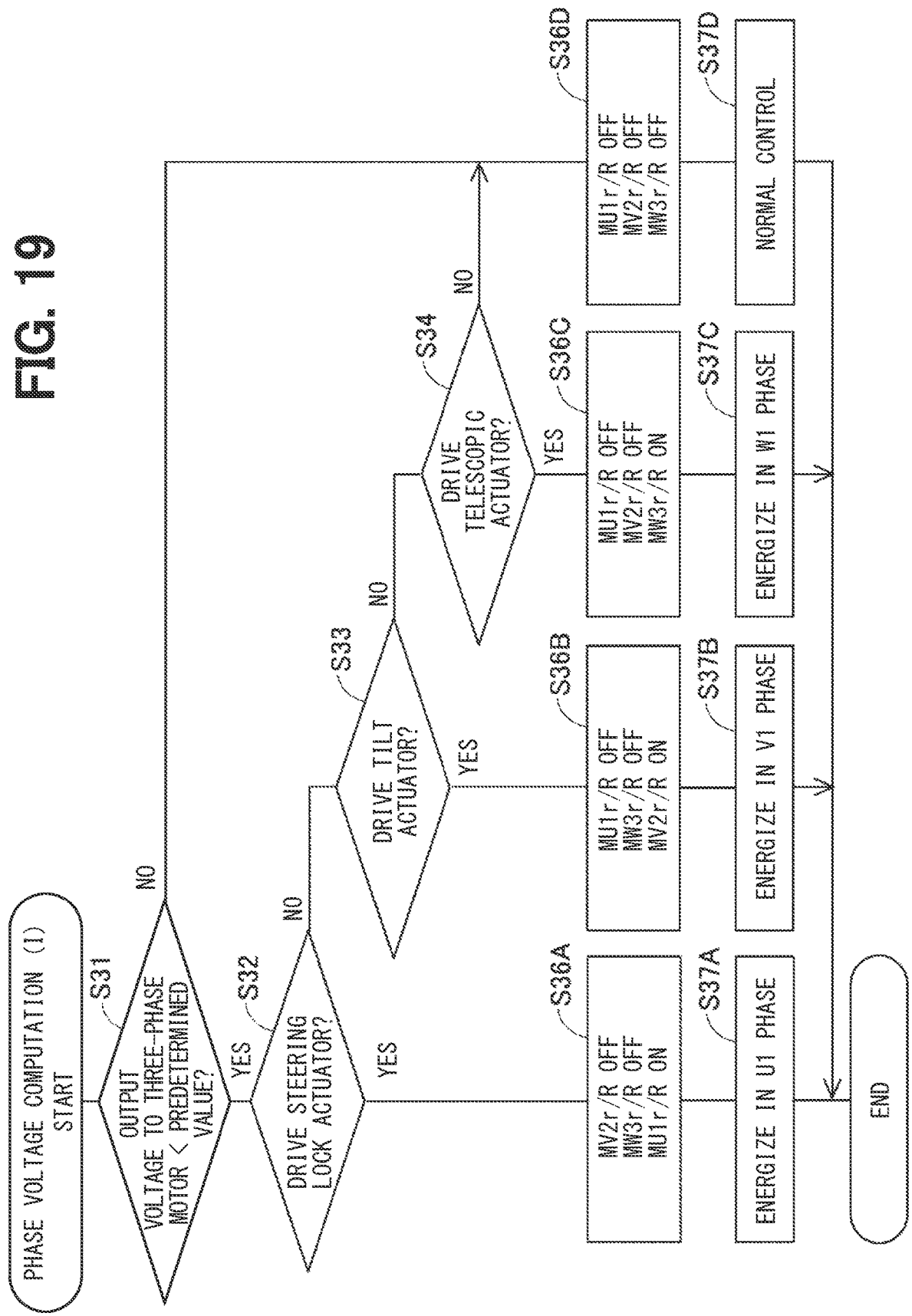
FIG. 19 is a flowchart of phase voltage computation processing (I)
Figure 20:
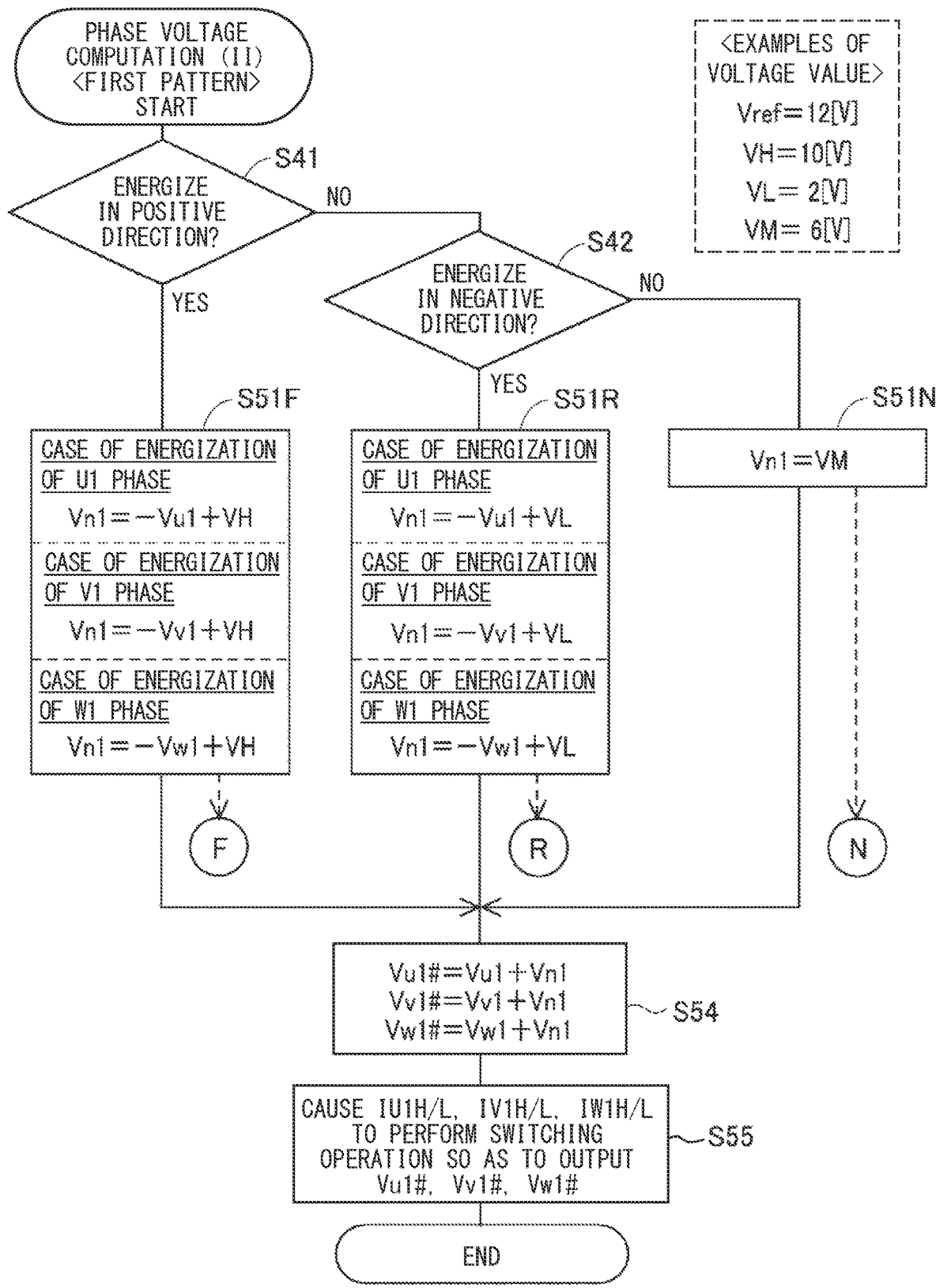
FIG. 20 is a flowchart of phase voltage computation processing (II) <first pattern>.
Figure 21:
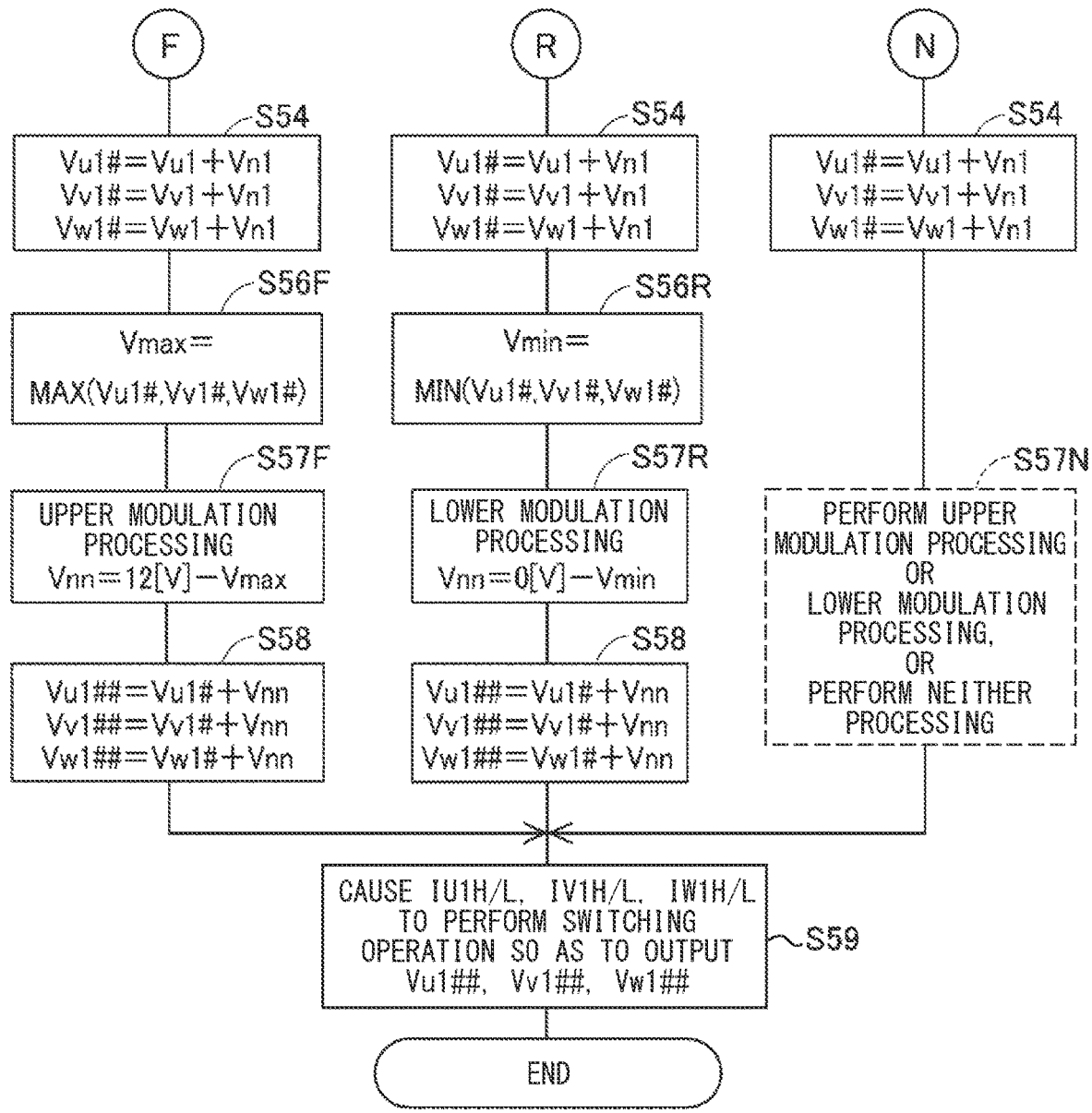
FIG. 21 is a flowchart of phase voltage computation processing (III)
Figure 22:
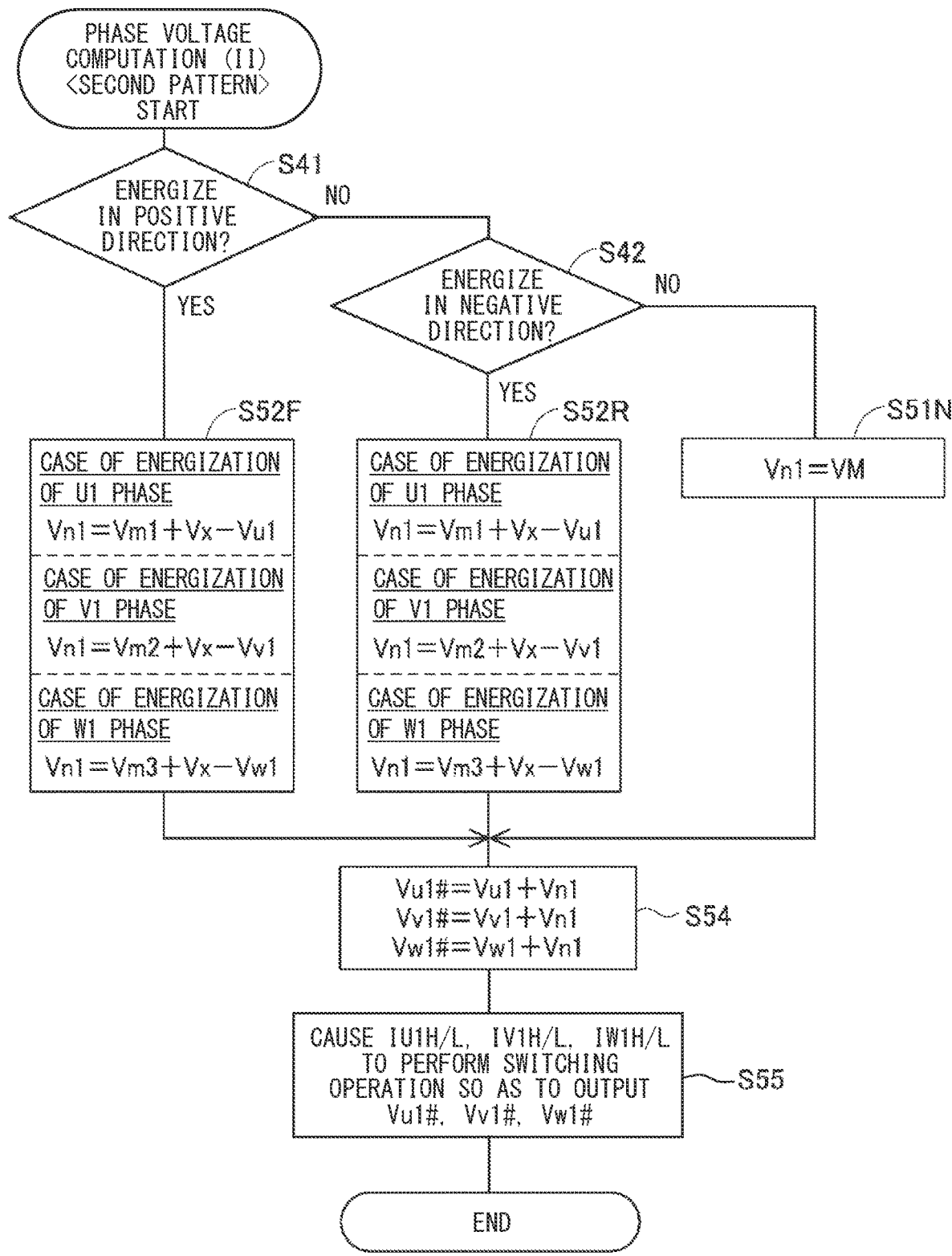
FIG. 22 is a flowchart of phase voltage computation processing (II) <second pattern>.

Next, phase voltage computation processing by the phase voltage computation unit 381 will be described with reference to flowcharts of FIGS. 19 to 22 and voltage waveform diagrams of FIGS. 27A to 28B. FIG. 19 illustrates phase voltage computation processing (I) for determining the energized phase of the inverter 601, and FIGS. 20 and 22 illustrate two patterns of phase voltage computation processing (II) for computating the neutral point voltage Vn1 and the controlled phase voltages Vu1#, Vv1#, Vw1# in accordance with the energization directions of the DC motors 710, 720, 730. A first pattern of the phase voltage computation processing (II) may be combined with phase voltage computation processing (III) of FIG. 21. In the phase voltage computation processing (III), upper modulation processing or lower modulation processing is performed on the basis of the controlled phase voltages Vu1#, Vv1#, Vw1#. By this computation, the three-phase motor 800 and any one of the DC motors 710, 720, 730 can be energized simultaneously, and the output ranges of the three-phase motor 800 and the DC motors 710, 720, 730 can be increased within the restriction of the power supply voltage.

In the phase voltage computation processing (I), it is determined whether or not the output voltage of the three-phase motor 800 is less than a predetermined value in S31 of FIG. 19, and in the case of YES, the processing proceeds to S32. When the output voltage of the three-phase motor 800 is equal to or larger than the predetermined value and the determination is NO in S31, the control unit 30 gives priority to ensuring the output voltage of the three-phase motor 800 and does not energize the DC motors 710, 720, 730.

When the steering lock actuator 710 is to be driven, the determination is YES in S32, and the processing proceeds to S36A and S37A. In S36A, the DC motor relays MV2r/R and MW3r/R are turned off, and MU1r/R is turned on. In S37A, energization is performed in the U1 phase.

When the tilt actuator 720 is to be driven, the determination is NO in S32 and YES in S33, and the processing proceeds to S36B and S37B. In S36B, the DC motor relays MU1r/R and MW3r/R are turned off, and MV2r/R is turned on. In S37B, energization is performed in the V1 phase.

When the telescopic actuator 730 is to be driven, the determination is NO in S32, NO in S33, and YES in S34, and the processing proceeds to S36C and S37C. In S36C, the DC motor relays MU1r/R, MV2r/R are turned off, and MW3r/R is turned on. In S37C, energization is performed in the W1 phase.

When the determination is NO in S31 or S34, none of the DC motors 710, 720, 730 is driven, and the processing proceeds to S36D and S37D. In S36D, all the DC motor relays MU1r/R, MV2r/R, MW3r/R are turned off, and in S37D, normal control, that is, energization of only the three-phase motor 800, is performed.

The first pattern of the phase voltage computation processing (II) will be described with reference to FIG. 20. Here, for example, when the input voltage Vr1 or a reference voltage Vref for control of the DC motor switches MU1H/L, MV2H/L, MW3H/L or the inverter 601 is 12 [V], VH, VM, and VL are set as default values, such as VH=10 [V], VM=6 [V], and VL=2 [V] (see FIGS. 28A and 28B).

When energization is to be performed in the positive direction, the determination is YES in S41, and the processing proceeds to S51F. In S51F, the neutral point voltage Vn1 is computed by Formula (2.1u) in the case of the U1-phase energization, Formula (2.1v) in the case of the V1-phase energization, and Formula (2.1w) in the case of the W1-phase energization in accordance with the energized phase. In this way, the control unit 30 adjusts the neutral point voltage Vn1 to be high.

$$Vn1 = -Vu1 + VH \quad (2.1u)$$

$$Vn1 = -Vv1 + VH \quad (2.1v)$$

$$Vn1 = -Vw1 + VH \quad (2.1w)$$

When energization is to be performed in the negative direction, the determination is NO in S41 and YES in S42, and the processing proceeds to S51R. In S51R, the neutral point voltage Vn1 is computed by Formula (2.2u) in the case of the U1-phase energization, Formula (2.2v) in the case of the V1-phase energization, and Formula (2.2w) in the case of the W1-phase energization in accordance with the energized phase. In this way, the control unit 30 adjusts the neutral point voltage Vn1 to be low.

$$Vn1 = -Vu1 + VL \quad (2.2u)$$

$$Vn1 = -Vv1 + VL \quad (2.2v)$$

$$Vn1 = -Vw1 + VL \quad (2.2w)$$

When no energization is performed either in the positive or negative direction, the determination is NO in S41 and NO in S42, and the processing proceeds to S51N. In S51N, the neutral point voltage Vn1 is computed by Formula (2.3).

$$Vn1 = VM \quad (2.3)$$

In cases where the phase voltage computation processing (III) is not performed after S51F, S51R, and S51N, the processing proceeds to S54 in common. In a case where the phase voltage computation processing (III) is performed, the processing is linked to FIG. 21 via link symbols F, R, N as indicated by broken line arrows. In S54, the neutral point voltage Vn1 is added to the voltage commands Vu1, Vv1, Vw1 of the respective phases by Formulas (3.1) to (3.3), and the controlled voltages Vu1#, Vv1#, Vw1# are computed. Here, the phase voltage computation unit 381 of the control block diagram illustrated in FIG. 15 computes the phase voltage with VH and VL as fixed values regardless of the phase voltage amplitude.

Figure 27A:
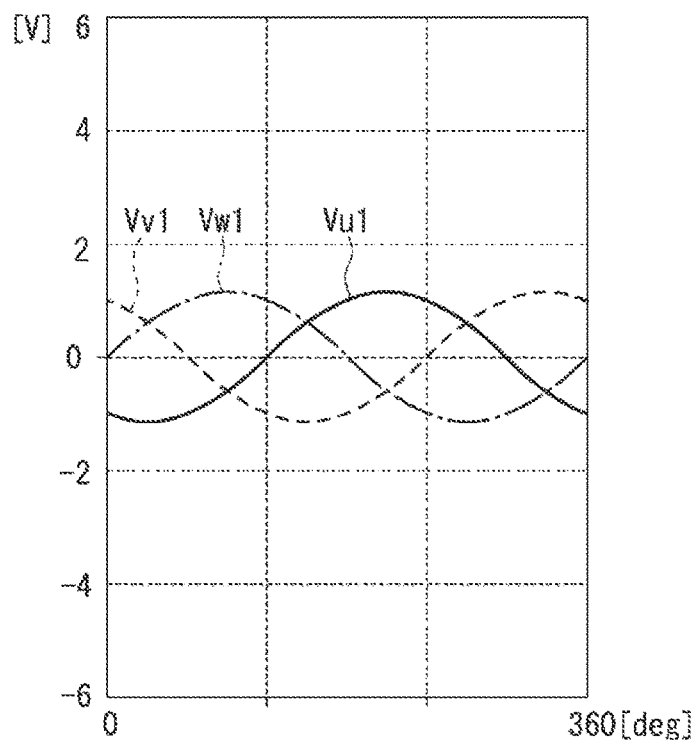
FIG. 27A is a waveform of a voltage command in a configuration where VH and VL are constant.
Figure 27B:
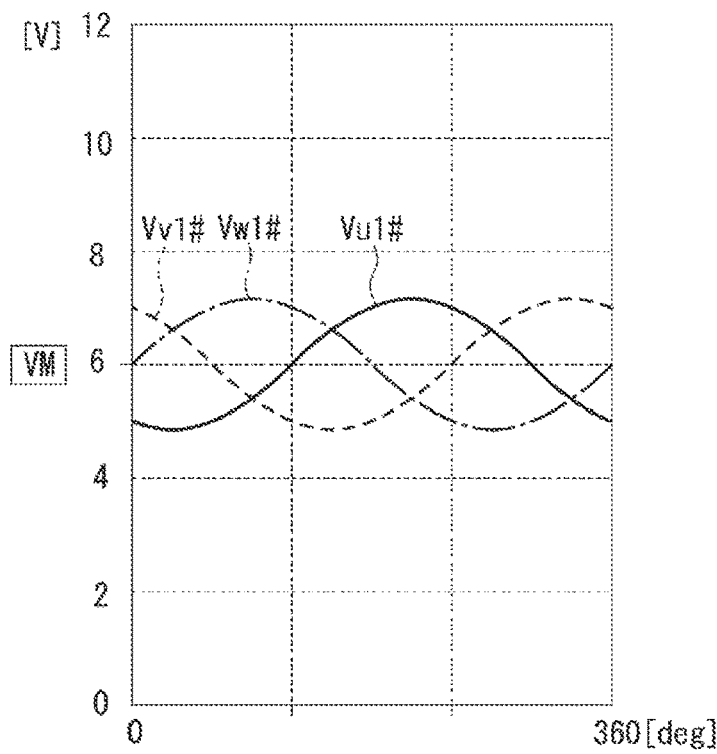
FIG. 27B is a waveform of a controlled voltage command centered around VM in the configuration where VH and VL are constant.

As illustrated in FIG. 27A, each of the voltage commands Vu1, Vv1, Vw1 before the phase voltage computation processing, output from the two-phase to three-phase conversion unit 371, has a sinusoidal shape centered around 0 [V]. When the DC motors 710, 720, 730 are stopped, as illustrated in FIG. 27B, the phase voltage computation unit 381 outputs a controlled voltage command centered around VM (6 [V]).

Figure 28A:
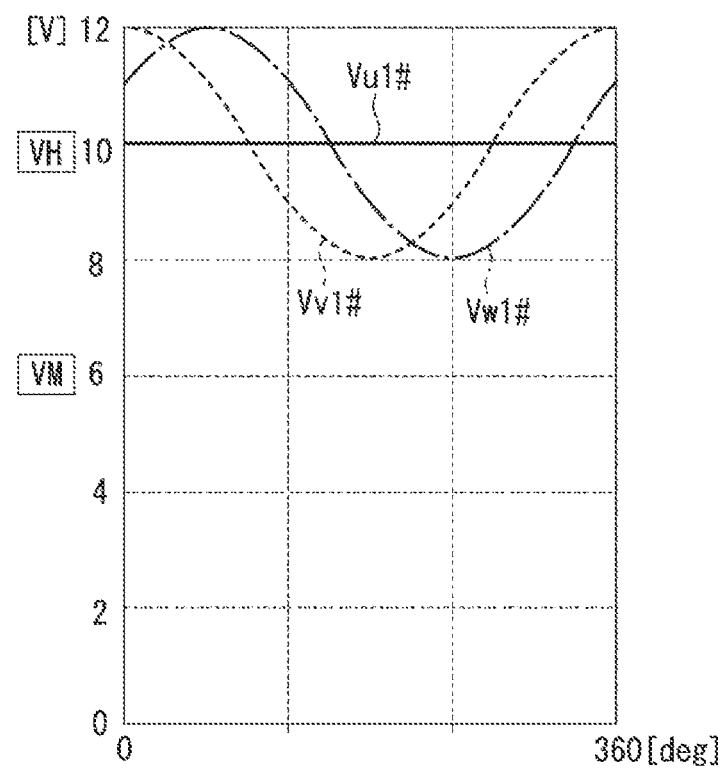
FIG. 28A is a waveform of a voltage command after a shift of a neutral point voltage at the time of energization in the positive direction in the configuration where VH and VL are constant.
Figure 28B:
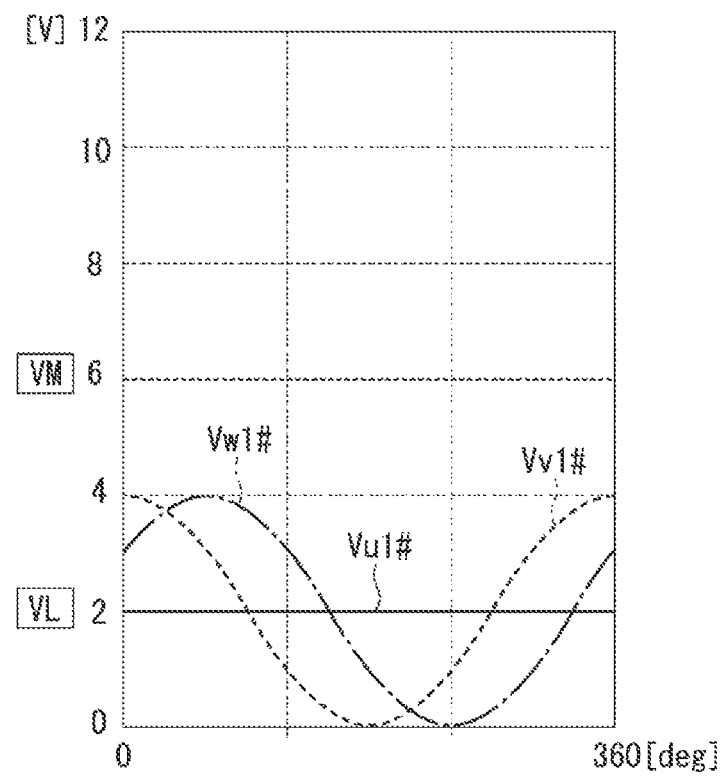
FIG. 28B is a waveform of a voltage command after the shift of the neutral point voltage at the time of energization in the negative direction in the configuration where VH and VL are constant.
Figure 29:
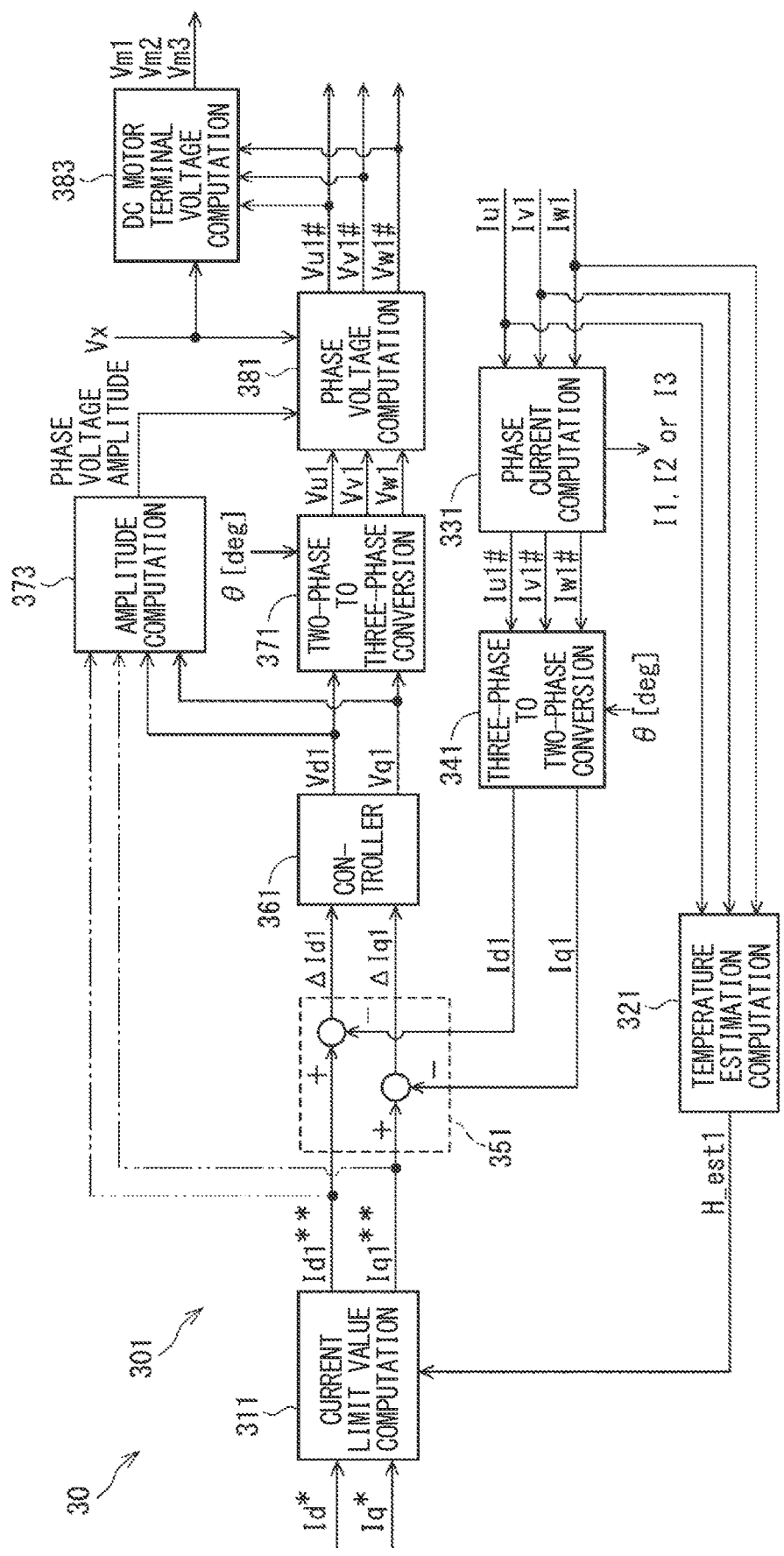
FIG. 29 is a control block diagram of a three-phase control unit of a configuration example in which VH and VL are variable.

When the DC motors 710, 720, 730 are driven, the phase voltage computation unit 381 shifts the neutral point voltage Vn1 of the three-phase motor 800. As illustrated in FIG. 28A, when the U1 phase is to be energized in the positive direction, VH to be the controlled voltage Vu1# of the energized phase is constant at 10 [V]. As illustrated in FIG. 28B, when the U1 phase is to be energized in the negative direction, VL to be the controlled voltage Vu1# of the energized phase is constant at 2 [V].

$$Vu1\# = Vu1 + Vn1 \quad (3.1)$$

$$Vv1\# = Vv1 + Vn1 \quad (3.2)$$

$$Vw1\# = Vw1 + Vn1 \quad (3.3)$$

Although FIGS. 28A and 28B illustrate the examples in which the phase voltage amplitude of the waveform is 12 [V], VH in the computation of the DC motor terminal voltage and the upper limit of the voltage output to the three-phase motor in the phase voltage computation processing (I) may be determined such that the maximum value of the phase voltage amplitude is about 11 [V] in consideration of the ON time of the lower arm element for current detection.

Although FIGS. 28A and 28B illustrate the examples in which the upper limit of the phase voltage amplitude of the waveform is 12 [V] and the lower limit is 0 [V], VH in the computation of the DC motor terminal voltage and the upper limit of the voltage output to the three-phase motor in the phase voltage computation processing (I) may be determined such that the upper limit of the phase voltage amplitude is about 11.76 [V] and the lower limit is about 0.24 [V] in consideration of the ON time of the lower arm element or the upper arm element.

Moreover, a configuration in which the control unit 30 adjusts the neutral point voltage Vn1 in accordance with the voltage that is applied to the three-phase motor 800 will be described with reference to FIGS. 29 to 31B. In the control block diagram of FIG. 29, an amplitude computation unit 373 is added to FIG. 15. The amplitude computation unit 373 computes the phase voltage amplitude by the following formula on the basis of the dq-axis voltage commands Vd1, Vq1. As indicated by a two-dot chain line, the amplitude computation unit 373 may compute the phase voltage amplitude on the basis of the dq-axis current command values Id1, Iq1 or may compute the phase voltage amplitude on the basis of the current detection value or the rotational speed.

$$\text{Phase voltage amplitude} = \sqrt{(2/3)} \times \sqrt{(Vd1^2 + Vq1^2)}$$

The phase voltage computation unit 381 computes VH and VL by the following formulas. V max is 12 [V] that is the input voltage Vr1 or the reference voltage Vref for control, or a voltage (e.g., 93% of 12 [V]=11.16 [V]) in consideration of current detection by the current sensors SAU1, SAV1, SAW1 on the low potential side. V min is 0 [V] or a voltage (e.g., 4% of 12 [V]=0.48 [V]) in consideration of the pre-driver output.

$$VH = V\text{max} - (\sqrt{3}) \times \text{phase voltage amplitude}$$

$$VL = V\text{min} + (\sqrt{3}) \times \text{phase voltage amplitude}$$

Figure 30A:
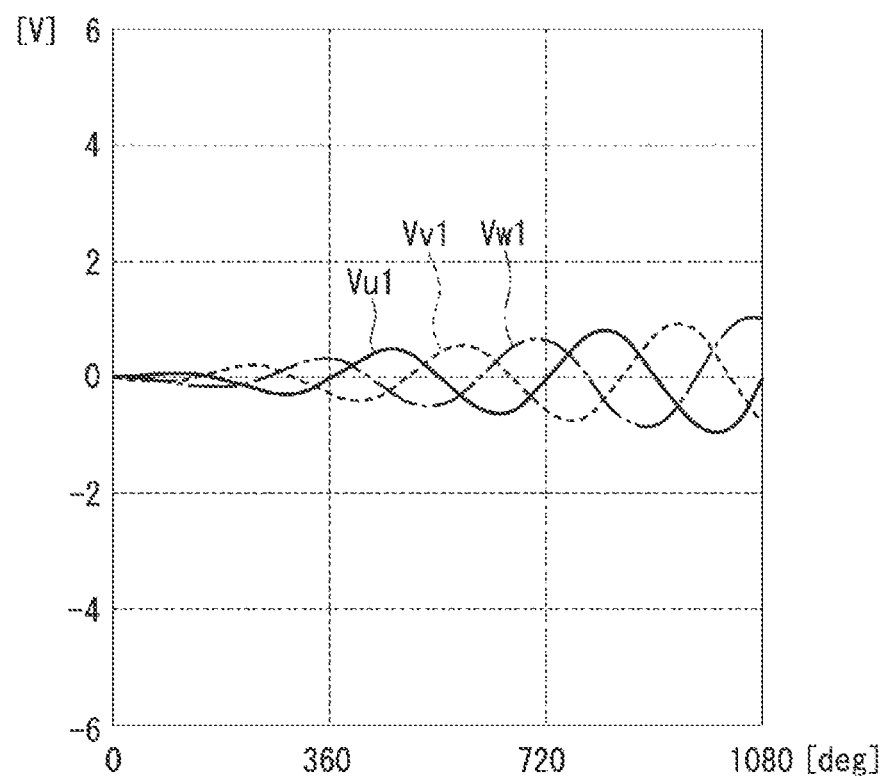
FIG. 30A is a waveform of a voltage command in a configuration where VH and VL are variable.
Figure 30B:
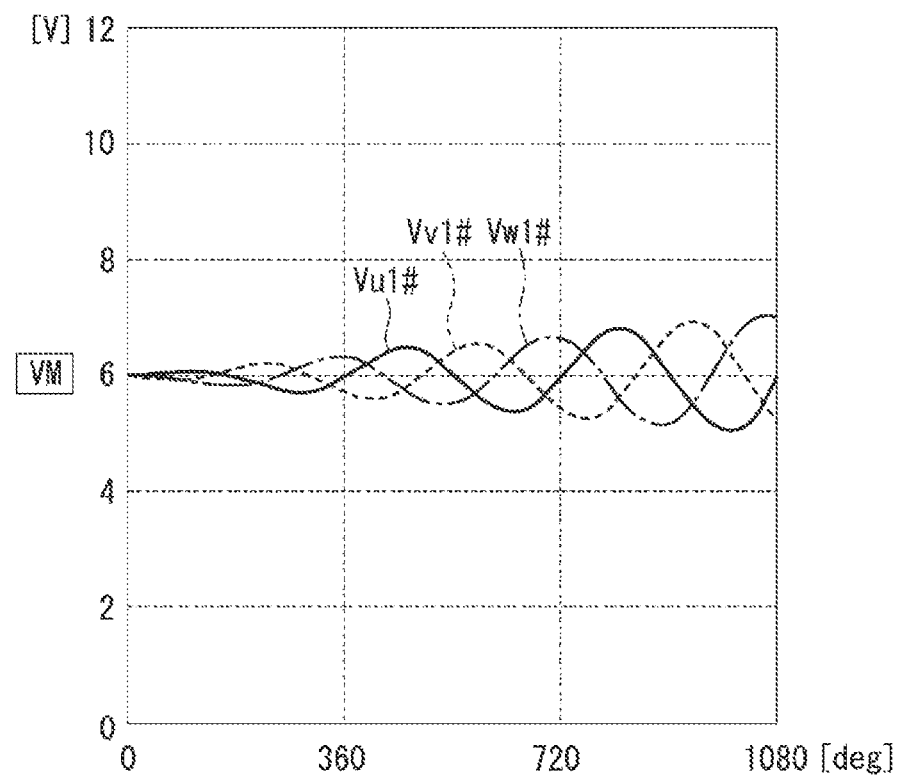
FIG. 30B is a waveform of a controlled voltage command centered around VM in the configuration where VH and VL are variable.

FIGS. 30A to 31B illustrate examples in which the phase voltage amplitude increases with a constant gradient over three electrical angle periods (1080 [deg]). As illustrated in FIG. 30A, each of the voltage commands Vu1, Vv1, Vw1 before the phase voltage computation processing, output from the two-phase to three-phase conversion unit 371, has a sinusoidal shape in which the amplitude gradually increases around 0 [V]. When the DC motors 710, 720, 730 are stopped, as illustrated in FIG. 30B, the phase voltage computation unit 381 outputs a controlled voltage command centered around VM (6 [V]).

Figure 31A:
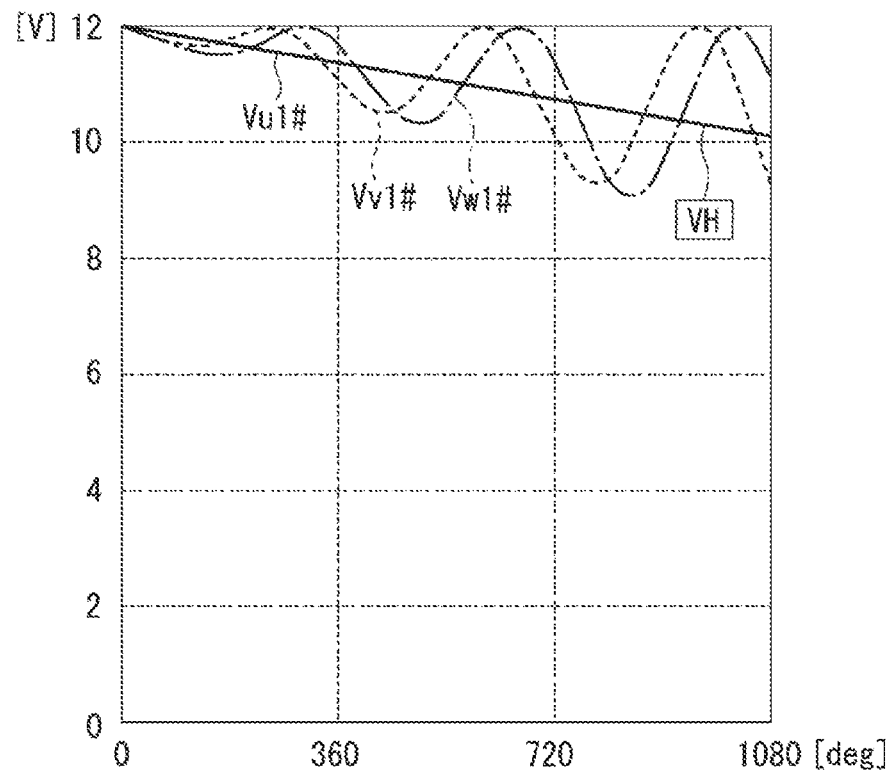
FIG. 31A is a waveform of a voltage command after the shift of the neutral point voltage at the time of energization in the positive direction in the configuration where VH and VL are variable.
Figure 31B:
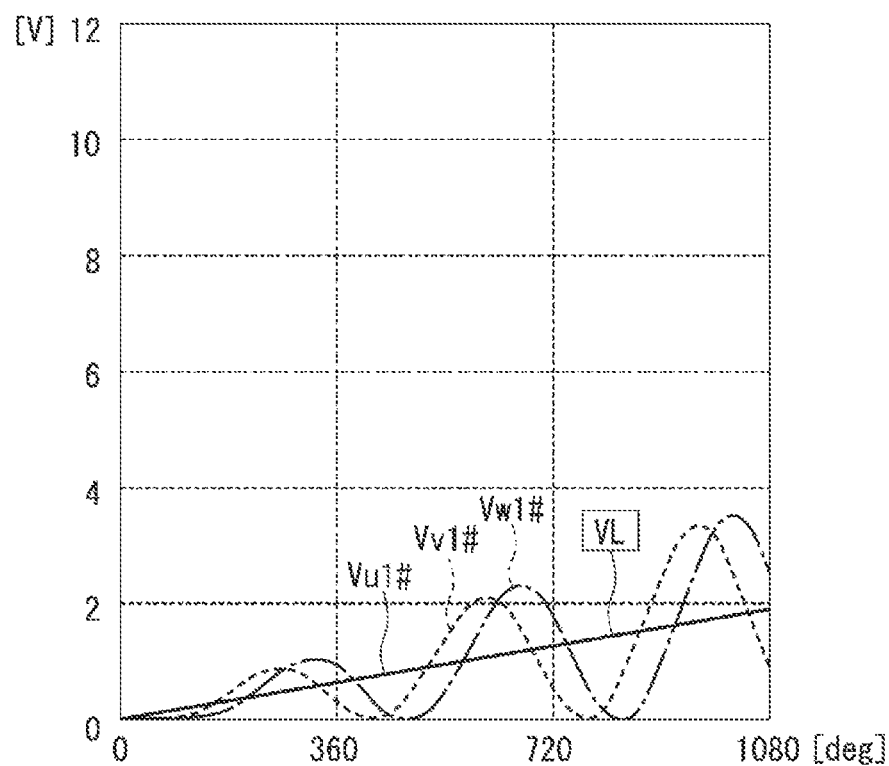
FIG. 31B is a waveform of a voltage command after the shift of the neutral point voltage at the time of energization in the negative direction in the configuration where VH and VL are variable.

When the DC motors 710, 720, 730 are driven, the phase voltage computation unit 381 shifts the neutral point voltage Vn1 of the three-phase motor 800. As illustrated in FIG. 31A, when the U1 phase is to be energized in the positive direction, VH to be the controlled voltage Vu1# of the energized phase gradually decreases from 12 [V] to about 10 [V] as the phase voltage amplitude increases. The maximum values of the voltages Vv1#, Vw1# of the V1 phase and the W1 phase are 12 [V]. As illustrated in FIG. 31B, when the U1 phase is to be energized in the negative direction, VH to be the controlled voltage Vu1# of the energized phase gradually increases from 0 [V] to about 2 [V] as the phase voltage amplitude increases. The minimum values of the voltages Vv1#, Vw1# of the V1 phase and the W1 phase are 0 [V].

Returning to FIG. 20, in S55, the control unit 30 causes the inverter switching elements IU1H/L, IV1H/L, IW1H/L to perform a switching operation so as to output the controlled voltages Vu1#, Vv1#, Vw1#.

Next, the phase voltage computation processing (III) will be described with reference to a flowchart of FIG. 21. Following the link symbols F, R, N, S54 is executed as in the first embodiment. When energization is to be performed in the positive direction, in S56F, the maximum values V max of the controlled voltages Vu1#, Vv1#, Vw1# of the respective phases are computed by Formula (5.1). In S57F, a neutral point control voltage Vnn of the upper modulation processing is computed by Formula (5.2). Twelve [V] in Formula (5.2) may be the inverter input voltage Vr1, and is computed such that a duty ratio of the phase having the maximum voltage is 100% or a value close to 100%.

$$V\text{max} = \text{MAX}(Vu1\#, Vv1\#, Vw1\#) \quad (5.1)$$

$$Vnn = 12[V] - V\text{max} \quad (5.2)$$

When energization is to be performed in the negative direction, in S56R, the minimum values V min of the controlled voltages Vu1#, Vv1#, Vw1# of the respective phases are computed by Formula (5.3). In S57R, the neutral point control voltage Vnn of the lower modulation processing is computed by Formula (5.4).

$$V\text{min} = \text{MIN}(Vu1\#, Vv1\#, Vw1\#) \quad (5.3)$$

$$Vnn = 0[V] - V\text{min} \quad (5.4)$$

In common with the upper modulation processing and the lower modulation processing, in S58, the neutral point control voltage Vnn is added to the controlled voltages Vu1#, Vv1#, Vw1# of the respective phases in accordance with Formulas (6.1) to (6.3), and the respective phase voltages Vu1##, Vv1##, Vw1## after the correction of the neutral point voltage are computed.

$$Vu1\#\# = Vu1\# + Vnn \quad (6.1)$$

$$Vv1\#\# = Vv1\# + Vnn \quad (6.2)$$

$$Vw1\#\# = Vw1\# + Vnn \quad (6.3)$$

When no energization is performed either in the positive or negative direction, in S57N indicated by a broken line, the upper modulation processing or the lower modulation processing may be performed, or neither processing may be performed. In S59, the control unit 30 causes the inverter switching elements IU1H/L, IV1H/L, IW1H/L to perform the switching operation so as to output the respective phase voltages Vu1##, Vv1##, Vw1## after the correction of the neutral point voltage.

Next, a second pattern of the phase voltage computation processing (II) will be described with reference to FIG. 22. S41, S42, and S51N are the same as in the first pattern. In both S52F and S52R, in accordance with the energized phase, the neutral point voltage Vn1 is computed on the basis of the DC motor terminal voltages Vm1, Vm2, Vm3 and the DC motor applied voltage Vx by Formula (4.1u) in the case of the U1-phase energization, by Formula (4.1v) in the case of the V1-phase energization, and by Formula (4.1w) in the case of the W1-phase energization.

$$Vn1 = Vm1 + Vx - Vu1 \quad (4.1u)$$

$$Vn1 = Vm2 + Vx - Vv1 \quad (4.1v)$$

$$Vn1 = Vm3 + Vx - Vw1 \quad (4.1w)$$

In common S54 following S52F, S52R, and S51N, the controlled voltages Vu1#, Vv1#, Vw1# of the respective phases are computed similarly to the first pattern. For example, when the U1 phase is to be energized, the controlled voltage Vu1# is "Vm1+Vx" regardless of the energization direction. S55 is the same as in the first pattern. The phase voltage computation processing (III) is not applied to the second pattern of the phase voltage computation processing (II).

Next, a first pattern of the DC motor terminal voltage computation processing will be described with reference to FIG. 23. This first pattern is combined with the first pattern of the phase voltage computation processing (II). S31 to S34 are the same as those in the phase voltage computation processing (I) of FIG. 19. Normally, at an initial stage, all the DC motor switches MU1H/L, MV2H/L, MW3H/L are turned off. Hereinafter, "turning off the switch" includes not only the case of turning off the switch to shift from an ON state to an OFF state but also the case of maintaining the switch in the initial OFF state. By this computation, the three-phase motor 800 and any one of the DC motors 710, 720, 730 can be energized simultaneously, and the output ranges of the three-phase motor 800 and the DC motors 710, 720, 730 can be increased within the restriction of the power supply voltage.

When the steering lock actuator 710 is to be driven, in S47A, the DC motor terminal voltage Vm1 is computed by Formula (7.1a). The control unit 30 causes the DC motor switch MU1H/L to perform the switching operation so as to output the DC motor terminal voltage Vm1 in S48A, and turns off the DC motor switches MV2H/L, MW3H/L in S49A.

When the tilt actuator 720 is to be driven, in S47B, the DC motor terminal voltage Vm2 is computed by Formula (7.1b).

The control unit 30 causes the DC motor switch MV2H/L to perform the switching operation so as to output the DC motor terminal voltage Vm2 in S48B, and turns off the DC motor switches MU1H/L, MW3H/L in S49B.

When the telescopic actuator 730 is to be driven, in S47C, the DC motor terminal voltage Vm3 is computed by Formula (7.1c). The control unit 30 causes the DC motor switch MW3H/L to perform the switching operation so as to output the DC motor terminal voltage Vm3 in S48C and turns off the DC motor switches MU1H/L, MV2H/L in S49C. When the phase voltage computation processing (III) is not performed, Vu1## is replaced with Vu1#, Vv1## is replaced with Vv1#, and Vw1## is replaced with Vw1#.

$$Vm1 = Vu1\#\# - Vx \quad (7.1a)$$

$$Vm2 = Vv1\#\# - Vx \quad (7.1b)$$

$$Vm3 = Vw1\#\# - Vx \quad (7.1c)$$

When the determination is NO in S31 or S34, none of the DC motors 710, 720, 730 is driven, and all the DC motor switches MU1H/L, MV2H/L, MW3H/L are turned off in S49D.

Figure 24:
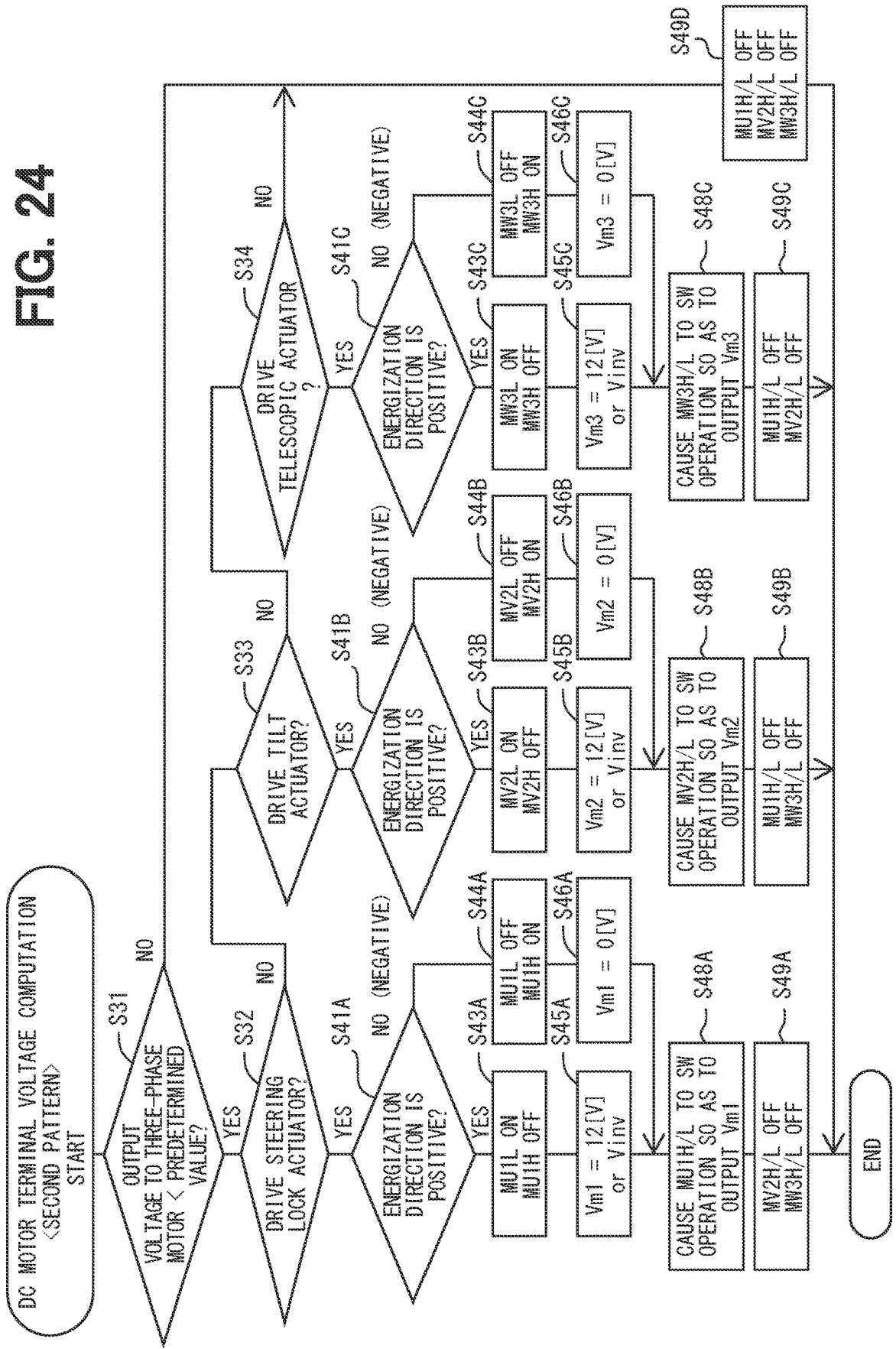
FIG. 24 is a flowchart of DC motor terminal voltage computation processing <second pattern>.

A second pattern of the DC motor terminal voltage computation processing will be described with reference to FIG. 24. The second pattern may be combined with the second pattern of the phase voltage computation processing (II) or may be combined with the first pattern. In combination with the second pattern, the phase voltage computation processing (II) is performed after the DC motor terminal voltage computation processing is performed, and in combination with the first pattern, the phase voltage computation processing (II) is performed before the DC motor terminal voltage computation processing is performed. By this computation, the three-phase motor 800 and any one of the DC motors 710, 720, 730 can be energized simultaneously, and the output ranges of the three-phase motor 800 and the DC motors 710, 720, 730 can be increased within the restriction of the power supply voltage.

Figure 23:
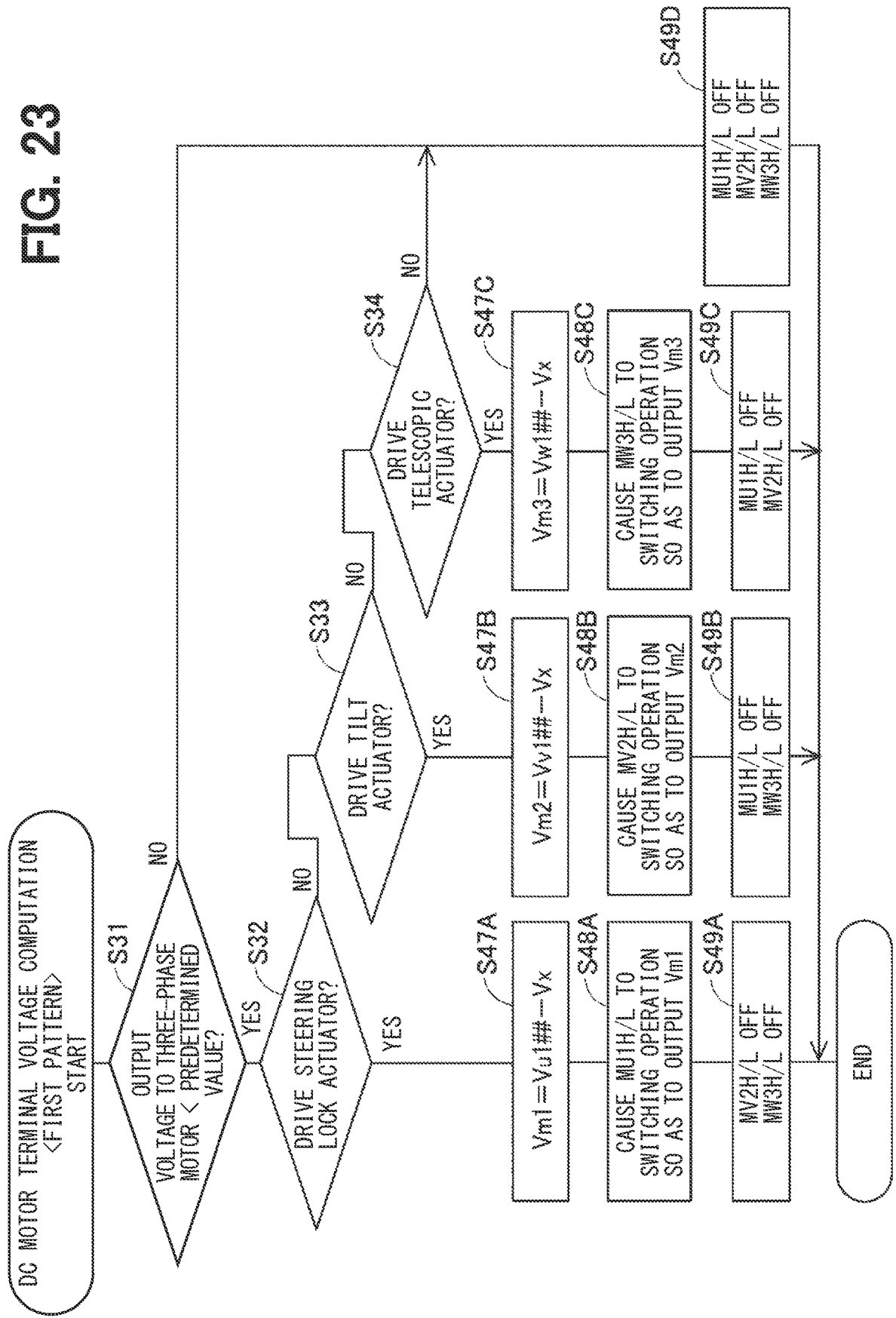
FIG. 23 is a flowchart of DC motor terminal voltage computation processing <first pattern>.

S31 to S34 are the same as those in FIGS. 19 and 23. When the steering lock actuator 710 is to be driven and the energization direction is the positive direction, the determination is YES in S41A. In S43A, the DC motor switch MU1L on the low potential side is turned on, and the DC motor switch MU1H on the high potential side is turned off. In S45A, "Vm1=12 [V] or the inverter input voltage Vr1" is computed. In the fifth embodiment, the input voltage Vrd from another power supply Btd is used instead of the inverter input voltage Vr1. The same applies to S45B and S45C. On the other hand, when the energization direction is the negative direction, the determination is NO in S41. In S44A, the switch MU1L on the low potential side is turned off, and the switch MU1H on the high potential side is turned on. In S46A, "Vm1=0 [V]" is computed. S48A and S49A to which the processing proceeds after S45A or S46A are the same as those in FIG. 23.

For example, the description will be given in combination with S51F and S51R of the first pattern in the phase voltage computation processing (II) illustrated in FIG. 20. when energizing the specific DC motor 710 in the positive direction, the control unit 30 turns on the DC motor switch MU1L on the low potential side connected to the second terminal or causes the DC motor switches MU1H/L on the low potential side and the high potential side connected to the second terminal T2 to perform the switching operation such that the voltage of the second terminal T2 is lower than the voltage of the first terminal T1, and controls the neutral point voltage Vn1 of the three-phase winding set 801 to be higher. When energizing the specific DC motor 710 in the negative direction, the control unit 30 turns on the DC motor switch MU1H on the high potential side connected to the second terminal or causes the DC motor switches MU1H/L on the low potential side and the high potential side connected to the second terminal T2 to perform the switching operation such that the voltage of the second terminal T2 is higher than the voltage of the first terminal T1, and controls the neutral point voltage Vn1 of the three-phase winding set 801 to be lower. Since the applied voltage Vx is not used, the computation amount of the control unit 30 can be reduced. In addition, only turning on and off the DC motor switch MU1H/L simplifies the operation, which can facilitate finding an abnormality.

When the tilt actuator 720 is to be driven and the energization direction is the positive direction, the determination is YES in S41B. In S43B, the DC motor switch MV2L on the low potential side is turned on, and the DC motor switch MV2H on the high potential side is turned off. In S45B, "Vm2=12 [V] or the inverter input voltage Vr1" is computed. On the other hand, when the energization direction is the negative direction, the determination is NO in S41. In S44B, the switch MV2Lh on the low potential side is turned off, and MV2H on the high potential side is turned on. In S46B, Vm2=0 [V]" is computed. S45B and S46B to which the processing proceeds after S48B or S49B are the same as those in FIG. 23.

When the telescopic actuator 730 is to be driven, the determination is YES in S41C when the energization direction is the positive direction. In S43C, the DC motor switch MW3L on the low potential side is turned on, and the DC motor switch MW3H on the high potential side is turned off. In S45C, "Vm3=12 [V] or the inverter input voltage Vr1" is computed. On the other hand, when the energization direction is the negative direction, the determination is NO in S41. In S44C, the switch MW3L on the low potential side is turned off, and MW3H on the high potential side is turned on. In S46C, "Vm3=0 [V]" is computed. S45C and S46C to which the processing proceeds after S48C or S49C are the same as those in FIG. 23. S49D, to which the processing proceeds when the determination is NO in S31 or S34, is also the same as that in FIG. 23.

Next, a third pattern different from the above two patterns related to the phase voltage computation processing (II) will be described with reference to FIGS. 32 and 33. This third pattern is combined with the first pattern of the DC motor terminal voltage computation processing. By this computation, the three-phase motor 800 and any one of the DC motors 710, 720, 730 can be energized simultaneously, and the output ranges of the three-phase motor 800 and the DC motors 710, 720, 730 can be increased within the restriction of the power supply voltage.

Figure 32:
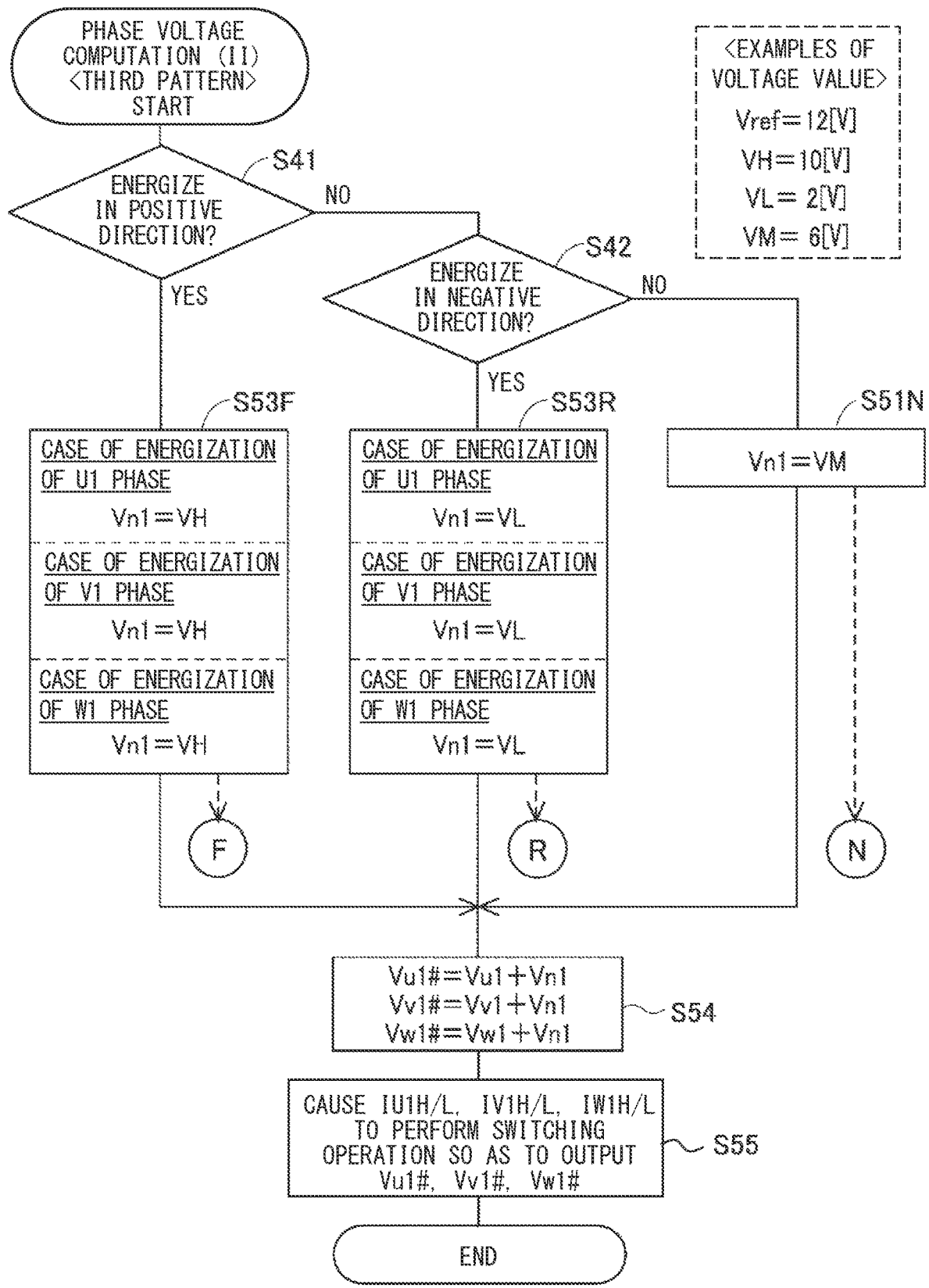
FIG. 32 is a flowchart of the first half (third pattern) of phase voltage computation processing B.
Figure 33:
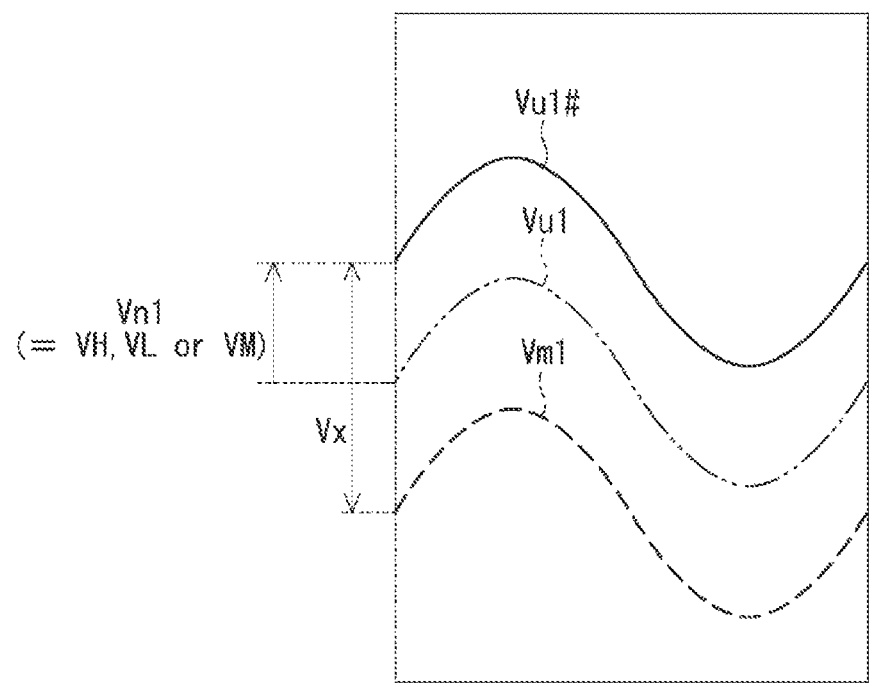
FIG. 33 is a waveform of a voltage command after the shift of the neutral point voltage corresponding to the third pattern.

In a flowchart of FIGS. 32, S41 and S42 are the same as in the first and second patterns of the phase voltage computation processing (II). In S53F at the time of energization in the positive direction, the neutral point voltage Vn1 is computed by Formula (8.1) regardless of the energized phase. In S53R at the time of energization in the negative direction, the neutral point voltage Vn1 is computed by Formula (8.2) regardless of the energized phase.

$$Vn1 = VH \quad (8.1)$$

$$Vn1 = VL \quad (8.2)$$

S51N, S54, and S55 are the same as in the first and second patterns of the phase voltage computation processing (II). In addition, as in the first pattern, the processing may be linked to the phase voltage computation processing (III) in FIG. 21 via the link symbols F, R, N. As illustrated in FIG. 33, in the third pattern, for example, the controlled voltage Vu1# of the U1 phase is not set to a constant voltage but is shifted by constant VH, VL, or VM with respect to the voltage command Vu1.

Since the computation processing in each pattern described above is configured to apply a voltage to each of the DC motors 710, 720, 730 when there is a margin of voltage for shifting the neutral point voltage Vn1, each of the DC motors 710, 720, 730 preferably has a small output with respect to the three-phase motor 800. In addition, each of the DC motors 710, 720, 730 preferably has a smaller current to be applied, larger resistance, and a larger time constant than the three-phase motor 800.

Figure 34:
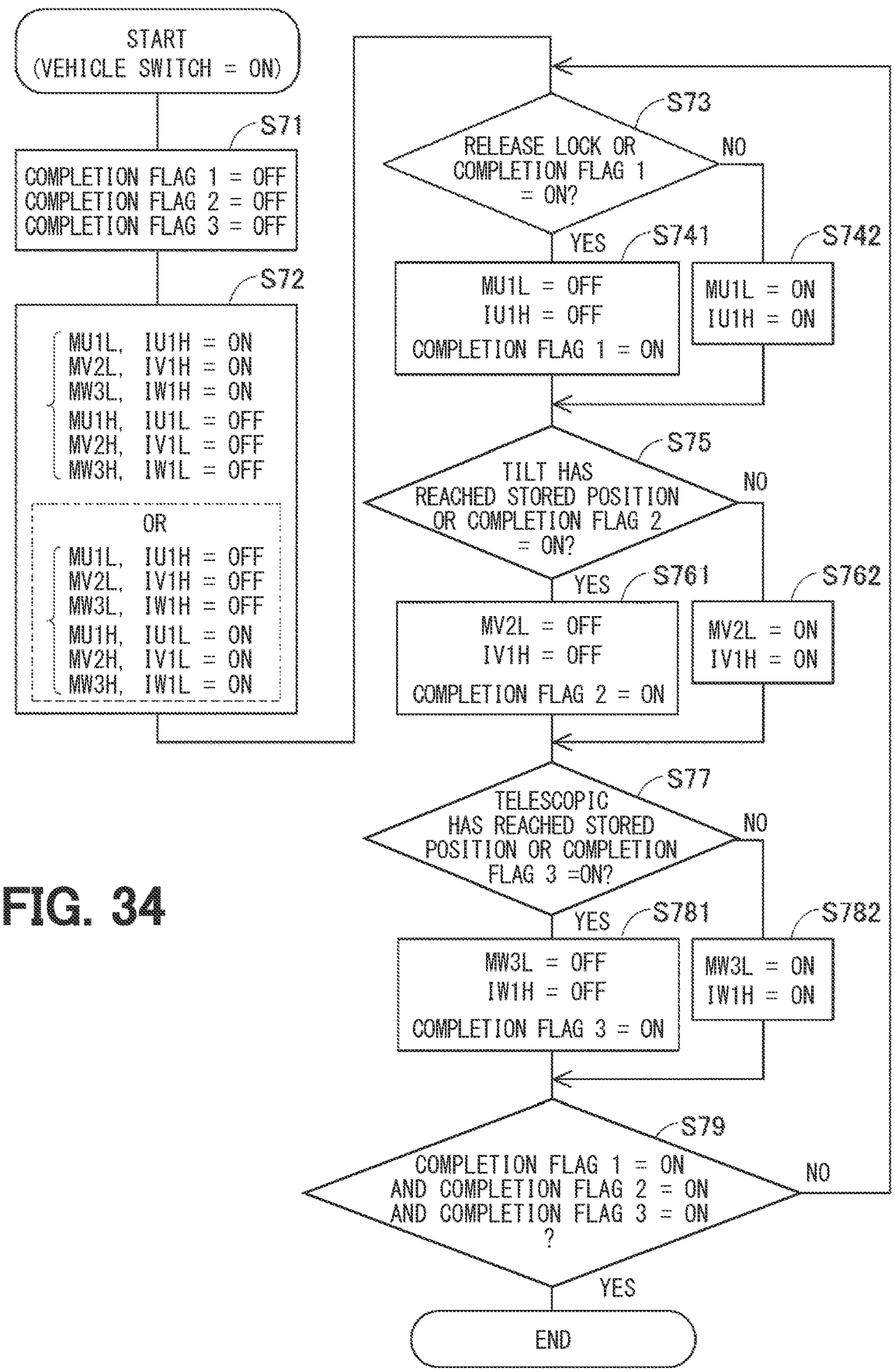
FIG. 34 is a flowchart illustrating an operation immediately after vehicle switching.
Figure 35:
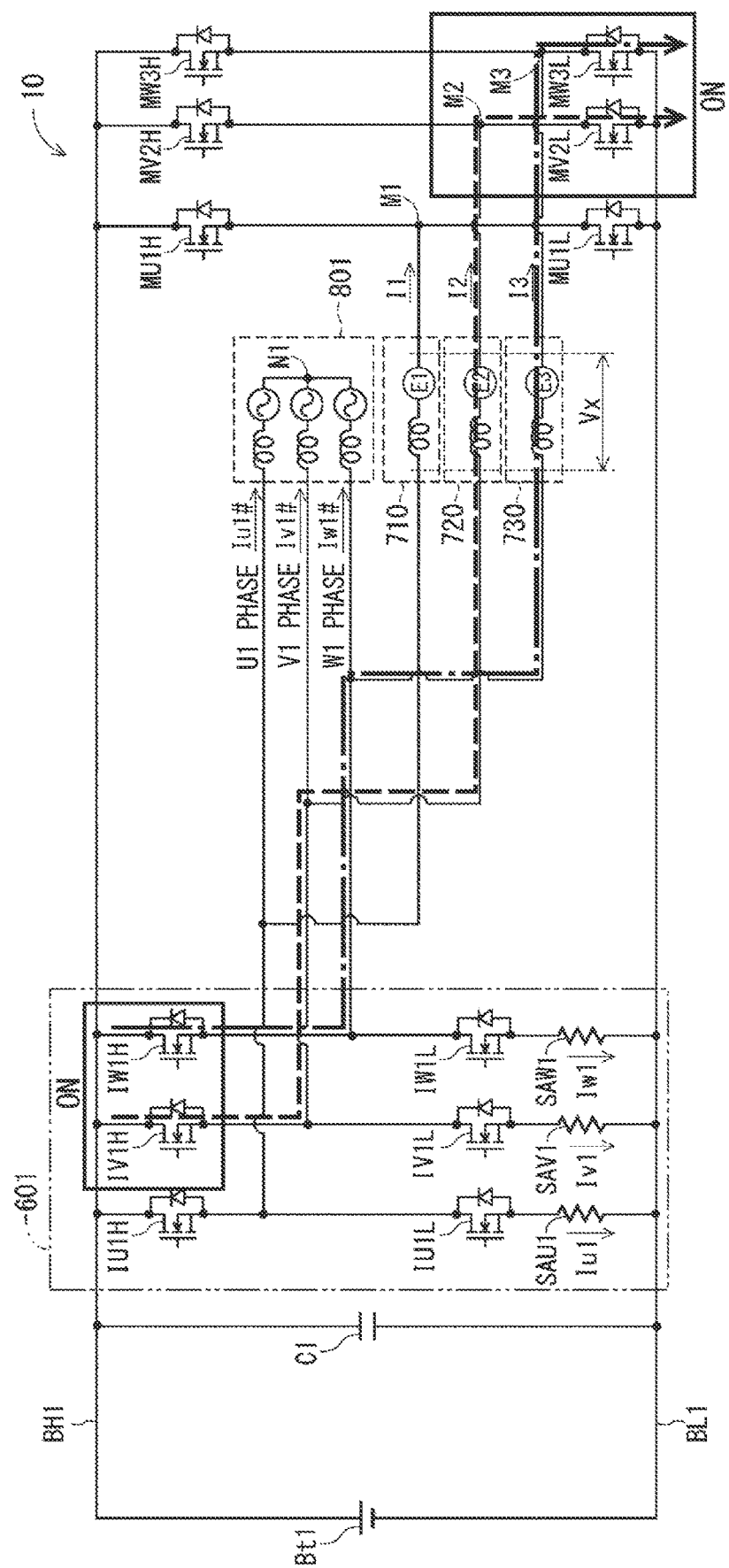
FIG. 35 is a diagram illustrating a current path in S741 of FIG. 34 in the configuration of FIG. 6.

Next, an operation immediately after the turning-on of the vehicle switch will be described with reference to a flowchart of FIG. 34 and a circuit configuration diagram of FIG. 35. FIG. 35 illustrates a state in which the tilt actuator 720 and the telescopic actuator 730 are energized in the configuration of FIG. 6 of the second embodiment. Here, a description will be given assuming that DC motor relays MU1r/R, MV2r/R, MW3r/R are not present. In the configuration including the DC motor relays MU1r/R, MV2r/R, MW3r/R, it is assumed that the DC motor relays MU1r/R, MV2r/R, MW3r/R are turned on at least at the time of energization of the corresponding DC motor.

Figure 17:
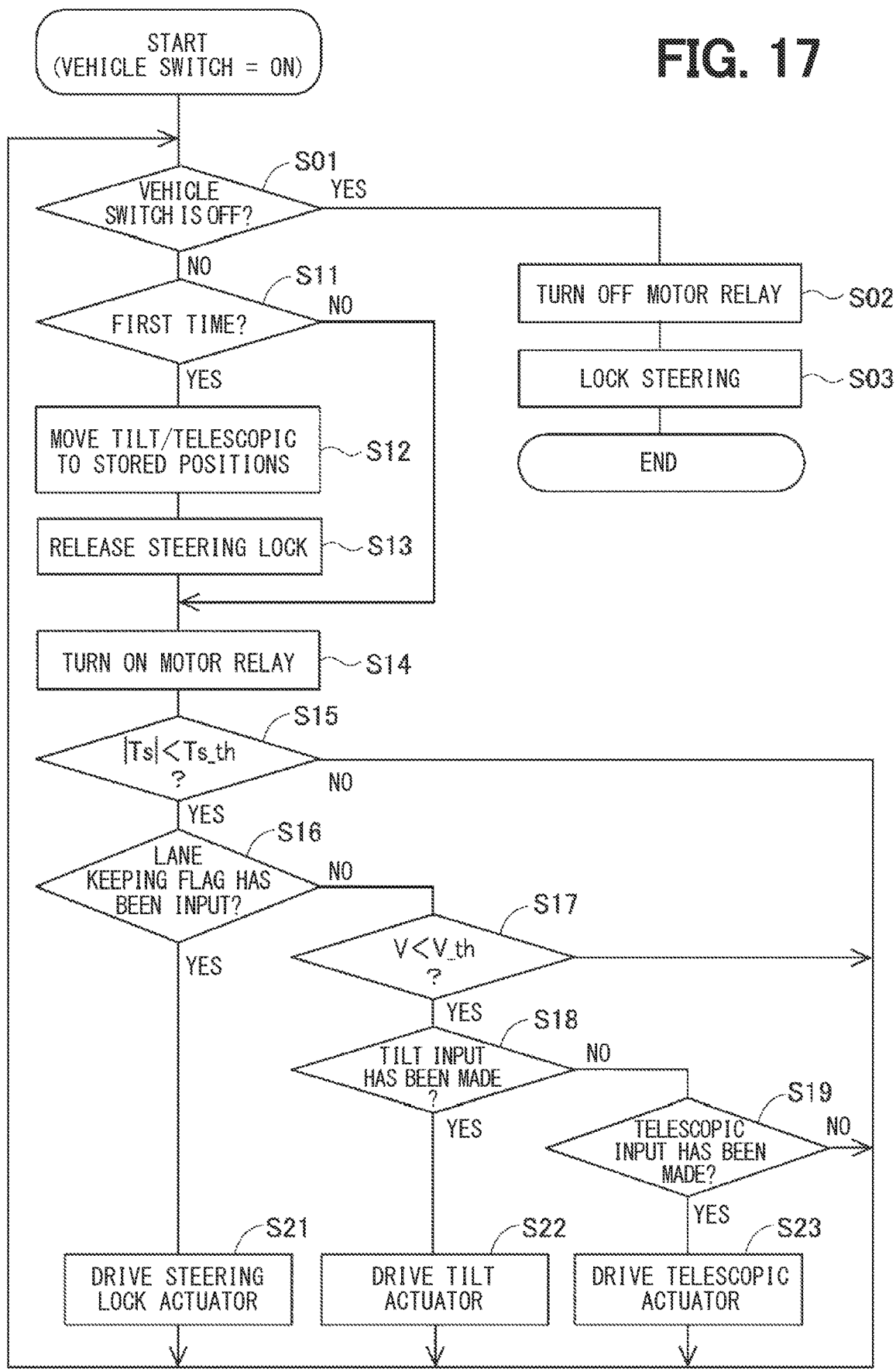
FIG. 17 is a flowchart illustrating an overall operation of the ECU.

In the present embodiment, there is a request to move the tilt and telescopic positions to the stored positions as soon as possible immediately after the turning-on of the vehicle switch illustrated in S01 of FIG. 17. Therefore, when the absolute value |Ts| of the steering torque is low and the vehicle speed V is low, the three-phase motor 800 is not energized, and the plurality of DC motors 710, 720, 730 are energized simultaneously. A completion flag 1 in FIG. 34 is off while the steering is locked, and the flag is turned on when the steering lock is released. A completion flag 2 is off when the tilt is at a position except for the stored position, and the flag is turned on when the tilt reaches the stored position. A completion flag 3 is off when the telescopic is at a position except for the stored position, and the flag is turned on when the telescopic reaches the stored position. In S71 immediately after the turning-on of the vehicle switch, all of the completion flag 1, the completion flag 2, and the completion flag 3 are set to off as initial values.

In S72, the control unit 30 turns off all the DC motor switches MU1H, MV2H, MW3H on the high potential side, turns on all the DC motor switches MU1L, MV2L, MW3L on the low potential side, turns on the inverter switching elements IU1H, IV1H, IW1H on the high potential side of all phases, and turns off the inverter switching elements IU1L, IV1L, IW1L on the low potential side of all phases. S73 and subsequent steps will be described on the premise of this initial state. Thus, the three-phase motor 800 is not energized, and the DC motors 710, 720, 730 can be energized simultaneously.

As another method, the control unit 30 may turn on all the DC motor switches MU1H, MV2H, MW3H on the high potential side, turn off all the DC motor switches MU1L, MV2L, MW3L on the low potential side, turn off the inverter switching elements IU1H, IV1H, IW1H on the high potential side of all phases, and turn on the inverter switching elements IU1L, IV1L, IW1L on the low potential side of all phases. When the DC motor is connected to only one phase or two phases of the three phases, or when only the DC motor connected to one phase or two phases is energized, "all phases" described above for the inverter switching elements is replaced with "a phase to which the DC motor is connected".

When it is desired to change the energization direction of each of the DC motors 710, 720, 730 in accordance with the condition of the tilt or telescopic position or the like, the following may be performed. First, the inverter switching elements IU1H, IV1H, IW1H on the high potential side and the inverter switching elements IU1L, IV1L, IW1L on the low potential side are caused to perform the switching operation at the same duty ratio, for example, 50%. In accordance with the direction in which each DC motor is desired to be energized, the DC motor switches MU1H, MV2H, MW3H on the high potential side are turned off and the DC motor switches MU1L, MV2L, MW3L on the low potential side are turned on, or the inverter switching elements IU1H, IV1H, IW1H on the high potential side are turned on and the inverter switching elements IU1L, IV1L, IW1L on the low potential side are turned off.

By causing the inverter switching elements IU1H/L, IV1H/L, IW1H/L of each phase to perform the switching operation at the same duty ratio or turning off the inverter switching elements on the high potential side and the low potential side to stop the energization of the three-phase motor 800, and by changing the DC motor terminal voltages Vm1, Vm2, Vm3 by the switching or the switching operation of the DC motor switches MU1H/L, MV2H/L, MW3H/L, it is possible to simultaneously energize the DC motors 710, 720, 730 without energizing the three-phase motor 800.

In S73, it is determined whether the steering lock has been released or the completion flag 1 is on. In the case of YES in S73, the DC motor switch MU1L and the inverter switching element IU1H are turned off in S741. At this time, the completion flag 1 is on. FIG. 35 illustrates a current path at this time. In the case of NO in S73, MU2L and IU1H are maintained in the ON state in S742, and the energization of the steering lock actuator 710 is continued.

In S75, it is determined whether the tilt has reached the stored position or the completion flag 2 is on. In the case of YES in S75, the DC motor switch MV2L and the inverter switching element IV1H are turned off in S761. At this time, the completion flag 2 is on. In the case of NO in S75, MV2L and IV1H are maintained in the ON state in S762, and the energization of the tilt actuator 720 is continued.

In S77, it is determined whether the telescopic has reached the stored position or the completion flag 3 is on. In the case of YES in S77, the DC motor switch MW3L and the inverter switching element IW1H are turned off in S781. At this time, the completion flag 3 is on. In the case of NO in S77, the ON states of MW3L and IW1H are maintained in S782, and the energization of the telescopic actuator 730 is continued.

In S79, it is determined whether all of the completion flag 1, the completion flag 2, and the completion flag 3 are on. In a case where all the completion flags 1 to 3 are on and the determination is YES in S79, the processing ends. On the other hand, when any one of the completion flag 1, the completion flag 2, and the completion flag 3 is off, the determination is NO in S79, the processing returns to before S73, and the determination steps of S73, S75, and S77 are repeated.

Next, control related to the drive and stop of the DC motor during the drive of the three-phase motor will be described with reference to FIGS. 36 to 40. In the description of this portion, only "710" is used as the reference character of the DC motor. Although not mentioned in the above description, it is assumed that the control unit 30 detects an abnormality such as an overcurrent abnormality in the inverter 601 or the three-phase motor 800.

Figure 36:
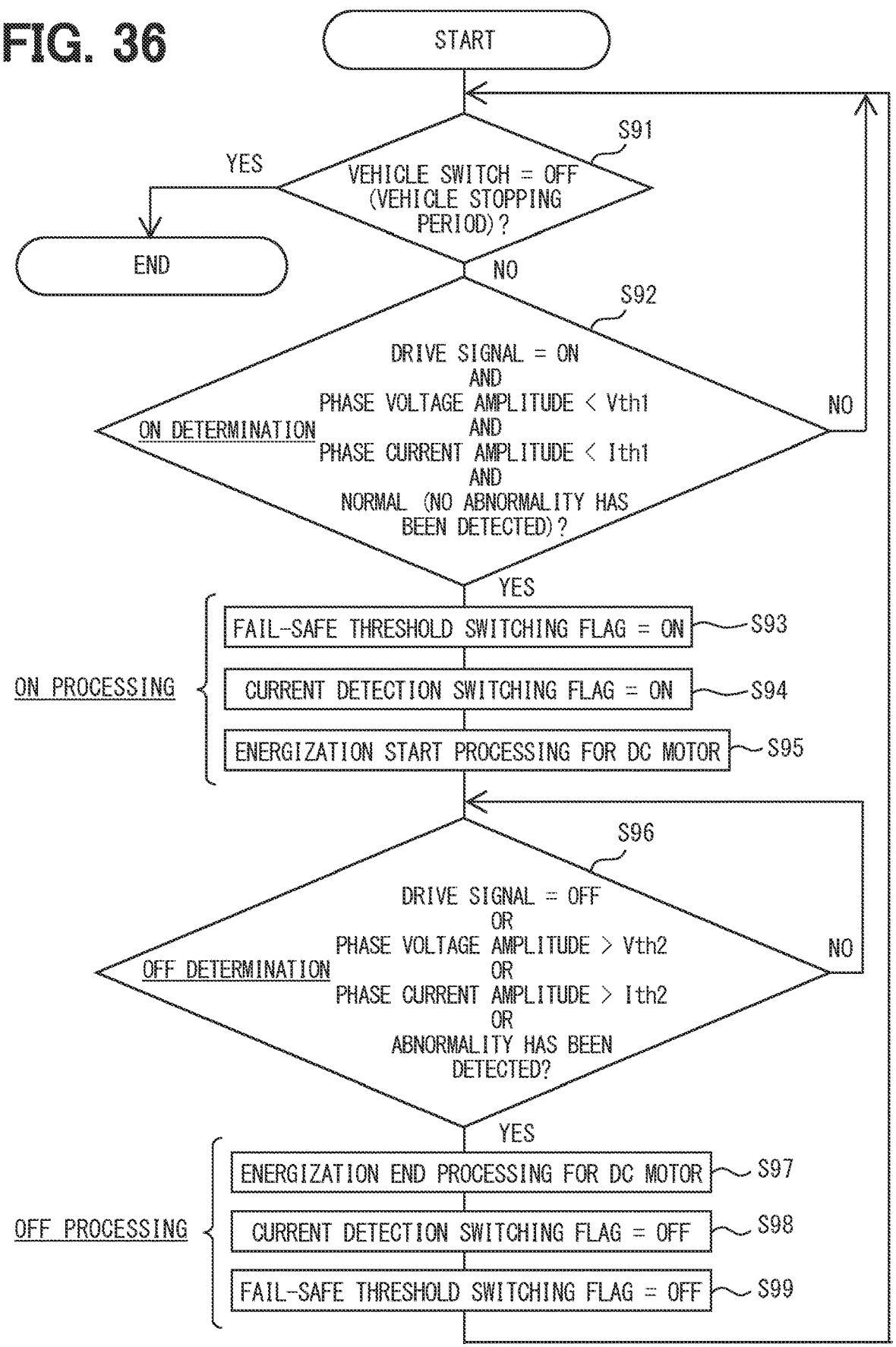
FIG. 36 is a flowchart for switching between the drive and stop of the DC motor during the drive of the three-phase motor.

FIG. 36 illustrates a flowchart for switching between the drive and stop of the DC motor 710 during the drive of the three-phase motor 800. The control unit 30 switches between the drive and stop of the DC motor 710 by controlling the neutral point voltage Vn1 on the basis of predetermined conditions described below. In S91, it is determined whether the vehicle switch 11 is off, that is, whether it is a vehicle stopping period, and in the case of YES, the control unit 30 ends the processing. When the vehicle switch 11 is on and the determination is NO in S91, the processing proceeds to S92.

In step S92, as "ON determination", the start of the energization of the DC motor 710 is determined in accordance with the AND condition of each of the following items. When the conditions of all the items are satisfied, the determination is YES in S92, and the processing proceeds to "ON processing" in S93 to S95. When the condition of even one item is not satisfied, the processing returns to before S91.

[1] Drive signal=ON.

[2] The phase voltage amplitude is smaller than a threshold Vth1, and the phase current amplitude is smaller than a threshold Ith1.

[3] The abnormality of the inverter 601 or the three-phase motor 800 has not been detected, that is, the inverter 601 and the three-phase motor 800 are normal.

The drive signal in [1] is turned on when the initial drive is performed at the start of the vehicle, when there is a request for releasing the steering lock by the driver's operation, when a command signal for driving the DC motor 710 is notified from another ECU, or the like. In the case of the DC motors 720, 730, the drive signal is turned on when there is an input in the tilt switch 12 or the telescopic switch 13.

[2] indicates that there is a margin in the output of the inverter 601. When the phase voltage amplitude is smaller than the threshold Vth1 and the phase current amplitude is smaller than the threshold Ith1, it is determined that there is a margin for distributing power to the DC motor 710 because the power supply to the three-phase motor 800 is small. It is sufficient that the phase voltage amplitude is a value correlated with the amplitude of the phase voltage command and that the phase current amplitude is a value correlated with the amplitude of the actual phase current. For example, the rotational speed of the three-phase motor 800 may be used as a value correlated with the phase voltage amplitude or the phase current amplitude. A current command value may be used as the phase current amplitude. The determination may be performed on all of [1], [2] and [3] or may be performed some of [1], [2] and [3]. The determination may be performed on the basis of the absolute value |Ts| of the steering torque or the vehicle speed V described with reference to FIG. 17.

Figure 39:
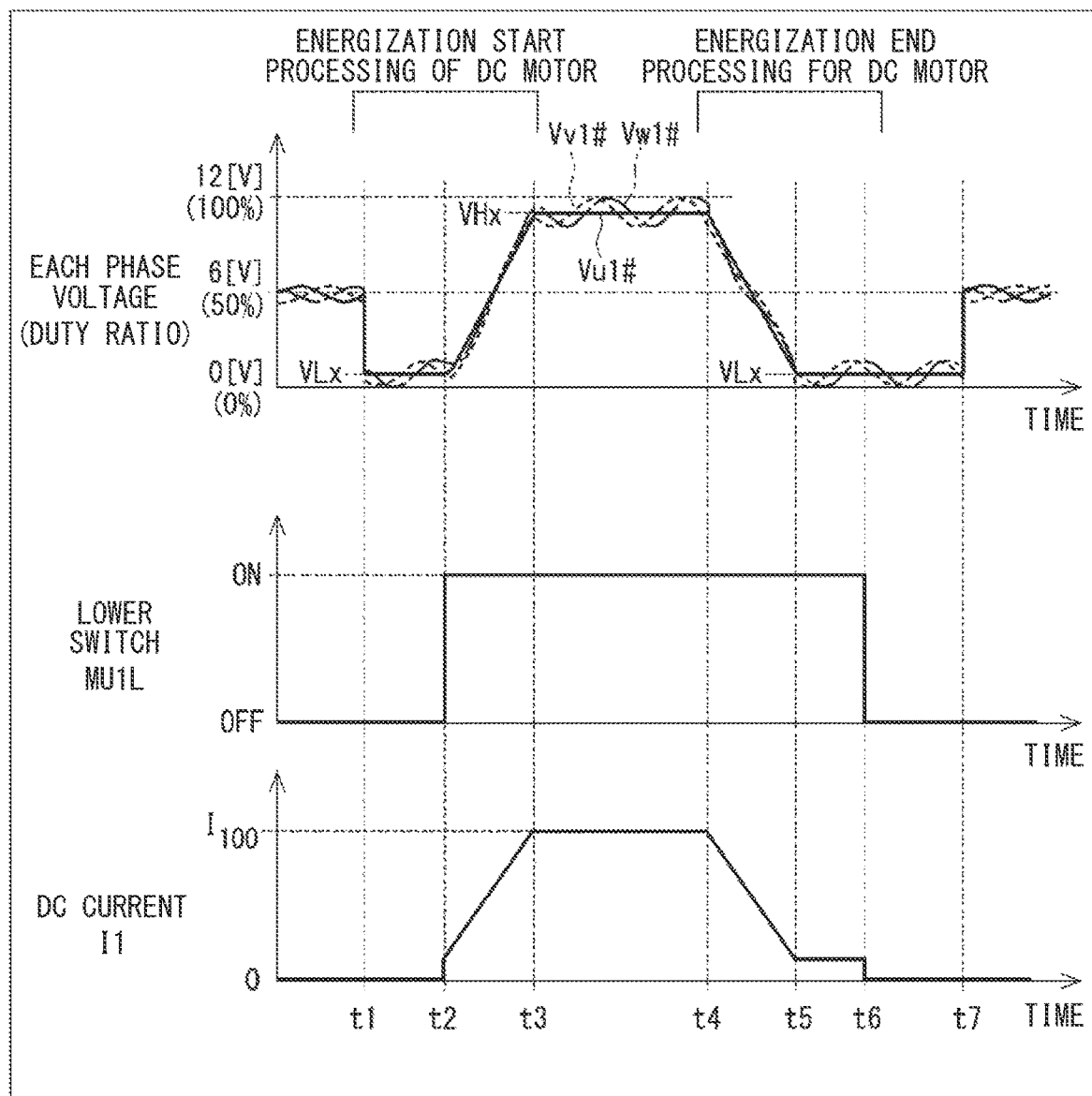
FIG. 39 is a time chart illustrating Control Example 1 of the drive and stop of the DC motor during the drive of the three-phase motor.
Figure 40:
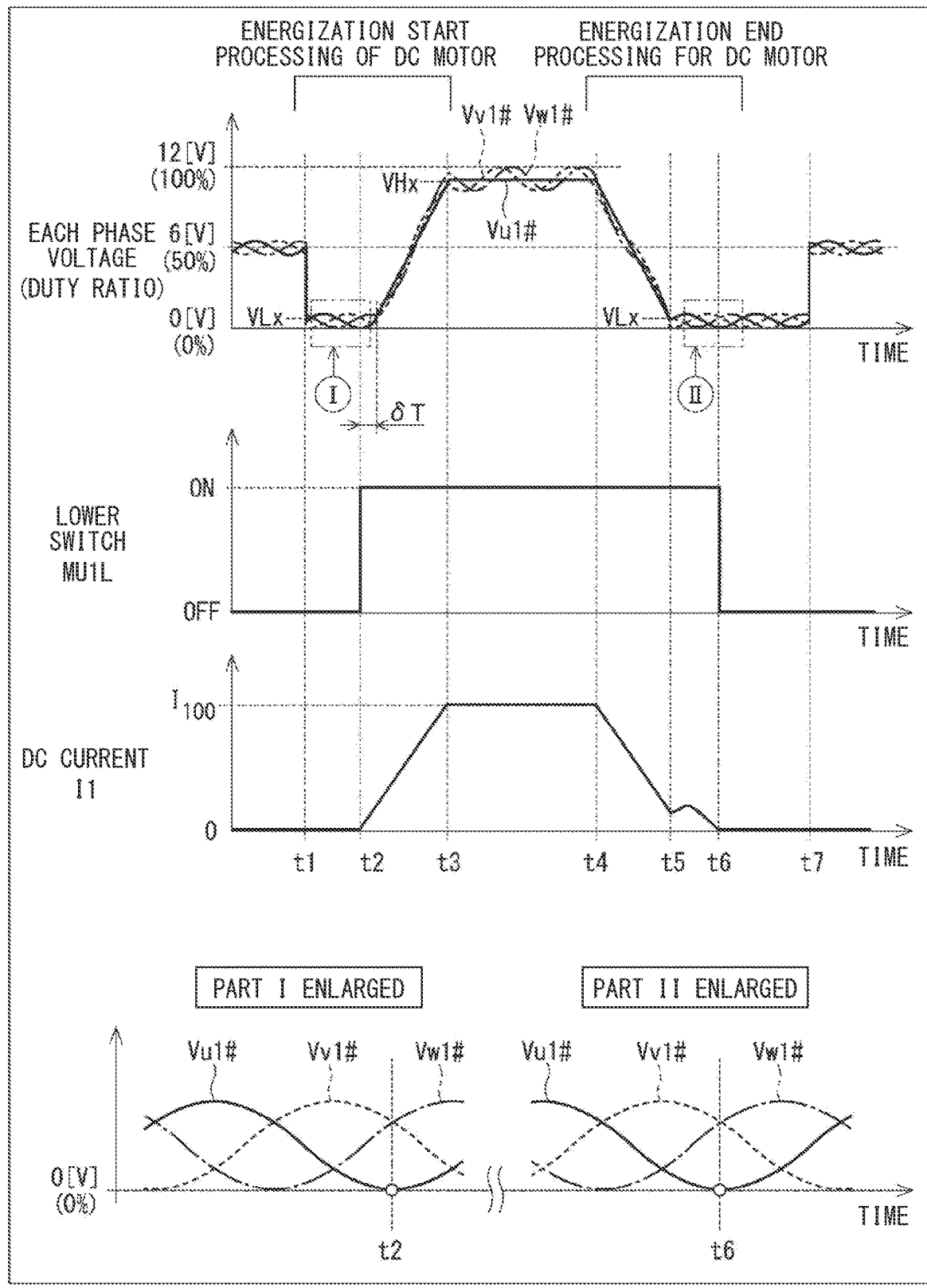
FIG. 40 is a time chart illustrating Control Example 2 of the drive and stop of the DC motor during the drive of the three-phase motor.

In S93 of the ON processing, a fail-safe threshold switching flag for a fail-safe threshold in the abnormality detection of the inverter 601 or the three-phase motor 800 is turned on. Thereby, the control unit 30 increases the threshold for determining the overcurrent for the three-phase current by the amount of the current assumed to flow through the DC motor 710. In addition to the fail-safe threshold in the abnormality detection for the three-phase motor 800, a fail-safe threshold in the abnormality detection for the circuit or the DC motor 710 may be set. In S94, a current detection switching flag is turned on. In S95, "energization start processing for the DC motor" corresponding to the period from time t1 to time t3 in FIGS. 39 and 40 is executed, and the DC motor 710 is driven.

Figure 37:
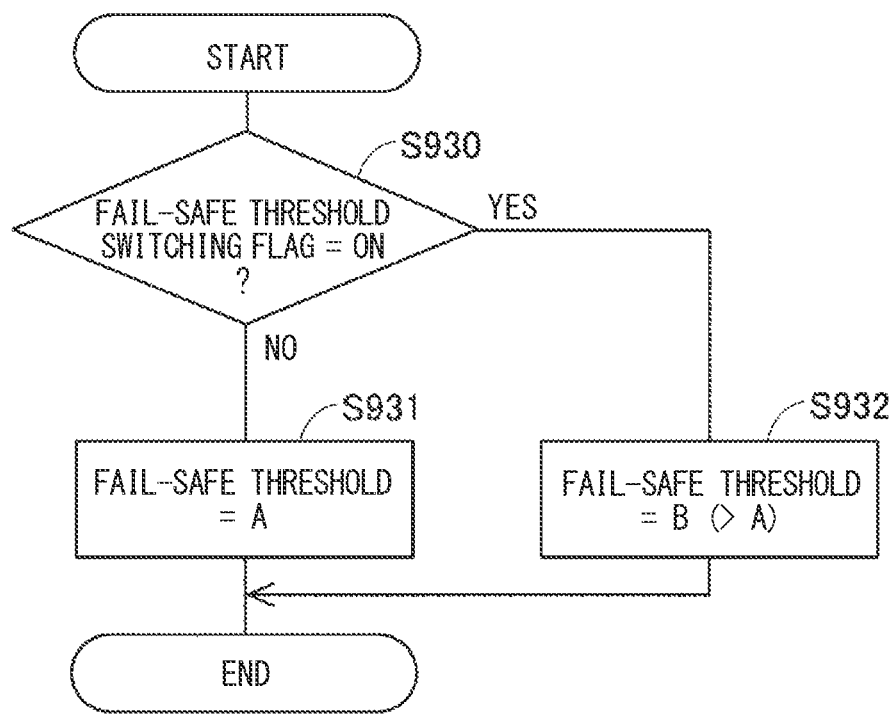
FIG. 37 is a flowchart (Example 1) for fail-safe threshold switching.
Figure 38:
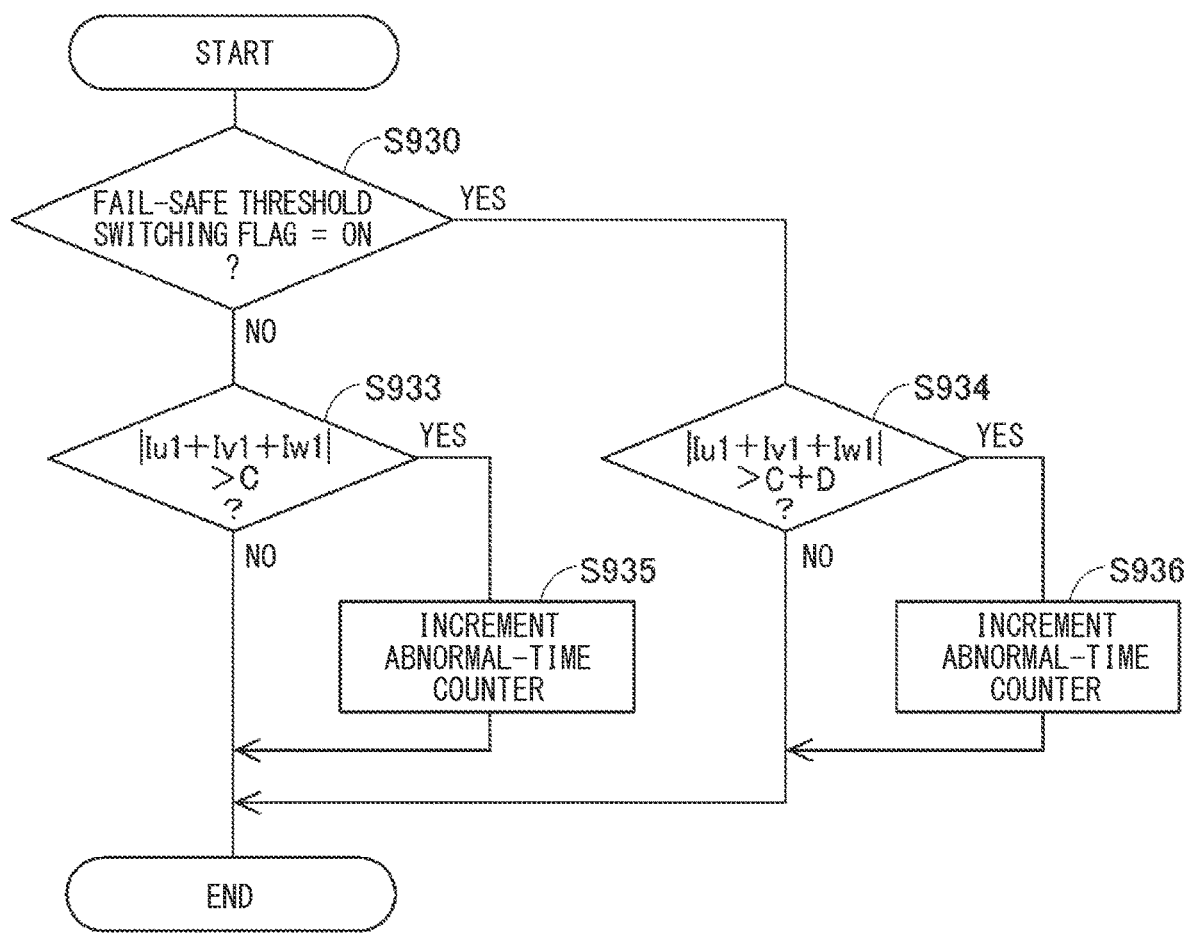
FIG. 38 is a flowchart (Example 2) for fail-safe threshold switching.

As thus described, the control unit 30 switches the fail-safe threshold in the abnormality detection between when the DC rotating machine DC motor 710 is driven and when the motor is not driven. FIGS. 37 and 38 illustrate Flowchart Examples 1 and 2 of the fail-safe threshold switching. In Example 1 illustrated in FIG. 37, when the fail-safe threshold switching flag is off in S930, the fail-safe threshold is set to A in S931, and when the fail-safe threshold switching flag is on, the fail-safe threshold is set to B (>A) in S932.

In Example 2 illustrated in FIG. 38, when the fail-safe threshold switching flag is off in S930, it is determined in S933 whether the absolute value (|Iu1+Iv1+Iw1|) of the sum of the three-phase currents is larger than C. When the fail-safe threshold switching flag is on, it is determined in S934 whether the absolute value (|Iu1+Iv1+Iw1|) of the sum of the three-phase currents is larger than (C+D). In the case of YES in S933, the control unit 30 increments an abnormal-time counter in S935. In the case of YES in S934, the control unit 30 increments the abnormal-time counter in S936.

Figure 18:
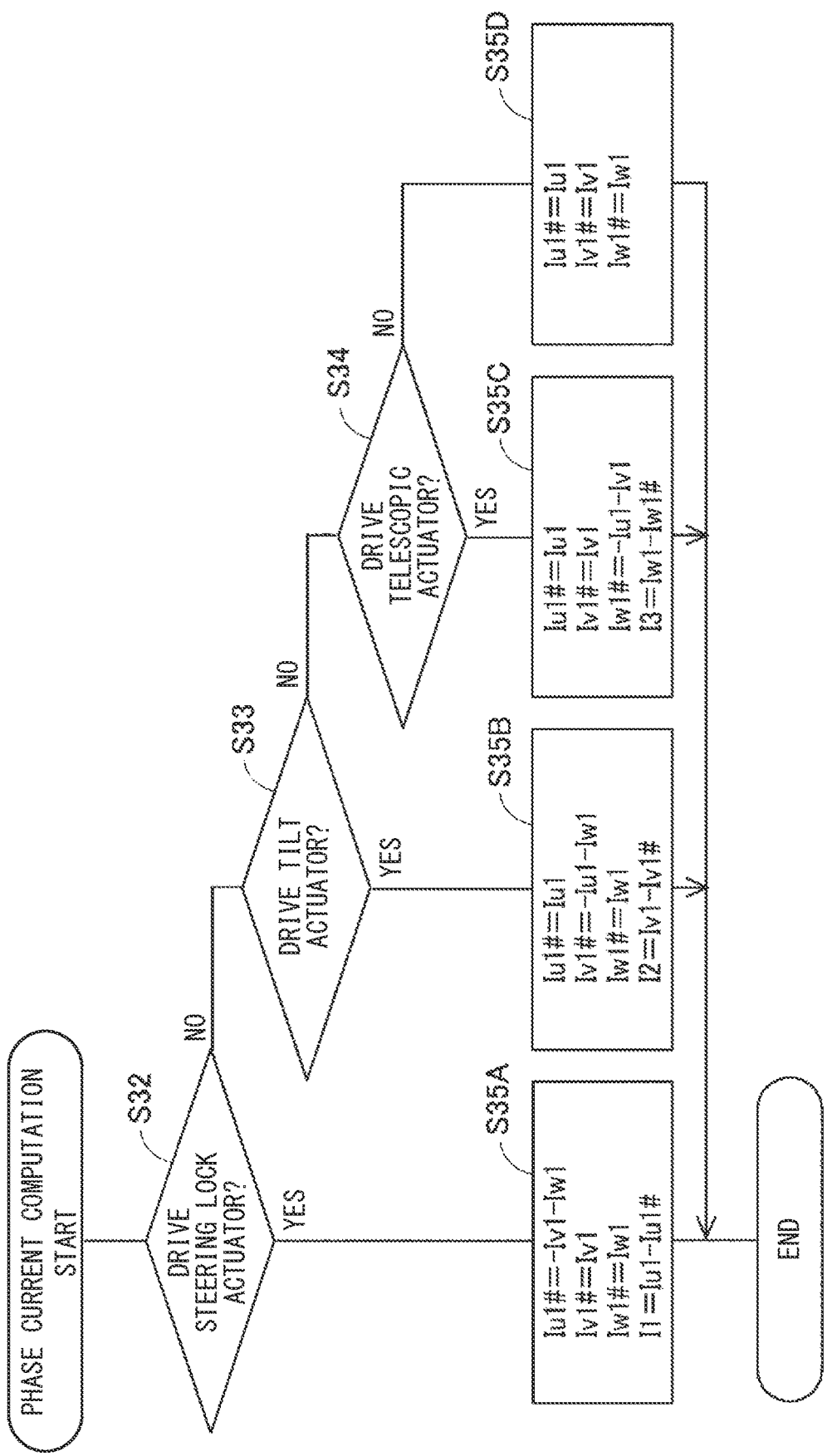
FIG. 18 is a flowchart of phase current computation processing.

The flowchart of the phase current computation of FIG. 18. is referred to for the processing when the current detection switching flag is turned on. That is, when the current detection switching flag is on, motor phase currents Iu#, Iv#, Iw# and DC currents I1, I2 are computed by the formulas of S35A, S35B, and S35C. On the other hand, when the current detection switching flag is off, the motor phase currents Iu#, Iv#, Iw# are computed by the formula of S35D.

Returning to FIG. 36, in S96, as "OFF determination", the end of the energization of the DC motor 710 is determined in accordance with the OR condition of each of the following items. When the condition of at least one item is satisfied, the determination is YES in S96, and the processing proceeds to "OFF processing" in S97 to S99. When the condition of any item is not satisfied, the processing returns to before S96.

[1] Drive signal=Off.

[2] The phase voltage amplitude is larger than a threshold Vth2, or the phase current amplitude is larger than a threshold Ith2.

[3] The abnormality of the inverter 601 or the three-phase motor 800 is detected.

The drive signal in [1] is turned off when the request for releasing the steering lock is ended, when a command signal for stopping the DC motor 710 is notified from another ECU, or the like. In the case of the DC motors 720, 730, the drive signal is turned off when the tilt switch 12 or the telescopic switch 13 is turned off.

[2] indicates that there is no margin in the output of the inverter 601. When the phase voltage amplitude is larger than the threshold Vth2 or the phase current amplitude is larger than the threshold Ith2, it is determined that there is no margin for distributing output to the DC motor 710 because the power supply to the three-phase motor 800 is large. ON/OFF hysteresis may be provided by setting thresholds for ON determination and OFF determination to Vth1<Vth2 and Ith1<Ith2. The determination may be performed on all of [1], [2] and [3] or may be performed some of [1], [2] and [3]. The determination may be performed on the basis of the absolute value |Ts| of the steering torque or the vehicle speed V described with reference to FIG. 17.

In the OFF processing, processing in a reverse order to the ON processing is performed. In S97, "energization end processing for the DC motor" corresponding to the period from time t4 to time t6 in FIGS. 39 and 40 is executed, and the DC motor 710 is stopped. In S98, the current detection switching flag is turned off. In S99, the fail-safe threshold switching flag is turned off. Thus, the threshold changed while the DC motor 710 is energized is returned to the original value. Thereafter, the processing returns to before S91, and the routine is repeated.

In the flowchart of FIG. 36, the sequence in which the OFF determination is executed after the completion of the ON processing has been described, but the processing may proceed to the OFF processing when the condition of the OFF determination is satisfied during the energization start processing for the DC motor 710. Conversely, when the ON determination is satisfied during the energization end processing for the DC motor, the processing may proceed to the ON processing. In addition, in order to avoid switching back and forth between the ON and OFF states, it may be configured that the ON determination is not accepted again for a predetermined period (e.g., about several 100 [ms]) after the OFF processing.

FIGS. 39 and 40 illustrate changes in each phase voltage of the inverter 601, ON/OFF of the DC motor switch on the low potential side, and changes in the DC current I1 flowing through the DC motor 710 as Control Examples 1 and 2 at the time of the drive and stop of the DC motor 710 during the drive of the three-phase motor 800. As indicated by the vertical axis of each phase voltage, each phase voltage may be converted into a duty ratio with 12 [V] as 100%. In addition, the DC motor switch on the low potential side will be abbreviated as a "lower switch", and only "MU1L" will be described as a reference character.

First, detailed differences between Control Examples 1 and 2 will be ignored, and the overall operation will be described. As a main target, at the time of stopping the drive of the DC motor 710, the control unit 30 reduces the current on the inverter 601 side and then turns off the lower switch MU1L. Therefore, as described with reference to FIG. 36, for example, when the phase voltage amplitude is equal to or larger than the threshold Vth1 at the time of ON determination, the control unit 30 does not energize the DC motor 710. When the phase voltage amplitude exceeds the threshold Vth2 during the energization of the DC motor 710, the control unit 30 ends the energization of the DC motor 710. The thresholds Vth1 and Vth2 are preferably set to voltage values having a margin in consideration of times required for the start and stop.

The average value, or the average equivalent value of each phase voltage in the three-phase motor 800 decreases from 6 [V] to VLx close to 0 [V] (e.g., about 1 [V]) at time t1, then increases from VLx when the lower switch MU1L is turned on at time t2, and reaches VHx close to 12 [V] (e.g., about 11 [V]) at time t3. At this time, the DC current increases from 0 to the maximum value $I_{100}$ as each phase voltage changes, and is then maintained in that state.

When it is determined that the energization of the DC motor 710 ends, the control unit 30 controls the inverter switching elements IU1H/L, IV1H/L, IW1H/L at time t4 so as to lower the respective phase voltages. At time t6 after time t5 when the average value or the average equivalent value of each phase voltage decreases to VLx, the control unit 30 turns off the lower switch MU1L. To put it simply, the control unit 30 turns off the lower switch MU1L after reducing the current such that the current on the inverter 601 side decreases gradually.

As thus described, at the time of stopping the DC motor 710, the control unit 30 controls the inverter switching elements IU1H/L, IV1H/L, IW1H/L so as to lower the voltage on the first terminal T1 side of the DC motor 710 and then turns off the lower switch MU1L to end the energization of the DC motor 710. As a result, even when a switch having a relatively small current capacity is used for the DC motor switch MU1H/L, it is possible to prevent the lower switch MU1L from being overloaded at the stop of the energization. In addition, a transistor or a mechanical relay that performs a slow switching operation can be used on the premise that a high-speed switching operation is not performed.

Next, there is a difference between Control Example 1 and Control Example 2 in the phase voltage computation of the U1 phase, which is the energized phase, in the period immediately before the turning-on of the lower switch MU1L and the period before and after the turning-off of the lower switch MU1L, that is, the period from time t1 to time t2 and the period from time t5 to time t7. In Control Example 1, the neutral point voltage Vn1 is shifted such that the phase voltage Vu1# of the U1 phase, which is the energized phase, is constant. In this case, the U1-phase voltage Vu1# does not completely become 0 [V] at times t2 and t6 when the lower switch MU1L is turned on or off. During the period from time t5 to time t6 before the turning-off of the lower switch MU1L, the DC current I1 corresponding to the constant phase voltage Vu1# flows.

In Control Example 2, during the period from time t1 to time t2 and from time t5 to time t7, the neutral point voltage Vn1 is shifted while the three-phase voltage is kept as a sine wave. As illustrated in the lower enlarged view, the control unit 30 turns on or off the lower switch MU1L at the timing when the U1-phase voltage Vu1# is exactly 0 [V] (or the duty ratio of the U1 phase is exactly 0 [%]) or at the timing when the detection current becomes 0 or the current becomes 0 in consideration of the delay of the time constant of the energization path. The control unit 30 starts increasing each phase voltage after the lapse of the minute time δT from time t2. During the period from time t5 to time t6 before the turning-off of the lower switch MU1L, the DC current I1 corresponding to the sinusoidal phase voltage Vu1# flows. In Control Example 2, the voltage applied from the inverter 601 when the lower switch MU1L is turned on or off can be ideally set to 0.

[Circuit Configuration in which Two-System Three-Phase Motor is Driven]

Figure 41:
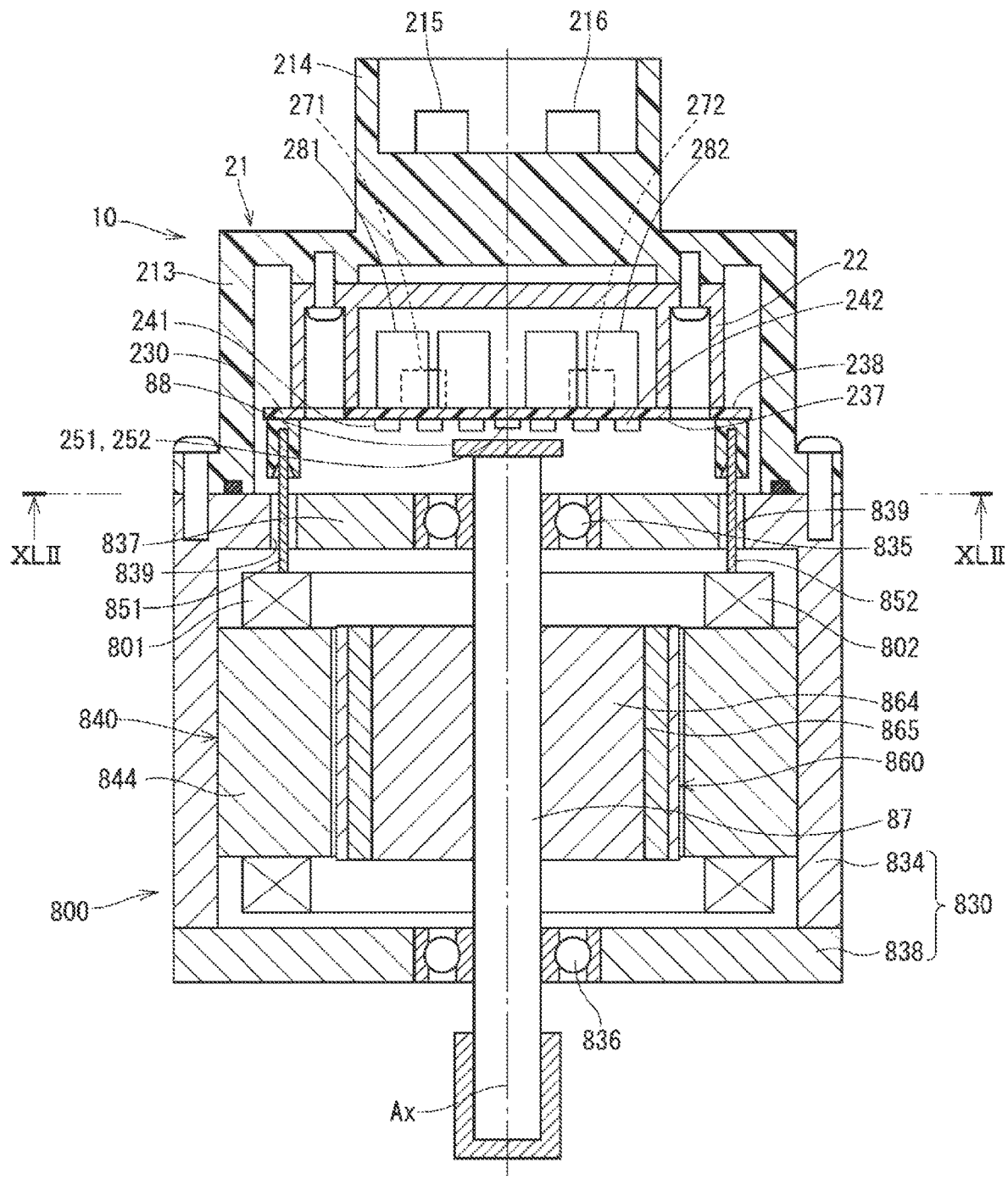
FIG. 41 is an axial sectional view of a two-system electromechanical integrated motor.
Figure 42:
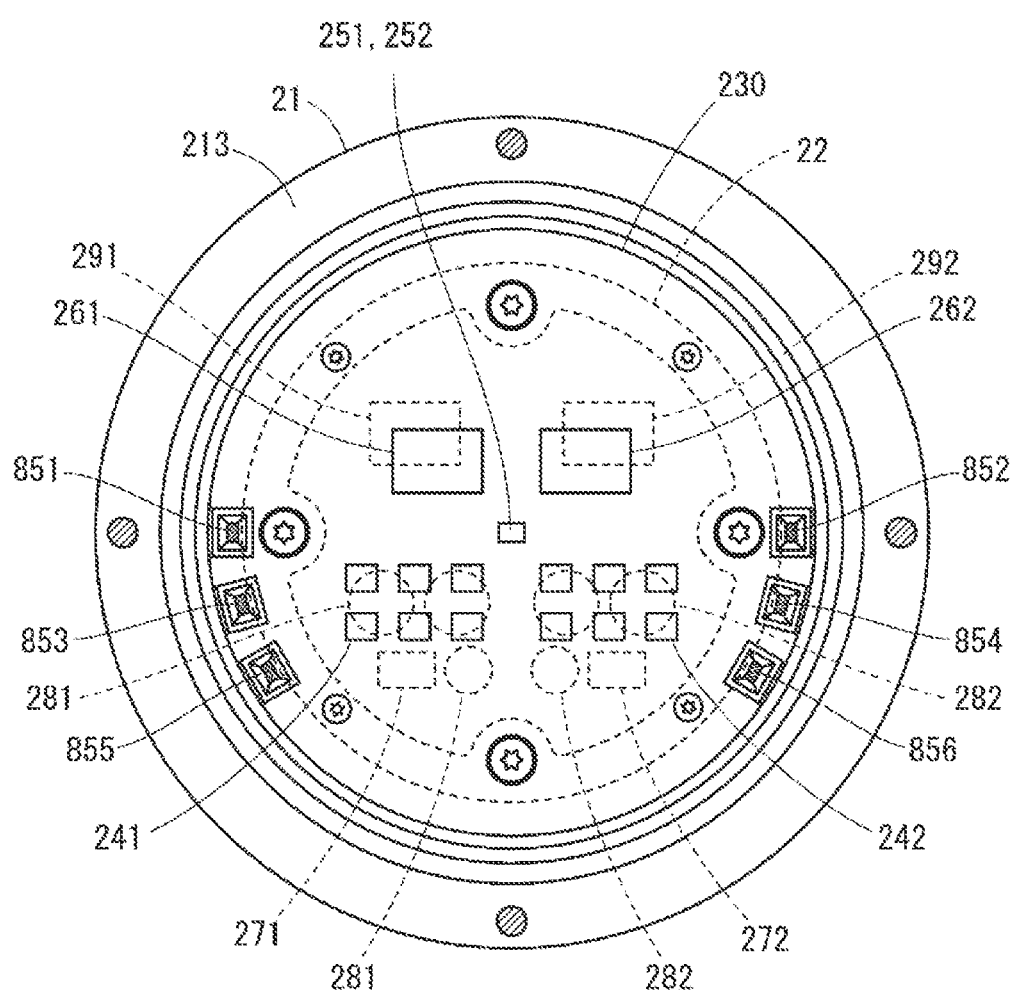
FIG. 42 is a cross-sectional view taken along a line XLII-XLII of FIG. 41.

Next, an embodiment in which the three-phase motor 800 having a two-system configuration is a drive target will be described. First, concerning the structure of the three-phase motor 800, a configuration example of an "electromechanical integrated motor" in which the ECU 10 is integrally configured on one side in the axial direction will be described with reference to FIGS. 41 and 42. In the embodiment illustrated in FIG. 41, the ECU 10 is disposed coaxially with an axis Ax of a shaft 87 on the side opposite to the output side of the three-phase motor 800. In another embodiment, the ECU 10 may be configured integrally with the three-phase motor 800 on the output side of the three-phase motor 800. The three-phase motor 800 is a brushless motor and includes a stator 840, a rotor 860, and a housing 830 that accommodates the stator 840 and the rotor 860.

The stator 840 includes a stator core 844 fixed to the housing 830 and two three-phase winding sets 801, 802 assembled to the stator core 844. Lead wires 851, 853, 855 extend from the respective phase windings constituting a first-system three-phase winding set 801 (hereinafter referred to as "first three-phase winding set") 801. Lead wires 852, 854, 856 extend from the respective phase windings constituting a second-system three-phase winding set (hereinafter referred to as "second three-phase winding set") 802. The phase windings are wound about respective slots 848 of the stator core 844.

The rotor 860 includes the shaft 87, supported by a rear bearing 835 and a front bearing 836, and a rotor core 864 fitted with the shaft 87. The rotor 860 is provided inside the stator 840 and is rotatable relative to the stator 840. At one end of the shaft 87, a permanent magnet 88 for detecting a rotational angle is provided.

The housing 830 has a bottomed cylindrical case 834 including a rear frame end 837, and a front frame end 838 provided at one end of the case 834. The case 834 and the front frame end 838 are fastened to each other by bolts or the like. The lead wires 851, 852, and the like of the respective three-phase winding sets 801, 802 are inserted through lead wire insertion holes 839 of the rear frame end 837, extend toward the ECU 10, and are connected to a substrate 230.

The ECU 10 includes a cover 21, a heatsink 22 fixed to the cover 21, the substrate 230 fixed to the heatsink 22, and various electronic components mounted on the substrate 230. The cover 21 protects the electronic components from external impact and prevents the entry of dust, water, and the like into the ECU 10. The cover 21 includes a connector portion 214 for external connection with a feed cable and a signal cable from the outside, and a cover portion 213. Feeding terminals 215, 216 of the connector portion 214 for external connection are connected to the substrate 230 via a path (not illustrated). Note that the connector is denoted by a reference character different from that in FIG. 4.

The substrate 230 is, for example, a printed board, is provided at a position facing the rear frame end 837, and is fixed to the heatsink 22. On the substrate 230, the electronic components for the two systems are provided independently for the respective systems. The number of the substrates 230 is not limited to one but may be two or more. Of the two main surfaces of the substrate 230, the surface facing the rear frame end 837 is taken as a motor surface 237, and the opposite surface, that is, the surface facing the heatsink 22, is taken as a cover surface 238.

On the motor surface 237, a plurality of switching elements 241, 242, rotational angle sensors 251, 252, custom integrated circuits (ICs) 261, 262, and the like are mounted. The plurality of switching elements 241, 242 correspond to IU1H/L or the like in each configuration diagram of the ECU and constitute the three-phase upper and lower arms of the respective systems. The rotational angle sensors 251, 252 are disposed so as to face the permanent magnet 88 provided at the tip of the shaft 87. The custom ICs 261, 262 and microcomputers 291, 292 each have a control circuit of the ECU 10. The two rotational angle sensors 251, 252, the microcomputers 291, 292, and the like need not be provided for the respective systems, and one rotational angle sensor and one microcomputer may be provided in common for the two systems.

On the cover surface 238, the microcomputers 291, 292, capacitors 281, 282, inductors 271, 272, and the like are mounted. In particular, the first microcomputer 291 and the second microcomputer 292 are disposed at a predetermined interval on the cover surface 238 that is the surface on the same side of the same substrate 230. The capacitors 281, 282 smooth the power input from the power supply and prevent the outflow of noise caused by the switching operations of the switching elements 241, 242, or the like. The inductors 271, 272 and the capacitors 281, 282 correspond to L1, C1, and the like in each configuration diagram of the ECU and constitute "noise prevention elements" that function as noise filters.

As illustrated in FIG. 43, the three-phase motor 800 is a three-phase double winding rotating machine in which two three-phase winding sets 801, 802 are coaxially provided. A voltage is applied from a first-system inverter (hereinafter, "first inverter") 601 to the U1-phase, V1-phase, and W1-phase windings 811, 812, 813 of the first three-phase winding set 801. A voltage is applied from a second-system inverter (hereinafter, "second inverter") 602 to the U2-phase, V2-phase, and W2-phase windings 821, 822, 823 of the second three-phase winding set 802.

The first three-phase winding set 801 and the second three-phase winding set 802 have the same electrical characteristics and are disposed on the common stator 840 so as to be offset from each other by an electrical angle of 30 [deg]. In this case, the counter-electromotive voltages generated in the respective phases of each of the first system and the second system are expressed by, for example, Formulas (9.1) to (9.3) and (9.4a) to (9.6a) on the basis of a voltage amplitude A, a rotational speed ω, and a phase θ.

$$Eu1 = -A\omega \sin\theta \tag{9.1}$$

$$Ev1 = -A\omega \sin(\theta-120) \tag{9.2}$$

$$Ew1 = -A\omega \sin(\theta+120) \tag{9.3}$$

$$Eu2 = -A\omega \sin(\theta+30) \tag{9.4a}$$

$$Ev2 = -A\omega \sin(\theta-90) \tag{9.5a}$$

$$Ew2 = -A\omega \sin(\theta+150) \tag{9.6a}$$

When the phase relationship between the two systems is reversed, for example, the phase (θ+30) of the U2 phase is (θ−30). Moreover, a phase difference equivalent to 30 [deg] is generically expressed as (30±60×k) [deg] (k is an integer). Alternatively, the second system may be disposed in the same phase as the first system. In this case, the counter-electromotive voltages generated in the respective phases of the second system are expressed by Formulas (9.4b) to (9.6b) instead of Formulas (9.4a) to (9.6a).

$$Eu2 = -A\omega \sin(\theta-30) \tag{9.4b}$$

$$Ev2 = -A\omega \sin(\theta+90) \tag{9.5b}$$

$$Ew2 = -A\omega \sin(\theta-150) \tag{9.6b}$$

Next, a configuration example of the ECU 10 that drives the two-system three-phase motor 800 will be described as the eleventh to fifteenth embodiments with reference to FIGS. 44 to 48. A portion where the first three-phase winding set 801 and the second three-phase winding set 802 are combined is the three-phase motor 800. The reference character "800" of the three-phase motor and the reference characters "821, 822, 823" of the three-phase winding of the second three-phase winding set 802 are illustrated only in FIG. 44 and are not illustrated in FIGS. 45 to 48. The ECU 10 according to each of the eleventh to fifteenth embodiments includes two inverters 601, 602. The reference characters of the inverter switching element, the current sensor, the motor relay, and the like of the second system are denoted by replacing "1" of the symbol of the first system with "2". Regardless of the configuration of the power supply, the DC voltage input to the second inverter 601 is referred to as an "input voltage Vr2".

The reference characters of the DC motors connected to the U2 phase, the V2 phase, and the W2 phase of the second three-phase winding set 802 are "740", "750", and "760", respectively, and the symbol of the operation voltage at the neutral point is Vn2. Similarly to the DC motors 710, 720, 730 of the first system, the counter-electromotive voltages generated in the DC motors 740, 750, 760 of the second system are referred to as E4, E5, E6, respectively.

The use of each of the DC motors 740, 750, 760 may be selected appropriately. For example, any one of the DC motors 740, 750, 760 may be a seat actuator or a steering wheel retraction actuator. Alternatively, steering actuators such as steering lock, tilt, and telescopic actuators may be provided as the DC motors 740, 750, 760 on the second system side.

The reference characters of the DC motor switches corresponding to the DC motors 740, 750, 760 are "MU4H/L, MV5H/L, and MW6H/L", respectively. The reference characters of the DC motor relays corresponding to the DC motors 740, 750, 760 are "MU4r/R, MV5r/R, and MW6r/R", respectively. The control unit 30 in the two-system configuration includes three-phase control units of the first system and the second system based on FIG. 15, and a DC control unit based on each of FIGS. 16A and 16B.

In the eleventh to fourteenth embodiments, the first inverter 601 and the second inverter 602 are connected to a common power supply Bt1. In the eleventh to fourteenth embodiments, the total number and distribution of the DC motors connected to the respective phases of each of the first system and the second system are different. The distribution of the DC motors is determined in consideration of a power balance, a heat generation balance, a balance of a use frequency and a use timing, and the like between the systems.

Eleventh Embodiment

Figure 44:
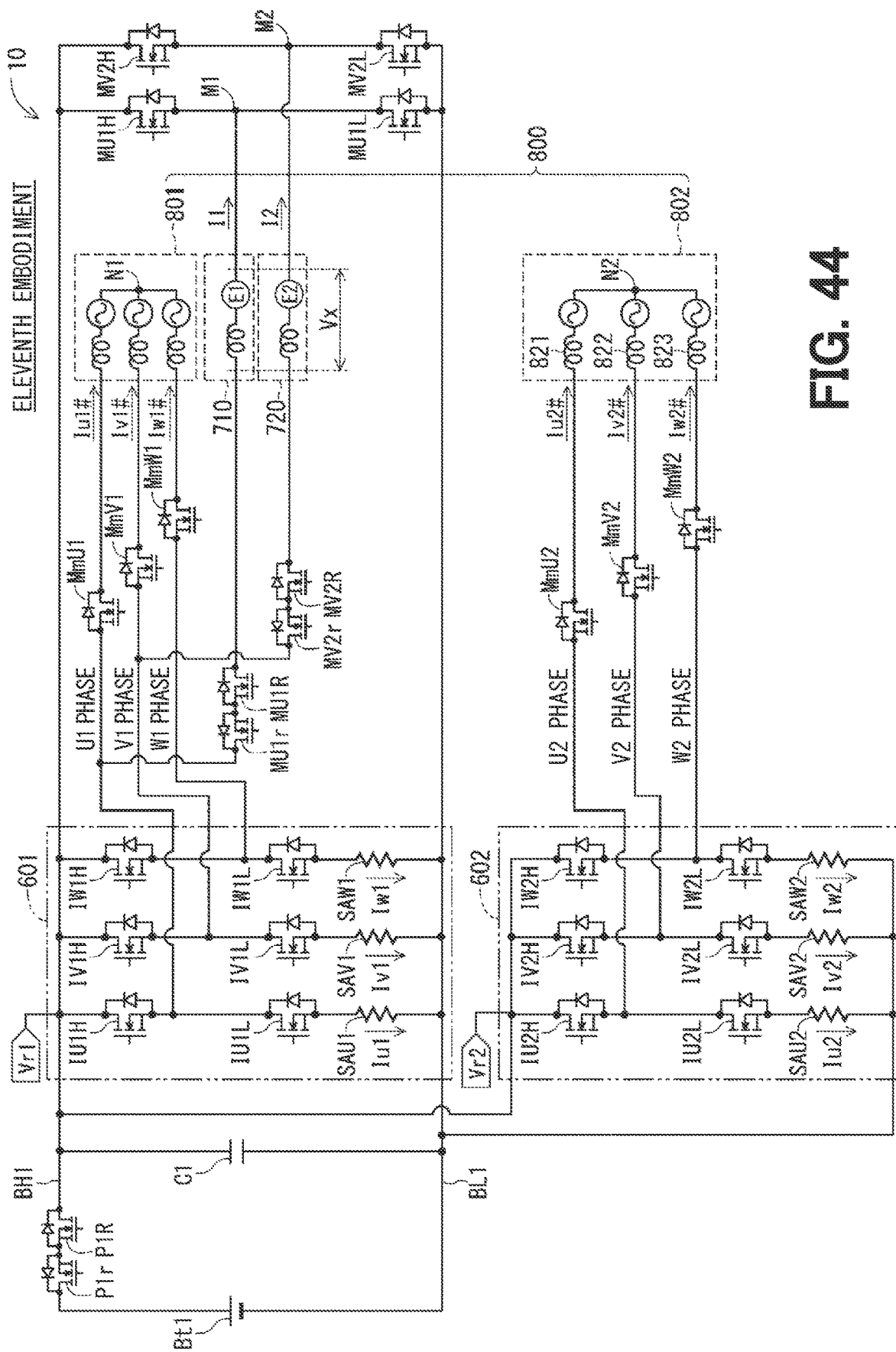
FIG. 44 is a circuit configuration diagram according to an eleventh embodiment (two-system, DC motor×2 (one side))

In the eleventh embodiment illustrated in FIG. 44, two DC motors 710, 720 are connected to the U1 phase and the V1 phase of the first three-phase winding set 801. DC motor relays MU1r/R, MV2r/R are provided between the branch points Ju, Jv of the U1-phase and V1-phase current paths and the first terminals of the DC motors 710, 720, respectively. On the other hand, no DC motor is connected to the second three-phase winding set 802. In the eleventh embodiment, since the DC motor is connected to only some of the plurality of systems, the roles of the systems are shared.

Twelfth Embodiment

Figure 45:
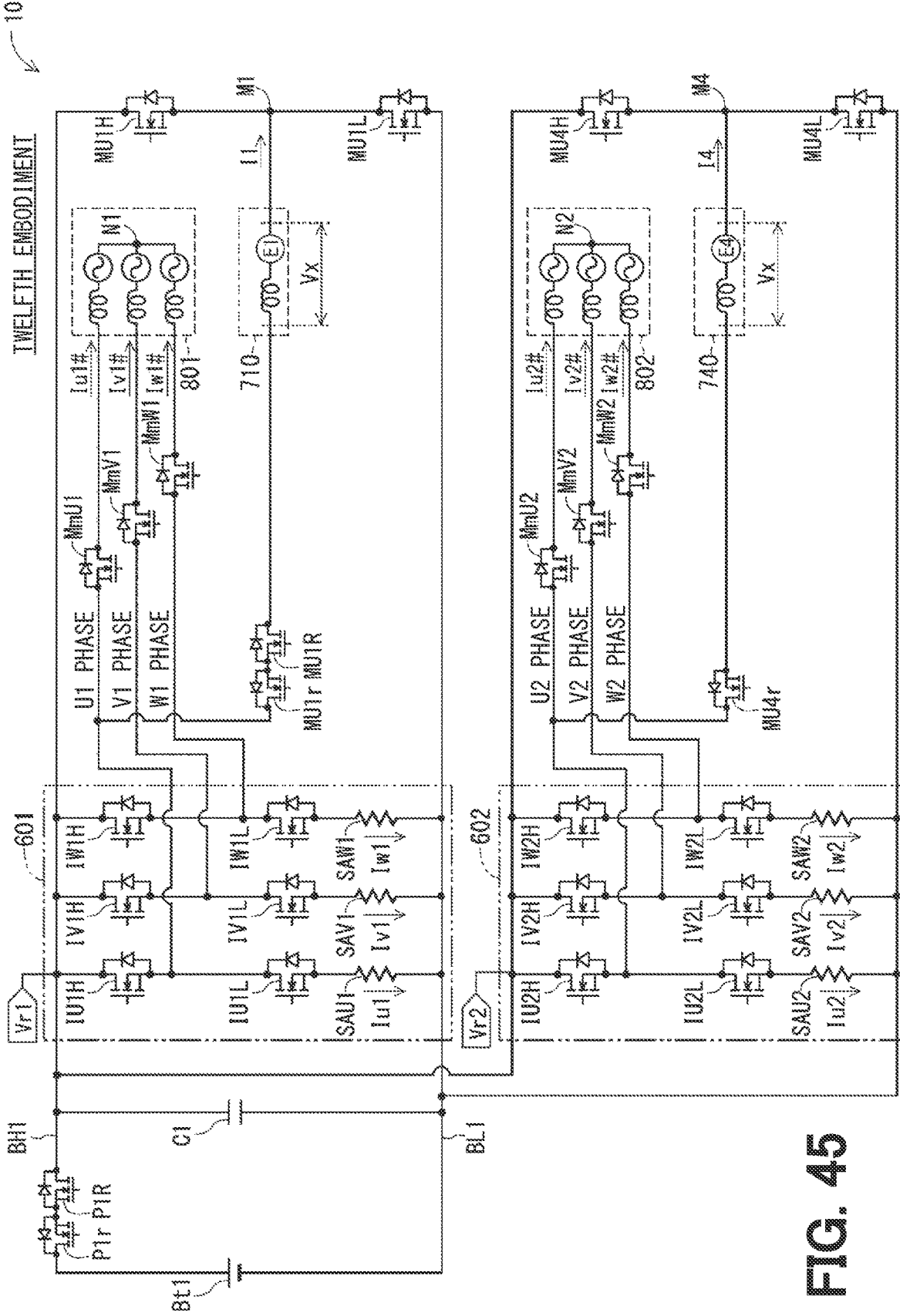
FIG. 45 is a circuit configuration diagram according to a twelfth embodiment (two-system, DC motor×2 (both sides))

In the twelfth embodiment illustrated in FIG. 45, one DC motor 710 is connected to the U1 phase of the first three-phase winding set 801, and one DC motor 740 is connected to the U2 phase of the second three-phase winding set 802. With one DC motor being disposed in each system, the balance between the systems is improved. Here, the DC motor relays MU1r/R in both positive and negative directions are connected to the DC motor 710 of the first system, and only the DC motor relay MU4r in the positive direction is connected to the DC motor 740 of the second system. For a protection function at the time of reverse connection of the power supply, it is possible to reduce the number of DC motor relays by making at least one system redundant.

Thirteenth Embodiment

Figure 46:
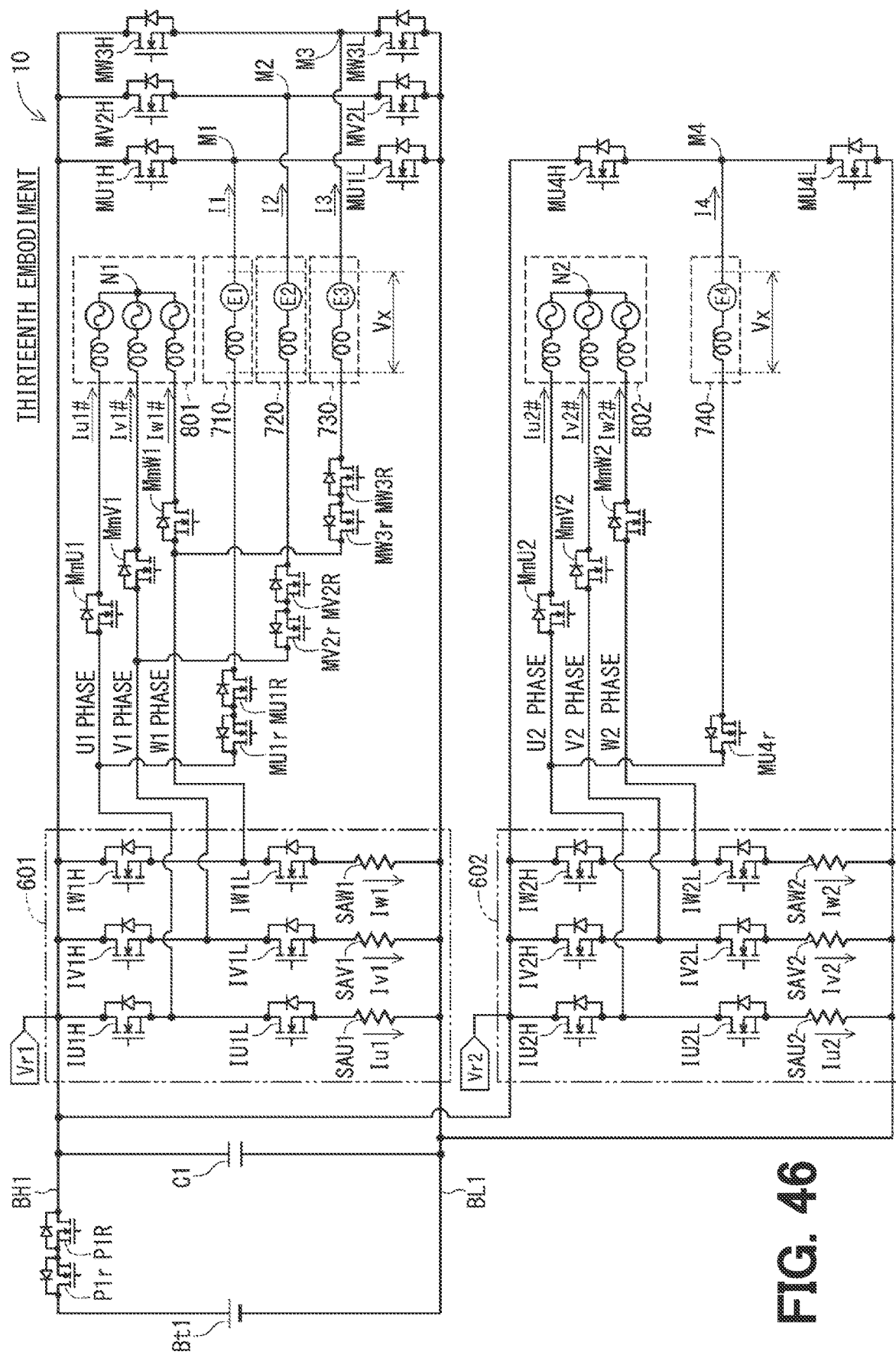
FIG. 46 is a circuit configuration diagram according to a thirteenth embodiment (two-system, DC motor×4 (both sides))

In the thirteenth embodiment illustrated in FIG. 46, the three DC motors 710, 720, 730 are connected to the U1 phase, the V1 phase, and the W1 phase of the first three-phase winding set 801, and one DC motor 740 is connected to the U2 phase of the second three-phase winding set 802.

For example, it is preferable to balance the power of each system by disposing a DC motor of an actuator with relatively small power such as a steering-position actuator in the first system and disposing a DC motor of an actuator with relatively large power such as a seat actuator in the second system. However, the steering-position actuator and the seat actuator are rarely used simultaneously, and hence the steering-position actuator and the seat actuator may be collectively disposed in the same system.

Fourteenth Embodiment

Figure 47:
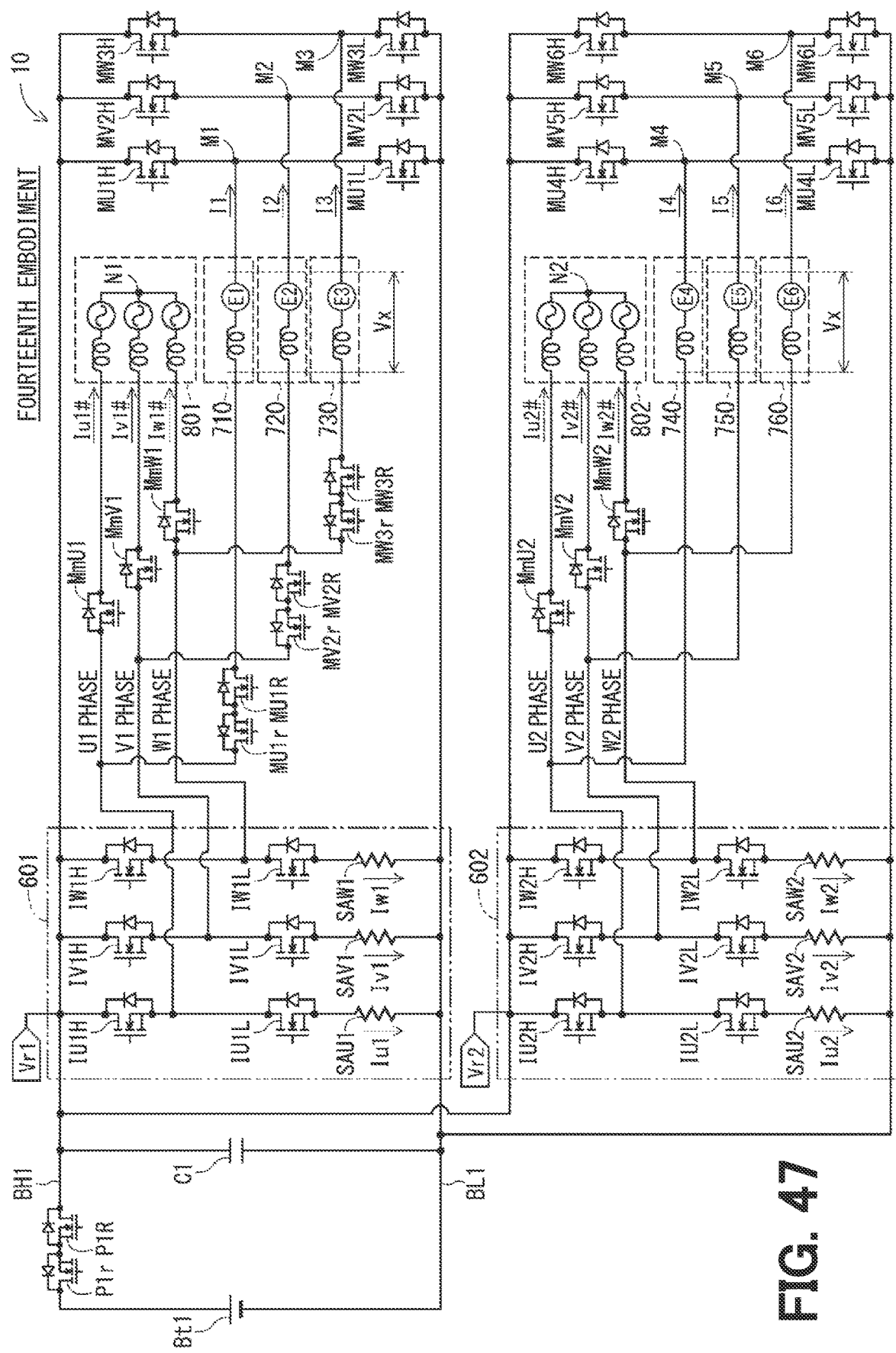
FIG. 47 is a circuit configuration diagram according to a fourteenth embodiment (two-system, DC motor×6 (both sides))

In the fourteenth embodiment illustrated in FIG. 47, the three DC motors 710, 720, 730 are connected to the U1 phase, the V1 phase, and the W1 phase of the first three-phase winding set 801, and the three DC motors 740, 750, 760 are connected to the U2 phase, the V2 phase, and the W2 phase of the second three-phase winding set 802. Here, the DC motor relays MU1r/R, MV2r/R, MW3r/R in both positive and negative directions are connected to the DC motors 710, 720, 730 of the first system, and no DC motor relay is connected to the DC motors 740, 750, 760 of the second system. It is possible to reduce the number of DC motor relays by making at least one system redundant.

Fifteenth Embodiment

Figure 48:
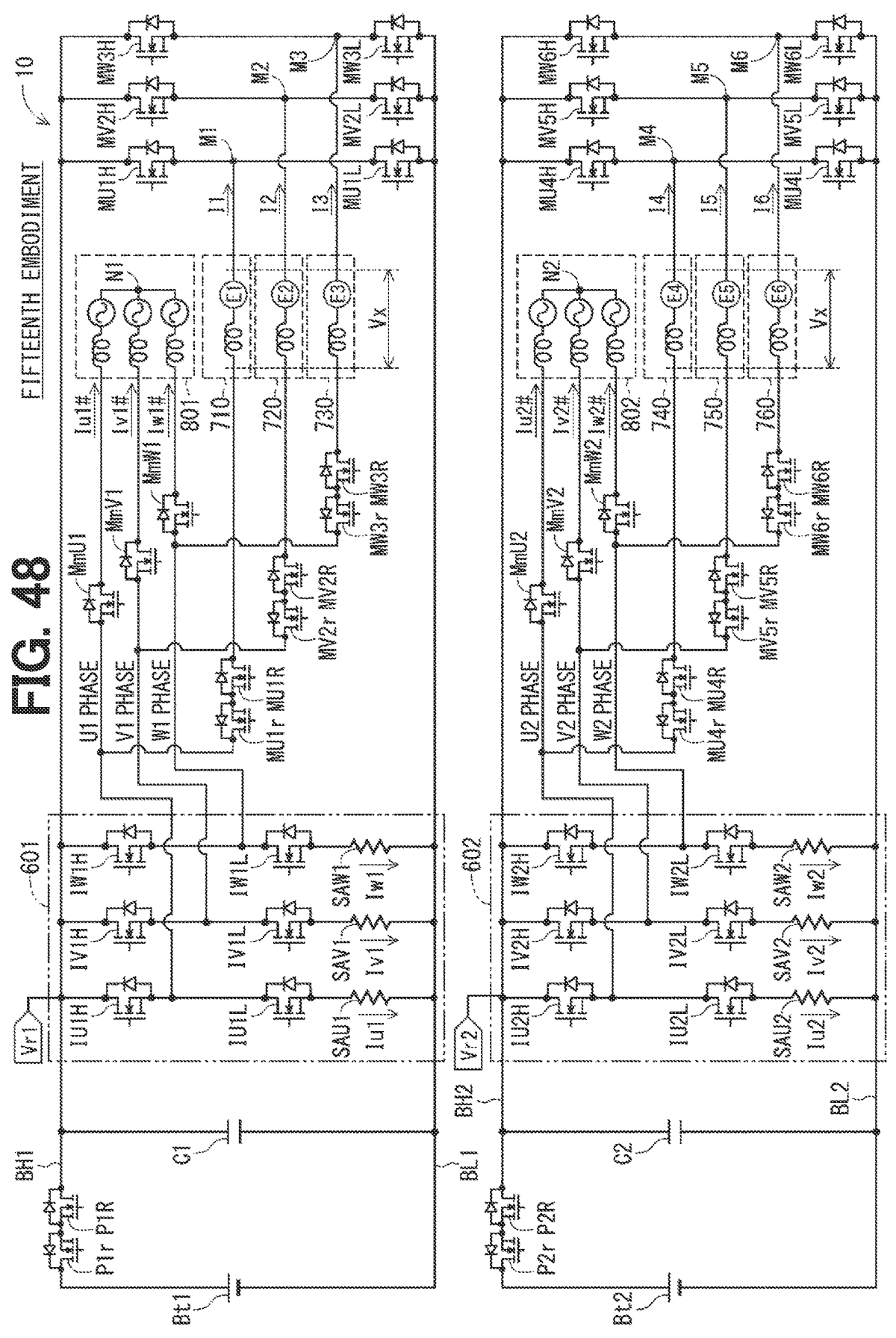

The fifteenth embodiment illustrated in FIG. 48 is different from the fourteenth embodiment in the connection configuration of the power supply. In the fifteenth embodiment, the first inverter 601 and the second inverter 602 are connected to a first power supply Bt1 and a second power supply Bt2 separated from each other. The second inverter 602 is connected to the positive electrode of the second power supply Bt2 via a high potential line BH2 and is connected to the negative electrode of the second power supply Bt2 via a low potential line BL2. Power supply relays P1r/R, P2r/R and capacitors C1, C2 are individually provided in the input units of the respective inverters 601, 602. In this manner, the fifteenth embodiment has a redundant configuration of so-called "complete two systems".

The DC motor relays MU4r/R, MV5r/R, MW6r/R in both positive and negative directions are connected to the DC motors 740, 750, 760 of the second system. With this configuration, for example, when one power supply fails, the three-phase motor 800 can be driven in a one-system drive mode using only the other power supply that is normal.

(Effects)

(1) The ECU 10 of the present embodiment (here, the reference characters in the second embodiment and the like are used) can simultaneously drive the DC motors 710, 720, 730 by controlling the operations of the DC motor switches MU1H/L, MV2H/L, MW3H/L while controlling the operations of the inverter switching elements IU1H/L, IV1H/L, IW1H/L to drive the three-phase motor 800.

In the configuration where one DC motor 710 is connected to the phase current path of one phase of one three-phase winding set 801 as in the first embodiment, it is sufficient that at least two DC motor switches MU1H, MU1L be provided. Therefore, the number of switches can be reduced as compared to the conventional technique of JP5768999B2.

(2) The control unit 30 performs control to switch ON/OFF of the DC motor switches on the high potential side and the low potential side in accordance with the energization direction of the DC motor and to increase or decrease the neutral point voltage Vn1 of the three-phase motor 800.

As a result, the control unit 30 can appropriately control the energization of the specific DC motor.

(3) In the ECU 10 of each embodiment except for the first embodiment, a plurality of DC motors are connected to a plurality of phases of one three-phase winding set 801, or a plurality of DC motors in total are connected to one or more phases of each of the plurality of three-phase winding sets 801, 802. As a result, the ECU 10 can also serve as a drive function of a plurality of DC motor type actuators by a drive device for the three-phase motor 800.

(4) The ECU 10 according to the present embodiment includes a plurality of current sensors SAU1, SAV1, SAW1 that detect currents flowing through the respective phases of the inverter 601. The control unit 30 computes the current flowing through the specific DC motor from the detection values of the current sensors of the non-specific phase and the specific phase and the estimated current value of the specific phase on the basis of Kirchhoff's law. As a result, the control unit 30 can appropriately control the energization of the specific DC motor.

(5) The ECU 10 of the present embodiment is suitably applied, as the three-phase motor 800, as a device that controls the drive of a steering assist motor of the EPS system 901 or a reaction force motor of the SBW system 902. In this case, it is effective to use, as the DC motor, a steering-position actuator that makes the steering position variable, specifically, the tilt actuator 720 and the telescopic actuator 730.

Other Embodiments (a) The DC motor terminal voltages Vm1, Vm2, Vm3 need not be adjusted to arbitrary values by the switching operation of the DC motor switches MU1H/L, MV2H/L, MW3H/L by duty control or the like. It is sufficient that at least the voltage value be made variable by switching between the ON states of the switches MU1H, MV2H, MW3H on the high potential side and the ON states of the switches MU1L, MV2L, MW3L on the low potential side. On the premise that the high-speed switching operation is not performed, a transistor or a mechanical relay that switches slowly may be used. In addition, since there is a possibility that a larger current flows through the inverter switching element connected to the DC motor than the other inverter switching elements, the inverter switching element may have a capacity equal to or higher than those of the other switches or may be disposed in a place where heat generation is not concentrated or a place where heat radiation is better than those of the other switching elements.

(b) As the DC motor switches MU1H/L, MV2H/L, MW3H/L, switches having current capacities equal to or higher than those of the inverter switching elements IU1H/L, IV1H/L, IW1H/L may be used. As the power supply relay Pdr/R on the DC motor switch side, a switch having a current capacity equal to or higher than that of the power supply relay P1r/R on the inverter side may be used. In addition, a dead time for preventing each pair of the upper and lower switches from being turned on simultaneously may be individually set in accordance with each switch and the magnitude of the flowing current, and the voltage for compensating for the dead time may be individually set for each pair of the upper and lower switches in accordance with the set dead time and the flowing current. The polarity determination of the compensation voltage for the dead time is determined by the reference character of the current flowing through each pair of the upper and lower switches.

(c) For the DC motors 710, 720, 730 of the third embodiment and the like, assuming a terminal ground fault, the negative-direction DC motor relays MU1R, MV2R, MW3R need not be provided, and only the positive-direction DC motor relays MU1*r*, MV2*r*, MW3*r* may be provided. In addition, the direction of the series connection of the positive-direction DC motor relays MU1*r*, MV2*r*, MW3*r* and the negative-direction DC motor relays MU1R, MV2R, MW3R may be a direction in which the drain terminals of the MOSFETs are adjacent to each other, contrary to FIG. 7 and the like.

(d) The three-phase motor relays MmU1, MmV1, MmW1 or the DC motor relays MU1*r*/R, MV2*r*/R, MW3*r*/R may be mechanical relays or bidirectional relays. When the three-phase motor relays MmU1, MmV1, MmW1 are mechanical relays or bidirectional relays, it is sufficient that the three-phase motor relays MmU1, MmV1, MmW1 be provided in two phases. In FIG. 7, the source terminals of the three-phase motor relays MmU1, MmV1, MmW1 are oriented toward the inverter side, but the drain terminals of the three-phase motor relays MmU1, MmV1, MmW1 may be oriented toward the inverter side.

(e) The current sensor is not limited to a sensor that detects the current flowing between the lower arm element of the inverter and the low potential line BL1 but may directly detect the phase current.

(f) In the eleventh to fifteenth embodiments, the first system inverter 601 and the positive-direction power supply relays, the negative-direction power supply relays, and the noise prevention elements corresponding to the DC motor switches MU1H/L, MV2H/L, MW3H/L are configured according to the third embodiment. On the other hand, the configuration of each system may be configured according to the fourth to eighth embodiments. The two systems may have the same configuration or different configurations.

Figure 49:
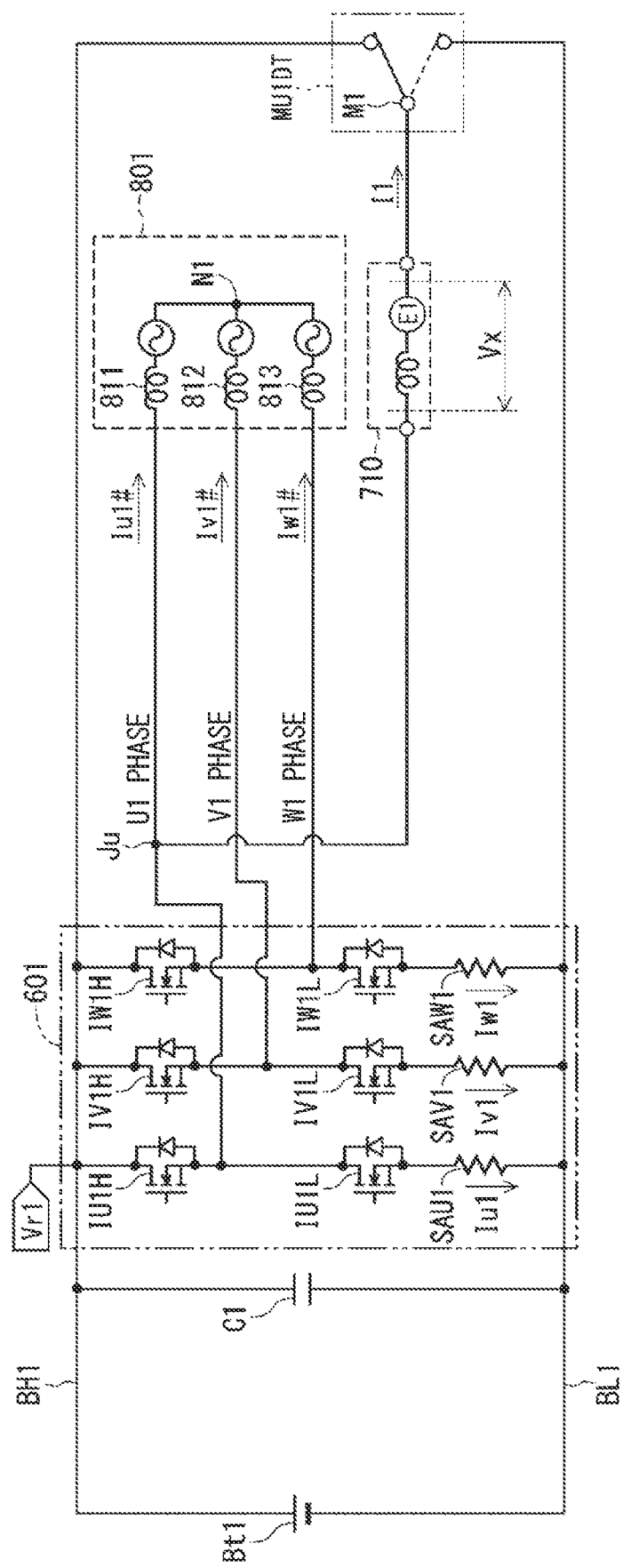
FIG. 49 is a circuit configuration diagram of another embodiment.

(g) As illustrated in FIG. 49, the DC motor switch may be formed of a double closure switch MU1DT. The double closure switch MU1DT can switch the connection of the DC motor terminal M1 with a contact on the high potential side and a contact on the low potential side.

(h) Each of the two DC motors is not limited to an independent form but may be formed of a stepping motor having two-phase windings.

(i) The multiphase rotating machine is not limited to having three phases but may have two phases or have four or more phases, that is, generalized N phases (N is an integer of 2 or more). The multiphase rotating machine may include three or more multiphase winding sets.

(j) In the above embodiment, for the sake of convenience, the steering lock actuator 710 also functions as the steering vibration actuator, but in practice, those actuators are generally achieved as separate motors. Therefore, one of the steering lock actuator and the steering vibration actuator may be driven by another power converter.

(k) The rotating machine control device of the present disclosure is not limited to a steering assist motor or a reaction force motor in a steering system of a vehicle, or a DC motor for a steering-position actuator, a seat actuator, or the like, but can be applied as various rotating machine control devices using a multiphase AC motor and a DC motor in combination. The steering assist motor or the reaction force motor need not be an electromechanical integrated type but may be an electromechanical type in which the motor body and the ECU are connected by a harness.

The configuration of the present disclosure is more effective in a vehicle motor in which various motors are disposed proximately, and is applicable to combinations of, for example, a motor for a hydraulic pump of a brake and a motor for a parking brake, a plurality of seat motors, a motor for a sliding door or a motor for a wiper, a motor for a window and a motor for a side mirror, a motor for an electric water pump and a motor for an electric fan, and the like.

The present disclosure is not limited to such embodiments but can be implemented in various forms without deviating from the spirit of the present disclosure.

The control unit and the technique according to the present disclosure may be achieved by a dedicated computer provided by constituting a processor and a memory programmed to execute one or more functions embodied by a computer program. The control unit and the technique according to the present disclosure may be achieved by a dedicated computer provided by constituting a processor with one or more dedicated hardware logic circuits. The control unit and the technique according to the present disclosure may be achieved using one or more dedicated computers formed of a combination of the processor and the memory programmed to execute one or more functions and the processor including one or more hardware logic circuits. The computer program may be stored in a computer-readable non-transitional tangible recording medium as an instruction to be executed by the computer.

The present disclosure has been described in accordance with the embodiments. However, the present disclosure is not limited to the embodiments and structures. The present disclosure encompasses various modifications and modifications within an equivalent scope. Various combinations and forms, as well as other combinations and forms including only one element, more than that, or less than that, are also within the scope and idea of the present disclosure.

What is claimed is:

1. A rotating machine control device configured to drive one or more multiphase rotating machines including one or more multiphase winding sets and one or more DC rotating machines in which a first terminal that is one end is connected to a phase current path of one or more phases of at least one of the multiphase winding sets, the device comprising:

one or more multiphase power converters that are connected to a positive electrode and a negative electrode of a power supply via a high potential line and a low potential line, respectively, convert DC power of the power supply into multiphase alternate current power by operations of a plurality of inverter switching elements connected in a bridge configuration, and apply a voltage to each of phase windings of the multiphase winding set;

a DC rotating machine switch made up of switches on a high potential side and a low potential side connected in series via a DC motor terminal connected to a second terminal that is an end of the DC rotating machine on an opposite side to the first terminal, the DC rotating machine switch making a voltage of the DC motor terminal variable by switching; and a control unit that controls operations of the inverter switching elements and the DC rotating machine switch, wherein at a time of energization in a positive direction from the first terminal to the second terminal of the DC rotating machine, the control unit turns on the DC rotating machine switch on the low potential side connected to the second terminal or causes the DC rotating machine switches on the low potential side and the high potential side connected to the second terminal to perform a switching operation such that a voltage of the second terminal is lower than a voltage of the first terminal, and controls a neutral point voltage of the multiphase winding set to be higher, and at a time of energization in a negative direction from the second terminal to the first terminal of the DC rotating machine, the control unit turns on the DC rotating machine switch on the high potential side connected to the second terminal or causes the DC rotating machine switches on the low potential side and the high potential side connected to the second terminal to perform the switching operation such that the voltage of the second terminal is higher than the voltage of the first terminal, and controls the neutral point voltage of the multiphase winding set to be lower.

2. The rotating machine control device according to claim 1, wherein the control unit adjusts the neutral point voltage in accordance with a voltage that is applied to the multiphase winding set.

3. The rotating machine control device according to claim 1, wherein the control unit switches between drive and stop of the DC rotating machine by control of the neutral point voltage on a basis of a predetermined condition.

4. A rotating machine control device configured to drive one or more multiphase rotating machines including one or more multiphase winding sets and one or more DC rotating machines in which a first terminal that is one end is connected to a phase current path of one or more phases of at least one of the multiphase winding sets, the device comprising:

one or more multiphase power converters that are connected to a positive electrode and a negative electrode of a power supply via a high potential line and a low potential line, respectively, convert DC power of the power supply into multiphase alternate current power by operations of a plurality of inverter switching elements connected in a bridge configuration, and apply a voltage to each of phase windings of the multiphase winding set;

a DC rotating machine switch made up of switches on a high potential side and a low potential side connected in series via a DC motor terminal connected to a second terminal that is an end of the DC rotating machine on an opposite side to the first terminal, the DC rotating machine switch making a voltage of the DC motor terminal variable by switching;

a control unit that controls operations of the inverter switching elements and the DC rotating machine switch; and a plurality of current sensors that detect currents flowing through the respective phases of the multiphase power converter, wherein when one of the one or more DC rotating machines selected as an energization target is defined as a specific DC rotating machine, and when a phase to which the specific DC rotating machine is connected is defined as a specific phase, and a phase except for the specific phase is defined as a non-specific phase, at a time of energization of the specific DC rotating machine, the control unit computes, as an estimated current value, a value of a current flowing through the specific phase from a value of a current detected by the current sensor of the non-specific phase according to Kirchhoff's law, and computes a current flowing through the specific DC rotating machine from the estimated current value and a value of a current detected by the current sensor of the specific phase.

5. The rotating machine control device according to claim 4, wherein the current sensor is installed between a switching element on the low potential side of each of phases of the multiphase power converter and the low potential line.

6. A rotating machine control device configured to drive one or more multiphase rotating machines including one or more multiphase winding sets and one or more DC rotating machines in which a first terminal that is one end is connected to a phase current path of one or more phases of at least one of the multiphase winding sets, the device comprising:

one or more multiphase power converters that are connected to a positive electrode and a negative electrode of a power supply via a high potential line and a low potential line, respectively, convert DC power of the power supply into multiphase alternate current power by operations of a plurality of inverter switching elements connected in a bridge configuration, and apply a voltage to each of phase windings of the multiphase winding set;

a DC rotating machine switch made up of switches on a high potential side and a low potential side connected in series via a DC motor terminal connected to a second terminal that is an end of the DC rotating machine on an opposite side to the first terminal, the DC rotating machine switch making a voltage of the DC motor terminal variable by switching; and a control unit that controls operations of the inverter switching elements and the DC rotating machine switch, wherein the control unit performs abnormality detection of the multiphase power converter or the multiphase rotating machine and switches a fail-safe threshold in the abnormality detection between a drive time and a non-drive time of the DC rotating machine.

7. The rotating machine control device according to claim 1, wherein a plurality of the DC rotating machines are provided, and a plurality of the DC rotating machines are connected to a plurality of phases of one of the multiphase winding sets, or a plurality of the DC rotating machines in total are connected to one or more phases of each of a plurality of sets of the multiphase winding sets.

8. The rotating machine control device according to claim 1, wherein a DC rotating machine relay is provided closer to the DC rotating machine than a branch point to the DC rotating machine in a phase current path from the multiphase power converter to the multiphase rotating machine.

9. The rotating machine control device according to claim 1, wherein a multiphase rotating machine relay is provided in each of one or more phases between the multiphase power converter and the multiphase winding set, and in the phase to which the DC rotating machine is connected, the multiphase rotating machine relay is provided closer to the multiphase rotating machine than the branch point to the DC rotating machine in a phase current path from the multiphase power converter to the multiphase rotating machine.

10. The rotating machine control device according to claim 1, wherein the multiphase power converter and the DC rotating machine switch are connected to individual power supplies.

11. The rotating machine control device according to claim 1, wherein
the DC rotating machine switch has a smaller current capacity than a current capacity of the inverter switching element.

12. The rotating machine control device according to claim 1, wherein
a power supply relay in a negative direction that is capable of interrupting energization from the power supply when an electrode of the power supply is connected in a direction opposite to a normal direction is provided in common to the multiphase power converter and the DC rotating machine switch.

13. The rotating machine control device according to claim 12, wherein
a power supply relay in a positive direction that is capable of interrupting energization from the power supply when the electrode of the power supply is connected in the normal direction is further provided in common to the multiphase power converter and the DC rotating machine switch.

14. The rotating machine control device according to claim 1, wherein
a power supply relay capable of interrupting energization from the power supply is individually provided for the multiphase power converter and the DC rotating machine switch, and
the power supply relay on the DC rotating machine switch side has a smaller current capacity than a current capacity of the power supply relay on the multiphase power converter side.

15. The rotating machine control device according to claim 1, wherein
a noise prevention element functioning as a noise filter is provided in common for the multiphase power converter and the DC rotating machine switch.

16. The rotating machine control device according to claim 1, wherein
a noise prevention element functioning as a noise filter is individually provided for the multiphase power converter and the DC rotating machine switch.

17. The rotating machine control device according to claim 1, wherein
the multiphase rotating machine is a three-phase double winding rotating machine in which two three-phase winding sets are provided coaxially.

18. The rotating machine control device according to claim 17, wherein
a same number of the DC rotating machines are connected to each of the two three-phase winding sets.

19. The rotating machine control device according to claim 17, wherein
different numbers of the DC rotating machines are connected to the two three-phase winding sets, or the DC rotating machine is connected to only one of the three-phase winding sets.

20. The rotating machine control device according to claim 17, wherein
the multiphase power converters or the DC rotating machine switches are provided in two systems.

21. The rotating machine control device according to claim 1, further comprising:
a plurality of the multiphase power converters connected to individual power supplies.

22. The rotating machine control device according to claim 1, wherein
in a case of energization of the DC rotating machine and non-energization of the multiphase rotating machine,
the control unit turns on the inverter switching element on the high potential side and turns off the inverter switching element on the low potential side of the phase to which the DC rotating machine to be energized is connected, and the control unit turns off the DC rotating machine switch on the high potential side and turns on the DC rotating machine switch on the low potential side, or causes the DC rotating machine switches on the low potential side and the high potential side connected to the second terminal to perform a switching operation such that the voltage of the second terminal is lower than the voltage of the first terminal, or
the control unit turns off the inverter switching element on the high potential side and turns on the inverter switching element on the low potential side of the phase to which the DC rotating machine to be energized is connected, and the control unit turns on the DC rotating machine switch on the high potential side and turns off the DC rotating machine switch on the low potential side, or causes the DC rotating machine switches on the low potential side and the high potential side connected to the second terminal to perform the switching operation such that the voltage of the second terminal is higher than the voltage of the first terminal, or
the control unit causes the inverter switching element of each of the phases to which the DC rotating machine to be energized is connected to perform the switching operation such that terminal voltage of each of the phases becomes a same voltage, and at a time of energization in the positive direction from the first terminal to the second terminal of the DC rotating machine, the control unit turns on the DC rotating machine switch on the low potential side connected to the second terminal or causes the DC rotating machine switches on the low potential side and the high potential side connected to the second terminal to perform the switching operation such that the voltage of the second terminal is lower than the voltage of the first terminal, and
at a time of energization in the negative direction from the second terminal to the first terminal of the DC rotating machine, the control unit turns on the DC rotating machine switch on the high potential side connected to the second terminal or causes the DC rotating machine switches on the low potential side and the high potential side connected to the second terminal to perform the switching operation such that the voltage of the second terminal is higher than the voltage of the first terminal.

23. The rotating machine control device according to claim 1, wherein
the multiphase rotating machine is a rotating machine for steering assist torque output of an electric power steering system or for reaction torque output of a steer-by-wire system.

24. The rotating machine control device according to claim 23, wherein
the DC rotating machine includes a steering-position actuator that makes a steering position variable.

* * * * *